United States Patent
Tsukuba

(10) Patent No.: US 12,335,479 B2
(45) Date of Patent: Jun. 17, 2025

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/613,855

(22) Filed: Mar. 22, 2024

(65) Prior Publication Data

US 2024/0236323 A1     Jul. 11, 2024

Related U.S. Application Data

(63) Continuation of application No. 17/606,460, filed as application No. PCT/JP2020/018617 on May 8, 2020, now Pat. No. 11,973,948.

(60) Provisional application No. 62/863,396, filed on Jun. 19, 2019.

(51) Int. Cl.
*H04N 19/13*     (2014.01)
*H04N 19/157*     (2014.01)
*H04N 19/70*     (2014.01)

(52) U.S. Cl.
CPC ........... *H04N 19/13* (2014.11); *H04N 19/157* (2014.11); *H04N 19/70* (2014.11)

(58) Field of Classification Search
CPC ....... H04N 19/13; H04N 19/157; H04N 19/70
See application file for complete search history.

(56) References Cited

U.S. PATENT DOCUMENTS

| | | | |
|---|---|---|---|
| 5,454,011 A | 9/1995 | Shimoyoshi | |
| 5,490,170 A | 2/1996 | Akagiri et al. | |
| 6,563,549 B1 * | 5/2003 | Sethuraman | H04N 19/53 375/E7.22 |
| 7,251,371 B2 * | 7/2007 | Kobayashi | H04N 19/197 375/E7.266 |
| 7,596,279 B2 | 9/2009 | Sugimoto et al. | |

(Continued)

FOREIGN PATENT DOCUMENTS

| | | |
|---|---|---|
| CN | 102917215 A | 2/2013 |
| CN | 103119849 A | 5/2013 |

(Continued)

OTHER PUBLICATIONS

International Search Report and Written Opinion mailed on Jul. 21, 2020, received for PCT Application PCT/ JP2020/018617, Filed on May 8, 2020, 12 pages including English Translation.

(Continued)

*Primary Examiner* — Manav Seth
(74) *Attorney, Agent, or Firm* — XSENSUS, LLP

(57) ABSTRACT

A predetermined context variable is assigned, according to a device, system, or method, to a first bin of a bin sequence obtained by binarizing an adaptive orthogonal transform identifier indicating a mode of adaptive orthogonal transform in image encoding and context encoding is performed for the first bin of the bin sequence. Furthermore, a predetermined context variable is assigned to a first bin of a bin sequence obtained by binarizing an adaptive orthogonal transform identifier indicating a mode of inverse adaptive orthogonal transform in image decoding and context decoding is performed for the first bin of the bin sequence.

15 Claims, 47 Drawing Sheets

(56) References Cited

U.S. PATENT DOCUMENTS

| | | | |
|---|---|---|---|
| 7,630,563 B2 * | 12/2009 | Irvine | H04N 19/14 382/250 |
| 7,778,331 B2 | 8/2010 | Sato | |
| 7,860,160 B2 | 12/2010 | Shimazaki | |
| 7,916,959 B2 | 3/2011 | Adachi | |
| 8,189,674 B2 * | 5/2012 | Shigemoto | H04N 19/42 375/240.18 |
| 8,422,808 B2 | 4/2013 | Adachi | |
| 8,442,334 B2 | 5/2013 | Drugeon et al. | |
| 8,902,988 B2 | 12/2014 | Sole Rojals et al. | |
| 8,913,666 B2 | 12/2014 | Sole Rojals et al. | |
| 10,554,977 B2 | 2/2020 | Fu et al. | |
| 10,827,186 B2 | 11/2020 | Moccagatta et al. | |
| 11,496,752 B2 | 11/2022 | Lasserre et al. | |
| 11,665,367 B2 | 5/2023 | Tsukuba | |
| 2009/0034856 A1 | 2/2009 | Moriya | |
| 2012/0082213 A1 | 4/2012 | Sekiguchi | |
| 2012/0106630 A1 | 5/2012 | Sugimoto et al. | |
| 2012/0328026 A1 | 12/2012 | Sole Rojals | |
| 2013/0028326 A1 * | 1/2013 | Moriya | H04N 19/46 375/E7.125 |
| 2013/0177069 A1 | 7/2013 | Sze | |
| 2013/0294502 A1 | 11/2013 | Kazui | |
| 2013/0322540 A1 | 12/2013 | Yamori et al. | |
| 2015/0312588 A1 | 10/2015 | Yamamoto | |
| 2017/0006306 A1 | 1/2017 | Yamori et al. | |
| 2018/0160118 A1 | 6/2018 | Tsukuba | |
| 2018/0220159 A1 | 8/2018 | Won | |
| 2019/0104322 A1 | 4/2019 | Tsukuba | |

FOREIGN PATENT DOCUMENTS

| | | |
|---|---|---|
| CN | 109792522 A | 5/2019 |
| JP | 2008312229 A | 12/2008 |
| KR | 20110019140 A | 2/2011 |

OTHER PUBLICATIONS

Bross et al., "Versatile Video Coding (Draft 4)", Joint Video Experts Team (JVET) of ITU-T SG 16 WP 3 and ISO/IEC JTC 1 /SC 29 / WG 11, JVET-M1001-v1, 13 Meeting, Jan. 9-18, 2019, 25 Pages.

Bross et al., "Versatile Video Coding (Draft 5)", Joint Video Experts Team (JVET) of ITU-T SG 16 WP 3 and ISO/IEC JTC 1/SC 29/WG 11, JVET-N1001-v8, 14th Meeting, Mar. 27, 2019, 20 Pages.

Rosewarne et al., "CE6-related: RST Binarization", Joint Video Experts Team (JVET) of ITU-T SG 16 WP 3 and ISO/IEC JTC 1/SC 29/WG 11, JVET-N0105-v2, 14th Meeting, Mar. 19-27, 2019, 4 Pages.

Salehifar et al., "CE 6-1.1 (a, b): Selection of MTS Candidates", Joint Video Experts Team (JVET) of ITU-T SG 16 WP 3 and ISO/IEC Jtc 1/SC 29/WG 11, JVET-L0292-V3, 12th Meeting, Oct. 3-12, 2018, 7 Pages.

Tsukuba et al., "Non-CE6: Context Modeling for MTS Index Coding", Joint Video Experts Team (JVET) of ITU-T SG 16 WP 3 and ISO/IEC JTC 1/SC 29/ WG 11, JVET-O0354-v2, 15th Meeting, Jul. 3-12, 2019, 5 Pages.

Cao (Hikvision) X et al: "CE6-related: Simplification on MTS CU flag coding", 125. MPEG Meeting; Jan. 14, 2019-Jan. 18, 2019; Marrakech; (Motion Picture Expert Group or ISO/IEC JTC1/SC29/WG11).

Deng (Bytedance) Z et al: "Non-CE6: Reduced contexts and context coded bins for MTS index coding". 15. JVET Meeting; Jul. 3, 2019-Jul. 12, 2019; Gothenburg; (The Joint Video Exploration Team of ISO/IEC JTC1/SC29/WG11 and ITU-T SG.16).

Nalci (Qualcomm) A et al: "Non-CE6: A Simplification for MTS Index Signaling", 15. JVET Meeting; Jul. 3, 2019-Jul. 12, 2019; Gothenburg; (The Joint Video Exploration Team of ISO/IEC JTC1/SC29/WG11 and ITU-T SG.16).

Marpe et al., 2003, "Context-Based Adaptive Binary Arithmetic Coding in the H.264/AVC Video Compression Standard" (pp. 620-636) (Year: 2003).

Tu et al., 2002, IEEE Publication, "Context-Based Entropy Coding of Block Transform Coefficients for Image Compression" (pp. 1271-1283). (Year: 2002).

Kiho Choi, Kwang Pyo Choi, CE6-related:Simplification on MTS kernel derivation, Joint Video Experts Team (JVET) of ITU-T SG 16 WP 3 and ISO/IEC JTC1/SC 29/WG 11, 12th Meeting: Macao, CN, Oct. 3-12, 2018.

Benjamin Bross et al.: "Versatile Video Coding (Draft 5)", Joint Video Experts Team (JVET), of ITU-T SG 16 WP 3 and ISO/I EC JTC 1 /SC 29/WG 11, JVET-N1001-vS, 14th Meeting, Jun. 11, 2019 (Jun. 11, 2019), pp. 308-320 , 327-330, XP030205561.

* cited by examiner

FIG. 1

| Syntax Element | Binarization | |
|---|---|---|
| | Process | Input parameters |
| mts_idx[ ][ ] | TR | cMax = 4, cRiceParam = 0 |

A

| Syntax element | binIdx | | | | |
|---|---|---|---|---|---|
| | 0 | 1 | 2 | 3 | 4 | >= 5 |
| transform_skip_flag[ ][ ] | 0 | na | na | na | Na | na |
| tu_mts_idx[ ][ ] | min(cqtDepth, 5) | A1 | A2 | A3 | Na | na |

| mts_idx | transform type | | binarization |
|---|---|---|---|
| | Horizontal | vertical | |
| 0 | DCT2 | DCT2 | 0 |
| 1 | DST7 | DST7 | 10 |
| 2 | DCT8 | DST7 | 110 |
| 3 | DST7 | DCT8 | 1110 |
| 4 | DCT8 | DCT8 | 1111 |

B

| cqtDepth | CU SIZE | | MAY mts_ids EXIST? |
|---|---|---|---|
| | width | Height | |
| 0 | 128 | 128 | No |
| 1 | 64 | 64 | No |
| 2 | 32 | 32 | Yes |
| 3 | 16 | 16 | Yes |
| 4 | 8 | 8 | Yes |
| 5 | 4 | 4 | Yes |

| Syntax element | binIdx | | | | | |
|---|---|---|---|---|---|---|
| | 0 | 1 | 2 | 3 | 4 | >= 5 |
| transform_skip_flag[ ][ ] | 0 | Na | na | na | na | na |
| tu_mts_idx[ ][ ] | A0 | bypass | bypass | bypass | na | na |

B

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | A0 | B1 | bypass | bypass | na | na |

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | A0 | B1 | B2 | bypass | na | na |

B

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | A0 | B1 | B2 | B3 | na | na |

FIG. 5

| METHOD | NUMBER OF CONTEXTS | NUMBER OF CONTEXT ENCODING BINS | NUMBER OF BYPASS ENCODING BINS |
|---|---|---|---|
| 0 | 9 | 4 | 0 |
| 1-1 | 1 | 1 | 3 |
| 1-2 | 2 | 2 | 2 |
| 1-3 | 3 | 3 | 1 |
| 1-4 | 4 | 4 | 0 |

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | max(log2W, log2H) − log2MinMtsSize | Bypass | bypass | bypass | na | na |

B

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | max(log2W, log2H) − log2MinMtsSize | B1 | bypass | bypass | na | na |

| Syntax element | binIdx | | | | |
| --- | --- | --- | --- | --- | --- |
| | 0 | 1 | 2 | 3 | 4 | >= 5 |
| transform_skip_flag[ ][ ] | 0 | na | na | na | na | na |
| tu_mts_idx[ ][ ] | max(log2W, log2H) – log2MinMtsSize | B1 | B2 | bypass | na | na |

B

| Syntax element | binIdx | | | | |
| --- | --- | --- | --- | --- | --- |
| | 0 | 1 | 2 | 3 | 4 | >= 5 |
| transform_skip_flag[ ][ ] | 0 | na | Na | na | na | na |
| tu_mts_idx[ ][ ] | max(log2W, log2H) – log2MinMtsSize | B1 | B2 | B3 | na | na |

FIG. 16

| METHOD | NUMBER OF CONTEXTS | NUMBER OF CONTEXT ENCODING BINS | NUMBER OF BYPASS ENCODING BINS |
|---|---|---|---|
| 0 | 9 | 4 | 0 |
| 2-1 | 4 | 1 | 3 |
| 2-2 | 5 | 2 | 2 |
| 2-3 | 6 | 3 | 1 |
| 2-4 | 7 | 4 | 0 |

FIG. 19

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | min(max(log2W, log2H) − log2MinMtsSize, TH) | bypass | bypass | bypass | na | na |

A

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | min(max(log2W, log2H) − log2MinMtsSize, TH) | B1 | bypass | bypass | na | na |

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | min(max(log2W,log2H)−log2MinMtsSize,TH) | B1 | B2 | bypass | na | na |

A

B

| Syntax element | binIdx | | | | | |
|---|---|---|---|---|---|---|
| | 0 | 1 | 2 | 3 | 4 | >= 5 |
| transform_skip_flag[ ][ ] | 0 | na | Na | na | na | na |
| tu_mts_idx[ ][ ] | min(max(log2W,log2H)−log2MinMtsSize,TH) | B1 | B2 | B3 | na | na |

| METHOD | THRESHOLD VALUE TH | NUMBER OF CONTEXTS | NUMBER OF CONTEXT ENCODING BINS | NUMBER OF BYPASS ENCODING BINS |
|---|---|---|---|---|
| 0 | — | 9 | 4 | 0 |
| 3-1 | 2 | 3 | 1 | 3 |
| 3-2 | 2 | 4 | 2 | 2 |
| 3-3 | 2 | 5 | 3 | 1 |
| 3-4 | 2 | 6 | 4 | 0 |

B

| METHOD | THRESHOLD VALUE TH | NUMBER OF CONTEXTS | NUMBER OF CONTEXT ENCODING BINS | NUMBER OF BYPASS ENCODING BINS |
|---|---|---|---|---|
| 0 | — | 9 | 4 | 0 |
| 3-1 | 1 | 2 | 1 | 3 |
| 3-2 | 1 | 3 | 2 | 2 |
| 3-3 | 1 | 4 | 3 | 1 |
| 3-4 | 1 | 5 | 4 | 0 |

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | min(max(log2W,log2H)−log2MinMtsSize,TH)>>shift | Bypass | bypass | bypass | na | na |

B

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | min(max(log2W,log2H)−log2MinMtsSize,TH)>>shift | B1 | bypass | bypass | na | na |

FIG. 25

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | min(max(log2W,log2H)−log2MinMtsSize,TH)>>shift | B1 | B2 | bypass | na | na |

A

| Syntax element | binIdx | | | | | |
|---|---|---|---|---|---|---|
| | 0 | 1 | 2 | 3 | 4 | >= 5 |
| transform_skip_flag[ ][ ] | 0 | na | Na | na | na | na |
| tu_mts_idx[ ][ ] | min(max(log2W,log2H)−log2MinMtsSize,TH)>>shift | B1 | B2 | B3 | na | na |

| METHOD | THRESHOLD VALUE TH | SCALE PARAMETER shift | NUMBER OF CONTEXTS | NUMBER OF CONTEXT ENCODING BINS | NUMBER OF BYPASS ENCODING BINS |
|---|---|---|---|---|---|
| 0 | 1 | — | 9 | 4 | 0 |
| 4-1 | 2 | 1 | 2 | 1 | 3 |
| 4-2 | 2 | 1 | 3 | 2 | 2 |
| 4-3 | 2 | 1 | 4 | 3 | 1 |
| 4-4 | 2 | 1 | 5 | 4 | 0 |

FIG. 29

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | S<TH? A0:A1 | Bypass | bypass | bypass | na | na |

A

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | S<TH? A0:A1 | B1 | bypass | bypass | na | na |

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | S<TH? A0:A1 | B1 | B2 | bypass | na | na |

B

| Syntax element | binIdx | | | | | |
|---|---|---|---|---|---|---|
| | 0 | 1 | 2 | 3 | 4 | >= 5 |
| transform_skip_flag[ ][ ] | 0 | na | na | na | na | na |
| tu_mts_idx[ ][ ] | S<TH? A0:A1 | B1 | B2 | B3 | na | na |

FIG. 31

| w*h | cbSubDiv |
|---|---|
| 1024 | 0 |
| 512 | 1 |
| 256 | 2 |
| 128 | 4 |
| 64 | 8 |
| 32 | 16 |
| 16 | 32 |

FIG. 32

| METHOD | NUMBER OF CONTEXTS | NUMBER OF CONTEXT ENCODING BINS | NUMBER OF BYPASS ENCODING BINS |
|---|---|---|---|
| 0 | 8 | 4 | 0 |
| 5-1 | 2 | 1 | 3 |
| 5-2 | 3 | 2 | 2 |
| 5-3 | 4 | 3 | 1 |
| 5-4 | 5 | 4 | 0 |

| mts_idx | transform type | | binarization |
|---|---|---|---|
| | Horizontal | vertical | |
| 0 | DCT2 | DCT2 | 0 |
| 1 | DST7 | DST7 | 100 |
| 2 | DCT8 | DST7 | 101 |
| 3 | DST7 | DCT8 | 110 |
| 4 | DCT8 | DCT8 | 111 |

B

| mts_idx | Binarization | |
|---|---|---|
| | mts_idx_prefix | mts_idx_suffix |
| 0 | 0 | - |
| 1 | 1 | 00 |
| 2 | 1 | 01 |
| 3 | 1 | 10 |
| 4 | 1 | 11 |

| Syntax element | binIdx | | | | | |
|---|---|---|---|---|---|---|
| | 0 | 1 | 2 | 3 | 4 | >= 5 |
| trSkip_flag[ ][ ] | 0 | na | na | na | na | na |
| tu_mts_idx[ ][ ] | A0 | bypass | bypass | na | na | na |

B

| Syntax element | binIdx | | | | | |
|---|---|---|---|---|---|---|
| | 0 | 1 | 2 | 3 | 4 | >= 5 |
| trSkip_flag[ ][ ] | 0 | na | na | na | na | na |
| tu_mts_idx[ ][ ] | A0 | B1 | bypass | na | na | na |

C

| Syntax element | binIdx | | | | | |
|---|---|---|---|---|---|---|
| | 0 | 1 | 2 | 3 | 4 | >= 5 |
| trSkip_flag[ ][ ] | 0 | na | na | na | na | na |
| tu_mts_idx[ ][ ] | A0 | B1 | B2 | na | na | na |

FIG. 37

| METHOD | NUMBER OF CONTEXTS | NUMBER OF CONTEXT ENCODING BINS | NUMBER OF BYPASS ENCODING BINS | BIN LENGTH OF WORST CASE |
|---|---|---|---|---|
| 0 | 8 | 4 | 0 | 4 |
| 6-1 | 2 | 1 | 2 | 3 |
| 6-2 | 3 | 2 | 1 | 3 |
| 6-3 | 4 | 3 | 0 | 3 |

FIG. 40

| | Descriptor |
|---|---|
| transform_unit( x0, y0, tbWidth, tbHeight, treeType, subTuIndex ) { | |
|   if( treeType == SINGLE_TREE || treeType == DUAL_TREE_LUMA ) { | |
|     if( ( IntraSubPartitionsSplitType == ISP_NO_SPLIT && !( cu_sbt_flag && ( ( subTuIndex == 0 && cu_sbt_pos_flag ) \|\| <br>    ( subTuIndex == 1 && !cu_sbt_pos_flag ) ) ) ) \|\| ( IntraSubPartitionsSplitType != ISP_NO_SPLIT && ( subTuIndex < NumIntraSubPartitions − 1 \|\| <br>    !InferTuCbfLuma ) ) ) | |
|       tu_cbf_luma[ x0 ][ y0 ] | ae(v) |
|     if( IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( treeType == SINGLE_TREE || treeType == DUAL_TREE_CHROMA ) { | |
|     if( ( IntraSubPartitionsSplitType == ISP_NO_SPLIT && !( cu_sbt_flag && <br>    ( ( subTuIndex == 0 && cu_sbt_pos_flag ) \|\| ( subTuIndex == 1 && !cu_sbt_pos_flag ) ) ) ) \|\| ( IntraSubPartitionsSplitType != ISP_NO_SPLIT && <br>    ( subTuIndex == NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   ... | |
|   if( tu_cbf_luma[ x0 ][ y0 ] ) | |
|     transform_mode( x0, y0, tbWidth, tbHeight, 0 ) //parse transform_skp_flag | |
|     residual_coding( x0, y0, Log2( tbWidth ), Log2( tbHeight ), 0 ) | |
|   if( tu_cbf_cb[ x0 ][ y0 ] ) | |
|     transform_mode( x0, y0, tbWidth, tbHeight, 1) //parse transform_skp_flag | |
|     residual_coding( xC, yC, Log2( wC ), Log2( hC ), 1 ) | |
|   if( tu_cbf_cr[ x0 ][ y0 ] ) | |
|     transform_mode( x0, y0, tbWidth, tbHeight, 2) //parse transform_skp_flag | |
|     residual_coding( xC, yC, Log2( wC ), Log2( hC ), 2 ) | |
| } | |

FIG. 41

| | Descriptor |
|---|---|
| transform_mode ( x0, y0, tbWidth, tbHeight, cIdx ) { | |
|   tsAllowed = ( IntraSubPartitionsSplit[ x0 ][ y0 ] = = ISP_NO_SPLIT ) | |
|   && ( !cu_sbt_flag ) ) | |
|   && ( transform_skip_enabled_flag && tbHeight <= maxTsSize && tbHeight <= MaxTsSize ) && (!intra_bdpcm_flag); | |
|   mtsAllowed = ( cIdx = = 0 ) | |
|   && (( CuPredMode[ x0 ][ y0 ] != MODE_INTRA && sps_explicit_mts_inter_enabled_flag ) \|\| | |
|   ( CuPredMode[ x0 ][ y0 ] = = MODE_INTRA && sps_explicit_mts_intra_enabled_flag ) ) | |
|   && ( tbWidth <= MaxMtsSize ) && ( tbHeight <= MaxMtsSize ) | |
|   && ( IntraSubPartitionsSplit[ x0 ][ y0 ] = = ISP_NO_SPLIT ) && ( !cu_sbt_flag ) | |
|   if( tsAllowed ) { | |
|     transform_skip_flag[x0][y0][cIdx] | ae(v) |
|   } | |
|   if( mtsAllowed && !transform_skip_flag[cIdx] && ChromaArrayType>1) { | |
|     tu_mts_idx[x0][y0][cIdx] | ae(v) |
|   } | |

| Syntax element | binIdx | | | | | |
|---|---|---|---|---|---|---|
| | 0 | 1 | 2 | 3 | 4 | >= 5 |
| transform_skip_flag[ ][ ][ ] | (cIdx==0) ? C0 : C1 | na | na | na | na | na |
| tu_mts_idx[ ][ ][ ] | (cIdx==0)? A0 : A1 | Bypass | bypass | bypass | na | na |

B

| Syntax element | binIdx | | | | | |
|---|---|---|---|---|---|---|
| | 0 | 1 | 2 | 3 | 4 | >= 5 |
| transform_skip_flag[ ][ ][ ] | (cIdx==0) ? C0 : C1 | Na | na | na | na | na |
| tu_mts_idx[ ][ ][ ] | (cIdx==0)? A0 : A1 | B1 | bypass | bypass | na | na |

| Syntax element | binIdx | | | | | |
|---|---|---|---|---|---|---|
| | 0 | 1 | 2 | 3 | 4 | >= 5 |
| transform_skip_flag[ ][ ][ ] | (cIdx == 0) ? C0 : C1 | na | na | na | na | na |
| tu_mts_idx[ ][ ][ ] | (cIdx==0)? A0 : A1 | B1 | B2 | bypass | na | na |

B

| Syntax element | binIdx | | | | | |
|---|---|---|---|---|---|---|
| | 0 | 1 | 2 | 3 | 4 | >= 5 |
| transform_skip_flag[ ][ ][ ] | (cIdx == 0) ? C0 : C1 | na | na | na | na | na |
| tu_mts_idx[ ][ ][ ] | (cIdx==0)? A0 : A1 | B1 | B2 | B3 | na | na |

FIG. 44

| METHOD | NUMBER OF CONTEXTS | NUMBER OF CONTEXT ENCODING BINS | NUMBER OF BYPASS ENCODING BINS |
|---|---|---|---|
| 0 | 8 | 4 | 0 |
| 7-1 | 2 | 1 | 3 |
| 7-2 | 3 | 2 | 2 |
| 7-3 | 4 | 3 | 1 |
| 7-4 | 5 | 4 | 0 |

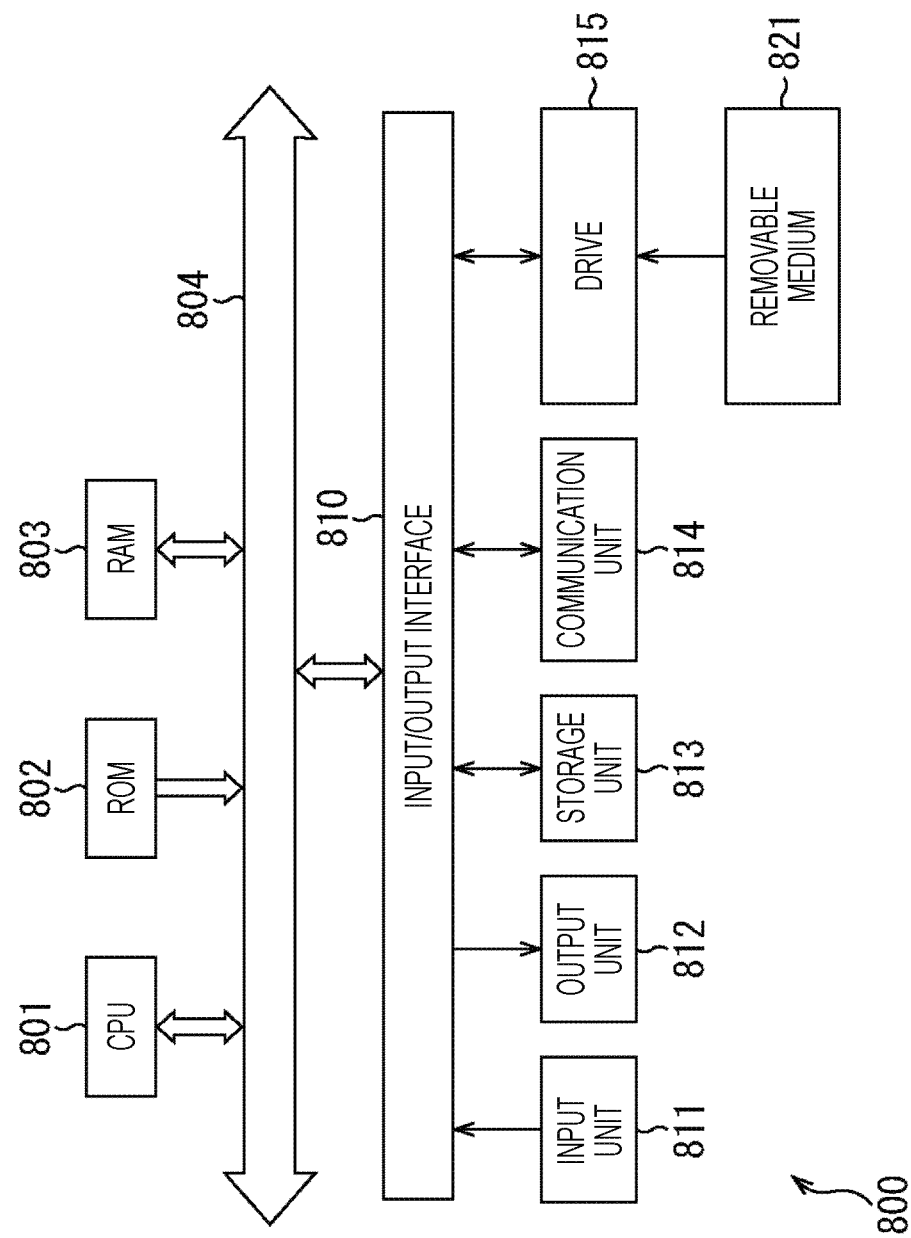

IMAGE PROCESSING DEVICE AND METHOD

CROSS-REFERENCE TO RELATED APPLICATIONS

The present application is a continuation of U.S. application Ser. No. 17/606,460, filed Oct. 26, 2021, which is based on PCT filing PCT/JP2020/018617, filed May 8, 2020, which claims priority to U.S. Provisional Patent Application No. 62/863,396, filed Jun. 19, 2019, the entire contents of each are incorporated herein by reference.

TECHNICAL FIELD

The present disclosure relates to an image processing device and method, and more particularly to an image processing device and method capable of suppressing an increase in load.

BACKGROUND ART

Conventionally, in image encoding, an adaptive orthogonal transform identifier mts_idx has been signaled (encoded/decoded) as mode information regarding adaptive orthogonal transform (multiple transform selection (MTS)). For the encoding of the adaptive orthogonal transform identifier mts_idx, context encoding is applied in which the adaptive orthogonal transform identifier mts_idx is binarized, and a context variable ctx is assigned to each bin of a bin sequence bins to perform arithmetic encoding. Furthermore, the context decoding corresponding to the context encoding is applied to decoding of coded data of the adaptive orthogonal transform identifier mts_idx.

CITATION LIST

Non-Patent Document

Non-Patent Document 1: Benjamin Bross, Jianle Chen, Shan Liu, "Versatile Video Coding (Draft 5)", JVET-N1001v8, Joint Video Experts Team (JVET) of ITU-T SG 16 WP 3 and ISO/IEC JTC 1/SC 29/WG 11 14th Meeting: Geneva, CH, 19-27 Mar. 2019

SUMMARY OF THE INVENTION

Problems to be Solved by the Invention

However, in the case of such a method, there is a possibility that the context variable unnecessarily increases and the memory use amount unnecessarily increases. That is, there is a possibility that the load of encoding processing and decoding processing increase.

The present disclosure has been made in view of the foregoing, and an object is to suppress an increase in load of encoding processing and decoding processing.

Solutions to Problems

An image processing device according to one aspect of the present technology is an image processing device including an encoding unit configured to assign a predetermined context variable to a first bin of a bin sequence obtained by binarizing an adaptive orthogonal transform identifier indicating a mode of adaptive orthogonal transform in image encoding and perform context encoding for the first bin of the bin sequence.

An image processing method according to one aspect of the present technology is an image processing method including assigning a predetermined context variable to a first bin of a bin sequence obtained by binarizing an adaptive orthogonal transform identifier indicating a mode of adaptive orthogonal transform in image encoding and performing context encoding for the first bin of the bin sequence.

An image processing device according to another aspect of the present technology is an image processing device including an encoding unit configured to assign a context variable based on a parameter regarding a block size to a first bin of a bin sequence obtained by binarizing an adaptive orthogonal transform identifier indicating a mode of adaptive orthogonal transform in image encoding, and perform context encoding for the first bin of the bin sequence.

An image processing method according to another aspect of the present technology is an image processing method including assigning a context variable based on a parameter regarding a block size to a first bin of a bin sequence obtained by binarizing an adaptive orthogonal transform identifier indicating a mode of adaptive orthogonal transform in image encoding, and performing context encoding for the first bin of the bin sequence.

In the image processing device and method according to one aspect of the present technology, a predetermined context variable is assigned to a first bin of a bin sequence obtained by binarizing an adaptive orthogonal transform identifier indicating a mode of adaptive orthogonal transform in image encoding and context encoding is performed for the first bin of the bin sequence.

In the image processing device and method according to another aspect of the present technology, a context variable based on a parameter regarding a block size is assigned to a first bin of a bin sequence obtained by binarizing an adaptive orthogonal transform identifier indicating a mode of adaptive orthogonal transform in image encoding, and context encoding is performed for the first bin of the bin sequence.

BRIEF DESCRIPTION OF DRAWINGS

FIG. 1 is a diagram for describing an example of a state of encoding an adaptive orthogonal transform identifier.

FIG. 2 is a diagram for describing an example of a state of encoding an adaptive orthogonal transform identifier.

FIG. 3 is a diagram illustrating an example of assignment of a context variable to each bin of a bin sequence of an adaptive orthogonal transform identifier.

FIG. 4 is a diagram illustrating an example of assignment of a context variable to each bin of a bin sequence of an adaptive orthogonal transform identifier.

FIG. 5 is a diagram illustrating a comparative example of the number of contexts, the number of context encoding bins, and the number of bypass encoding bins of each method.

FIG. 14 is a diagram illustrating an example of assignment of a context variable to each bin of a bin sequence of an adaptive orthogonal transform identifier.

FIG. 15 is a diagram illustrating an example of assignment of a context variable to each bin of a bin sequence of an adaptive orthogonal transform identifier.

FIG. 16 is a diagram illustrating a comparative example of the number of contexts, the number of context encoding bins, and the number of bypass encoding bins of each method.

FIG. 19 is a diagram illustrating an example of assignment of a context variable to each bin of a bin sequence of an adaptive orthogonal transform identifier.

FIG. 20 is a diagram illustrating an example of assignment of a context variable to each bin of a bin sequence of an adaptive orthogonal transform identifier.

FIG. 21 is a diagram illustrating a comparative example of the number of contexts, the number of context encoding bins, and the number of bypass encoding bins of each method.

FIG. 24 is a diagram illustrating an example of assignment of a context variable to each bin of a bin sequence of an adaptive orthogonal transform identifier.

FIG. 25 is a diagram illustrating an example of assignment of a context variable to each bin of a bin sequence of an adaptive orthogonal transform identifier.

FIG. 26 is a diagram illustrating a comparative example of the number of contexts, the number of context encoding bins, and the number of bypass encoding bins of each method.

FIG. 29 is a diagram illustrating an example of assignment of a context variable to each bin of a bin sequence of an adaptive orthogonal transform identifier.

FIG. 30 is a diagram illustrating an example of assignment of a context variable to each bin of a bin sequence of an adaptive orthogonal transform identifier.

FIG. 31 is a diagram illustrating an example of a ratio of an area of a coding block to an area of a CTU.

FIG. 32 is a diagram illustrating a comparative example of the number of contexts, the number of context encoding bins, and the number of bypass encoding bins of each method.

FIG. 35 is a diagram illustrating an example of a state of binarization of an adaptive orthogonal transform identifier.

FIG. 36 is a diagram illustrating an example of assignment of a context variable to each bin of a bin sequence of an adaptive orthogonal transform identifier.

FIG. 37 is a diagram illustrating a comparative example of the number of contexts, the number of context encoding bins, and the number of bypass encoding bins of each method.

FIG. 40 is a diagram illustrating an example of syntax regarding a transform unit.

FIG. 41 is a diagram illustrating an example of syntax regarding an orthogonal transform mode.

FIG. 42 is a diagram illustrating an example of assignment of a context variable to each bin of a bin sequence of an adaptive orthogonal transform identifier.

FIG. 43 is a diagram illustrating an example of assignment of a context variable to each bin of a bin sequence of an adaptive orthogonal transform identifier.

FIG. 44 is a diagram illustrating a comparative example of the number of contexts, the number of context encoding bins, and the number of bypass encoding bins of each method.

FIG. 47 is a block diagram illustrating a main configuration example of a computer.

MODE FOR CARRYING OUT THE INVENTION

Figure 6:
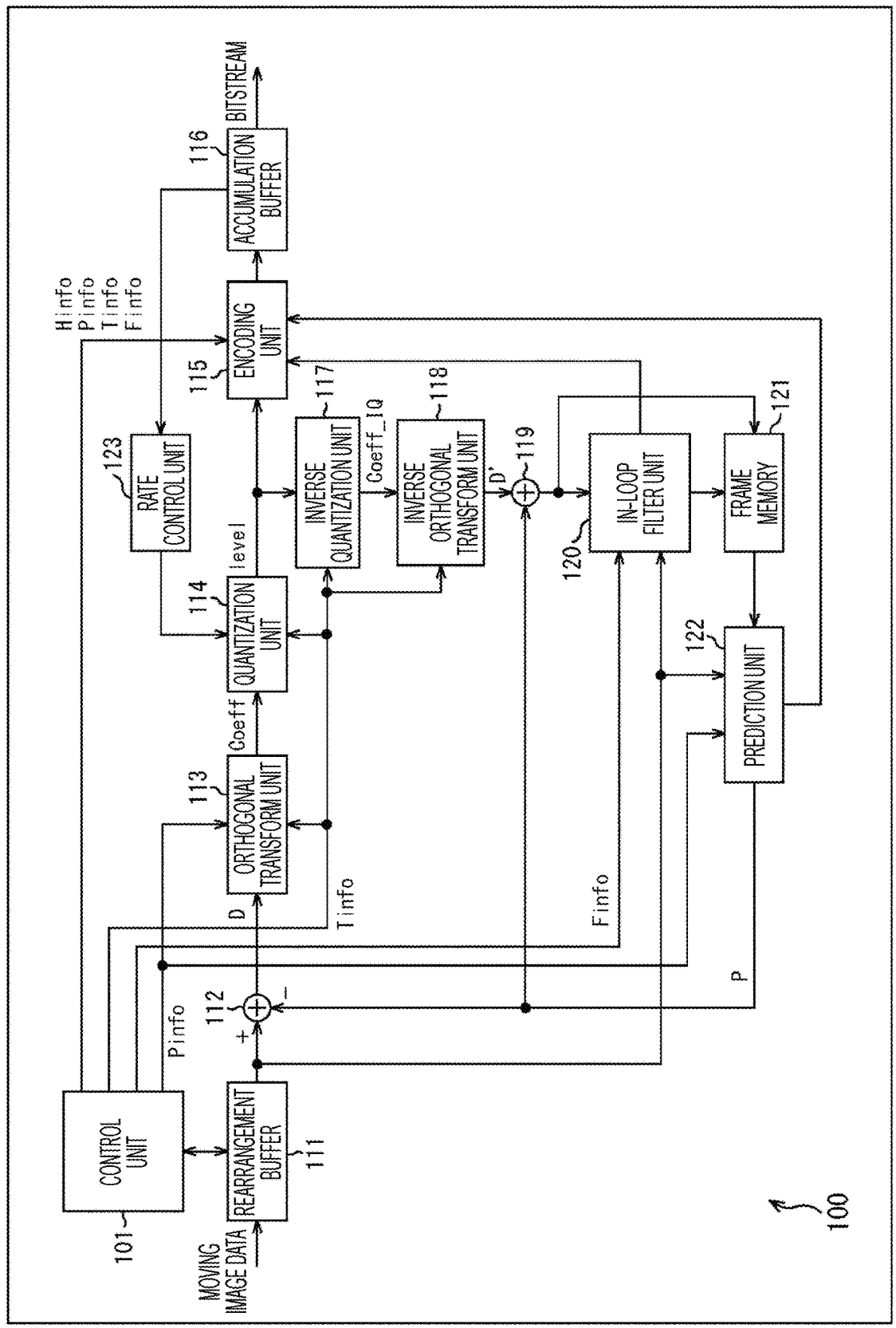
FIG. 6 is a block diagram illustrating a main configuration example of an image encoding device.

Hereinafter, modes for implementing the present disclosure (hereinafter referred to as embodiments) will be described. Note that the description will be given in the following order.
1. Encoding of Adaptive Orthogonal Transform Identifier
2. First Embodiment
3. Second Embodiment
4. Third Embodiment
5. Fourth Embodiment
6. Fifth Embodiment
7. Sixth Embodiment
8. Seventh Embodiment
9. Appendix 1. Encoding of Adaptive Orthogonal Transform Identifier <1-1. Documents that Support Technical Content and Technical Terms, or the Like>

The scope disclosed in the present technology includes not only the content described in the embodiments but also the content described in the following non-patent documents and the like and the content of other documents referred to in the following non-patent documents that are known at the time of filing the application.
Non-Patent Document 1: (described above)
Non-Patent Document 2: Recommendation ITU-T H.264 (04/2017) "Advanced video coding for generic audiovisual services", April 2017
Non-Patent Document 3: Recommendation ITU-T H.265 (12/2016) "High efficiency video coding", December 2016

Non-Patent Document 4: Chen, E. Alshina, G. J. Sullivan, J. -R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

Non-Patent Document 5: Bross, J. Chen, S. Liu, "Versatile Video Coding (Draft 3), "JVET-L1001, Joint Video Experts Team (JVET) of ITU-T SG 16 WP 3 and ISO/IEC JTC 1/SC 29/WG 11 12th Meeting: Macau, CN, 3-12 Oct. 2018

Non-Patent Document 6: J. Chen, Y. Ye, S. Kim, "Algorithm description for Versatile Video Coding and Test Model 3 (VTM 3)", JVET-L1002, Joint Video Experts Team (JVET) of ITU-T SG 16 WP 3 and ISO/IEC JTC 1/SC 29/WG 11 12th Meeting: Macau, CN, 3-12 Oct. 2018

Non-Patent Document 7: Jianle Chen, Yan Ye, Seung Hwan Kim, "Algorithm description for Versatile Video Coding and Test Model 5 (VTM 5)", JVET-N1002-v2, Joint Video Experts Team (JVET) of ITU-T SG 16 WP 3 and ISO/IEC JTC 1/SC 29/WG 11 14th Meeting: Geneva, CH, 19-27 Mar. 2019

Non-Patent Document 8: Moonmo Koo, Jaehyun Lim, Mehdi Salehifar, Seung Hwan Kim, "CE6: Reduced Secondary Transform (RST) (CE6-3.1)", JVET-N0193, Joint Video Experts Team (JVET) of ITU-T SG 16 WP 3 and ISO/IEC JTC 1/SC 29/WG 11 14th Meeting: Geneva, CH, 19-27 Mar. 2019

Non-Patent Document 9: Mischa Siekmann, Martin Winken, Heiko Schwarz, Detlev Marpe "CE6—related: Simplification of the Reduced Secondary Transform", JVET-N0555-v3, Joint Video Experts Team (JVET) of ITU-T SG 16 WP 3 and ISO/IEC JTC 1/SC 29/WG 11 14th Meeting: Geneva, CH, 19-27 Mar. 2019

Non-Patent Document 10: C. Rosewarne, J. Gan, "CE6-related: RST binarization", JVET-N0105-v2, Joint Video Experts Team (JVET) of ITU-T SG 16 WP 3 and ISO/IEC JTC 1/SC 29/WG 11 14th Meeting: Geneva, CH, 19-27 Mar. 2019

That is, the content described in Non-Patent Documents above also serves as a basis for determining the support requirements. For example, the quad-tree block structure described in Non-Patent Documents above and the quad tree plus binary tree (QTBT) block structure fall within the disclosure range of the present technology even if these pieces of content are not directly described in the examples, and satisfy the support requirements of the claims. Furthermore, for example, technical terms such as parsing, syntax, and semantics are similarly fall within the disclosure range of the present technology even in the case where these technical terms are not directly described in the examples, and satisfy the support requirements of claims.

Furthermore, in the present specification, a "block" (not a block indicating a processing unit) used for description as a partial region or a unit of processing of an image (picture) indicates an arbitrary partial region in a picture unless otherwise specified, and the size, shape, characteristics, and the like of the block are not limited. For example, the "block" includes an arbitrary partial region (unit of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a transform block, a subblock, a macro block, a tile, or a slice, described in Non-Patent Documents above.

Furthermore, in specifying the size of such a block, not only the block size is directly specified but also the block size may be indirectly specified. For example, the block size may be specified using identification information for identifying the size. Furthermore, for example, the block size may be specified by a ratio or a difference from the size of a reference block (for example, an LCU, an SCU, or the like). For example, in a case of transmitting information for specifying the block size as a syntax element or the like, information for indirectly specifying the size as described above may be used as the information. With the configuration, the amount of information can be reduced, and the encoding efficiency can be improved in some cases. Furthermore, the specification of the block size also includes specification of a range of the block size (for example, specification of a range of an allowable block sizes, or the like).

Furthermore, in the present specification, encoding includes not only the whole processing of transforming an image into a bitstream but also part of the processing. For example, encoding includes not only processing that includes prediction processing, orthogonal transform, quantization, arithmetic encoding, and the like but also processing that collectively refers to quantization and arithmetic encoding, processing including prediction processing, quantization, and arithmetic encoding, and the like. Similarly, decoding includes not only the whole processing of transforming a bitstream into an image but also part of the processing. For example, decoding includes not only processing including inverse arithmetic decoding, inverse quantization, inverse orthogonal transform, prediction processing, and the like but also processing including inverse arithmetic decoding and inverse quantization, processing including inverse arithmetic decoding, inverse quantization, and prediction processing, and the like.

<1-2. Context Encoding/Context Decoding of Adaptive Orthogonal Transform Identifier>

Conventionally, in image encoding and decoding, an adaptive orthogonal transform identifier mts_idx has been signaled (encoded/decoded) as mode information regarding adaptive orthogonal transform (multiple transform selection (MTS)). Context encoding using context as follows has been applied to the encoding of the adaptive orthogonal transform identifier mts_idx.

First, as in a table illustrated in A of FIG. 1, the adaptive orthogonal transform identifier mts_idx is binarized by a truncated unary (TU) code to obtain a bin sequence bins. Note that the TU code is equivalent to a truncated rice (TR) code with a rice parameter cRiceParam=0.

Next, arithmetic encoding is performed with reference to a context variable ctx corresponding to each binIdx (index indicating a bin number) of the bin sequence bins obtained by the TR. An index for identifying the context variable ctx is referred to as ctxInc (or ctxIdx).

Specifically, as in a table illustrated in B of FIG. 1, the context variable ctx one-to-one corresponding to a value of a COT division depth cqtDepth representing the depth of division for the CTU by quad-tree of CU is assigned to the first bin of the bin sequence (binIdx=0). In the example in B of FIG. 1, a smaller one of the CQT division depth cqtDepth and 5 is set to the context index ctxInc corresponding to the first bin of the bin sequence (binIdx=0) (ctxInc=min (cqtDepth, 5)). That is, since there is a possibility that an output (frequency) of 0 order 1 in the adaptive orthogonal transform changes according to the division depth, the context is also variable correspondingly in order to improve the efficiency.

Furthermore, a context variable ctx (in the example in B of FIG. 1, ctxInc=6 to 8) one-to-one corresponding to each binIdx is assigned to the second to fourth bins (binIdx=1 to 3) of the bin sequence bins.

Note that each bin in the bin sequence bins of the adaptive orthogonal transform identifier mts_idx can be interpreted as a flag corresponding to a transform type, as in a table illustrated in A of FIG. 2. In this example, the value of the first bin (binIdx=0) corresponds to a flag (0 indicates Yes and 1 indicates No) indicating whether or not the transform type is DCT2×DCT2, the value of the second bin (binIdx=1) corresponds to a flag (0 indicates Yes and 1 indicates No) indicating whether or not the transform type is DST7×DST7, the value of the third bin (binIdx=2) corresponds to a flag (0 indicates Yes and 1 indicates No) indicating whether or not the transform type is DCT8×DST7, and the value of the fourth bin (binIdx=3) corresponds to a flag (0 indicates Yes and 1 indicates No) indicating whether or not the transform type is DST7×DCT8.

The coded data of the adaptive orthogonal transform identifier mts_idx has been decoded by a method corresponding to such encoding. That is, context decoding using context has been applied.

However, in the case of such context encoding and context decoding, there is a possibility of an increase in processing load.

For example, the adaptive orthogonal transform identifier mts_idx does not occur in the case of a specific value of the COT division depth cqtDepth. Therefore, there is a context variable ctx that is not used at all, and there is a possibility that the memory use amount unnecessarily increases due to the context variable ctx (there is a possibility that the memory capacity required for processing increases).

For example, in the case where all the CU division are performed with quad-tree, the CU size corresponding to each COT division depth cqtDepth in the case of the CTU size=128×128 is as illustrated in a table in B of FIG. 2. Since the adaptive orthogonal transform is not applied for blocks larger than 32×32, the adaptive orthogonal transform identifier mts_idx does not occur for the CUS of 128×128 and 64×64. Therefore, ctxInc=0 and 1 are not used at all among the context variables ctx corresponding to the first bin of the bin sequence bins of the adaptive orthogonal transform identifier mts_idx. That is, there is a possibility of an unnecessary increase in the memory use amount due to these context variables ctx.

Therefore, a predetermined context variable is assigned to a first bin of a bin sequence obtained by binarizing an adaptive orthogonal transform identifier indicating a mode of adaptive orthogonal transform in image encoding and context encoding is performed for the first bin of the bin sequence.

By doing so, an increase in the number of contexts assigned to the bin sequence of the adaptive orthogonal transform identifier can be suppressed, and thus an increase in the memory use amount can be suppressed and an increase in the load of the encoding processing and the decoding processing can be suppressed.

Furthermore, the context variable based on a parameter regarding a block size is assigned to a first bin of a bin sequence obtained by binarizing the adaptive orthogonal transform identifier indicating a mode of adaptive orthogonal transform in image encoding, and context encoding is performed for the first bin of the bin sequence.

By doing so, an increase in the number of contexts assigned to the bin sequence of the adaptive orthogonal transform identifier can be suppressed, and thus an increase in the memory use amount can be suppressed and an increase in the load of the encoding processing and the decoding processing can be suppressed.

<1-3. Bypass Encoding>

Furthermore, selectivity of the transform types is, in descending order, discrete cosine transform (DCT) 2×DCT2, discrete sine transform (DST) 7×DST7, DCT8×DST7, DST7×DCT8, or DCT8×DCT8. That is, the selectivity of each transform type is not uniform. Therefore, it is inefficient to similarly assign the context variable ctx for all the transform types, which may unnecessarily increase the total number of context encoding bins. As described above, each bin of the bin sequence bins of the adaptive orthogonal transform identifier mts_idx can be interpreted as a flag corresponding to a transform type. That is, it is inefficient to similarly assign the context variable ctx to each bin of the bin sequence bins, which may unnecessarily increase the total number of context encoding bins.

As the total number of context encoding bins increases in this manner, there has been a possibility that a processing amount (throughput) of context-based adaptive binary arithmetic code (CABAC) increases.

Therefore, bypass encoding is applied to a bin corresponding to a transform type with relatively low selectivity. By doing so, it is possible to suppress an increase in the number of context encoding bins and to suppress an increase in the processing amount (throughput) of CABAC while suppressing a decrease in the encoding efficiency. That is, an increase in the load of the encoding processing and the decoding processing can be suppressed.

2. First Embodiment

<2-1. Encoding of Adaptive Orthogonal Transform Identifier>

In the present embodiment, assignment (method 0) of a context variable to each bin of a bin sequence obtained by binarizing an adaptive orthogonal transform identifier indicating a mode of adaptive orthogonal transform in image encoding, which has been performed as in the table illustrated in B of FIG. 1, is performed as follows.

That is, a predetermined context variable (fixed (one-to-one corresponding) context variable) ctx is assigned to the first bin of the bin sequence and context encoding is performed for the first bin (method 1).

For example, as in a table illustrated in A of FIG. 3, a predetermined context variable (an index ctxInc for identifying a context variable ctx) may be assigned to the first bin of the bin sequence obtained by binarizing the adaptive orthogonal transform identifier and context encoding may be performed for the first bin, and bypass encoding may be performed for the second to fourth bins of the bin sequence (method 1-1).

In the case of the example in A of FIG. 3, the index ctxInc=A0 is assigned to the first bin (binIdx=0) of the bin sequence of the adaptive orthogonal transform identifier and context encoding is performed for the first bin, and bypass encoding (bypass) is performed for the second to fourth bins (binIdx=1 to 3).

Furthermore, for example, as in the table illustrated in B of FIG. 3, predetermined context variables ctx (indexes ctxInc) different from each other may be assigned to the first and second bins of the bin sequence obtained by binarizing the adaptive orthogonal transform identifier, and context encoding may be performed for the first and second bins, and bypass encoding may be performed for the third and fourth bins of the bin sequence (method 1-2).

In the case of the example in B of FIG. 3, the index ctxInc=A0 is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, and bypass encoding (bypass) is performed for the third and fourth bins (binIdx=2 and 3).

Moreover, for example, as in a table illustrated in A of FIG. 4, predetermined context variables ctx (indexes ctxInc) different from one another may be assigned to the first to third bins of the bin sequence obtained by binarizing the adaptive orthogonal transform identifier, and context encoding may be performed for the first to third bins, and bypass encoding may be performed for the fourth bin of the bin sequence (method 1-3).

In the case of the example in A of FIG. 4, the index ctxInc=A0 is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and bypass encoding (bypass) is performed for the fourth bin (binIdx=3).

Moreover, for example, as in a table illustrated in B of FIG. 4, predetermined context variables ctx (indexes ctxInc) different from one another may be assigned to the first to fourth bins of the bin sequence obtained by binarizing the adaptive orthogonal transform identifier, and context encoding may be performed for the first to fourth bins (method 1-4).

In the case of the example in B of FIG. 4, the index ctxInc=A0 is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and the index ctxInc=B3 is assigned to the fourth bin (binIdx=3) and context encoding is performed for the fourth bin.

Note that, in the tables of FIGS. 3 and 4, non-overlapping unique values are set in the indexes A0, B1, B2, and B3.

Examples of the number of contexts, the number of context encoding bins, and the number of bypass encoding bins for each of these methods are illustrated in the table of FIG. 5. For example, in the case of the method 0, the number of contexts is 9, the number of context encoding bins is 4, and the number of bypass encoding bins is 0. In contrast, in the case of the method 1-1, the number of contexts is 1, the number of context encoding bins is 1, and the number of bypass encoding bins is 3. Furthermore, in the case of the method 1-2, the number of contexts is 2, the number of context encoding bins is 2, and the number of bypass encoding bins is 2. Moreover, in the case of the method 1-3, the number of contexts is 3, the number of context encoding bins is 3, and the number of bypass encoding bins is 1. Furthermore, in the case of the method 1-4, the number of contexts is 4, the number of context encoding bins is 4, and the number of bypass encoding bins is 0.

As described above, in any case of the method 1-1 to the method 1-4, the number of contexts required for encoding can be reduced as compared with the case of the method 0. That is, by applying the method 1, the number of contexts assigned to the first bin (binIdx=0) can be reduced. Therefore, an increase in the memory use amount can be suppressed.

Furthermore, in any case of the method 1-1 to the method 1-3, the number of context encoding bins required for encoding can be reduced as compared with the case of the method 0. Note that, in the case of the method 1-4, the number of context encoding bins required for encoding is equivalent to that in the case of the method 0. That is, by applying the method 1, the bypass encoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 1, an increase in the load of the encoding processing can be suppressed.

<2-2. Decoding of Adaptive Orthogonal Transform Identifier>

Similarly, in the case of decoding, assignment (method 0) of a context variable to each bin of a bin sequence of a binarized adaptive orthogonal transform identifier indicating a mode of inverse adaptive orthogonal transform in image decoding, which has been performed as in the table illustrated in B of FIG. 1, is performed as follows.

That is, a predetermined context variable (fixed (one-to-one corresponding) context variable) ctx is assigned to the first bin of the bin sequence and context decoding is performed for the first bin (method 1).

For example, as in the table illustrated in A of FIG. 3, the predetermined context variable (the index ctxInc for identifying the context variable ctx) may be assigned to the first bin of the bin sequence of the binarized adaptive orthogonal transform identifier and context decoding may be performed for the first bin, and bypass decoding may be performed for the second to fourth bins of the bin sequence (method 1-1).

In the case of the example in A of FIG. 3, the index ctxInc=A0 is assigned to the first bin (binIdx=0) of the bin sequence of the adaptive orthogonal transform identifier and context decoding is performed for the first bin, and bypass decoding (bypass) is performed for the second to fourth bins (binIdx=1 to 3).

Furthermore, for example, as in the table illustrated in B of FIG. 3, predetermined context variables ctx (indexes ctxInc) different from each other may be assigned to the first and second bins of the bin sequence of the binarized adaptive orthogonal transform identifier, and context decoding may be performed for the first and second bins, and bypass decoding may be performed for the third and fourth bins of the bin sequence (method 1-2).

In the case of the example in B of FIG. 3, the index ctxInc=A0 is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, and bypass decoding (bypass) is performed for the third and fourth bins (binIdx=2 and 3).

Moreover, for example, as in the table illustrated in A of FIG. 4, predetermined context variables ctx (indexes ctxInc) different from one another may be assigned to the first to third bins of the bin sequence of the binarized adaptive orthogonal transform identifier, and context decoding may be performed for the first to third bins, and bypass decoding may be performed for the fourth bin of the bin sequence (method 1-3).

In the case of the example in A of FIG. 4, the index ctxInc=A0 is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and bypass decoding (bypass) is performed for the fourth bin (binIdx=3).

Moreover, for example, as in the table illustrated in B of FIG. 4, predetermined context variables ctx (indexes ctxInc) different from one another may be assigned to the first to fourth bins of the bin sequence of the binarized adaptive orthogonal transform identifier, and context decoding may be performed for the first to fourth bins (method 1-4).

In the case of the example in B of FIG. 4, the index ctxInc=A0 is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and the index ctxInc=B3 is assigned to the fourth bin (binIdx=3) and context decoding is performed for the fourth bin.

Note that, even in the case of decoding, non-overlapping unique values are set in the indexes A0, B1, B2, and B3 in the tables of FIGS. 3 and 4, similarly to the case of encoding.

The number of contexts, the number of context encoding bins, and the number of bypass encoding bins for each of these methods are similar to those for encoding (FIG. 5).

As described above, in any case of the method 1-1 to the method 1-4, the number of contexts required for decoding can be reduced as compared with the case of the method 0. That is, by applying the method 1, the number of contexts assigned to the first bin (binIdx=0) can be reduced. Therefore, an increase in the memory use amount can be suppressed.

Furthermore, in any case of the method 1-1 to the method 1-3, the number of context encoding bins required for decoding can be reduced as compared with the case of the method 0. Note that, in the case of the method 1-4, the number of context encoding bins required for decoding is equivalent to that in the case of the method 0. That is, by applying the method 1, the bypass decoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 1, an increase in the load of the decoding processing can be suppressed.

<2-3. Encoding Side>
<Image Encoding Device>

Next, the encoding side will be described. FIG. 6 is a block diagram illustrating an example of a configuration of an image encoding device that is one mode of an image processing device to which the present technology is applied. An image encoding device 100 illustrated in FIG. 6 is a device that encodes image data of a moving image. For example, the image encoding device 100 encodes image data of a moving image by the encoding method described in any one of Non-Patent Documents 1 to 10.

Note that FIG. 6 illustrates main processing units (blocks), data flows, and the like, and those illustrated in FIG. 6 are not necessarily everything. That is, in the image encoding device 100, there may be a processing unit not illustrated as a block in FIG. 6, or processing or data flow not illustrated as an arrow or the like in FIG. 6.

As illustrated in FIG. 6, the image encoding device 100 includes a control unit 101, a rearrangement buffer 111, a calculation unit 112, an orthogonal transform unit 113, a quantization unit 114, an encoding unit 115, an accumulation buffer 116, an inverse quantization unit 117, an inverse orthogonal transform unit 118, a calculation unit 119, an in-loop filter unit 120, a frame memory 121, a prediction unit 122, and a rate control unit 123.

<Control Unit>

The control unit 101 divides moving image data held by the rearrangement buffer 111 into blocks (CUs, PUS, transformation blocks, or the like) in units of processing on the basis of a block size in external or pre-designated units of processing. Furthermore, the control unit 101 determines encoding parameters (header information Hinfo, prediction mode information Pinfo, transform information Tinfo, filter information Finfo, and the like) to be supplied to each block on the basis of, for example, rate-distortion optimization (RDO).

Details of these encoding parameters will be described below. After determining the above-described encoding parameters, the control unit 101 supplies the encoding parameters to each block. Specifically, the encoding parameters are as follows.

The header information Hinfo is supplied to each block.

The prediction mode information Pinfo is supplied to the encoding unit 115 and the prediction unit 122.

The transform information Tinfo is supplied to the encoding unit 115, the orthogonal transform unit 113, the quantization unit 114, the inverse quantization unit 117, and the inverse orthogonal transform unit 118.

The filter information Finfo is supplied to the in-loop filter unit 120.

<Rearrangement Buffer>

Each field (input image) of the moving image data is input to the image encoding device 100 in reproduction order (display order). The rearrangement buffer 111 acquires and holds (stores) each input image in its reproduction order (display order). The rearrangement buffer 111 rearranges the input images in encoding order (decoding order) or divides the input images into blocks in units of processing on the basis of the control of the control unit 101. The rearrangement buffer 111 supplies the processed input image to the calculation unit 112. Furthermore, the rearrangement buffer 111 also supplies the input images (original images) to the prediction unit 122 and the in-loop filter unit 120.

<Calculation Unit>

The calculation unit 112 receives an image I corresponding to the block in units of processing and a predicted image P supplied from the prediction unit 122 as inputs, subtracts the predicted image P from the image I as illustrated in the following expression to derive a prediction residual D, and supplies the prediction residual D to the orthogonal transform unit 113.

$$D = I - P$$

<Orthogonal Transform Unit>

The orthogonal transform unit 113 uses the prediction residual D supplied from the calculation unit 112 and the transform information Tinfo supplied from the control unit 101 as inputs, and orthogonally transforms the prediction residual D on the basis of the transform information Tinfo to derive a transform coefficient Coeff. Note that the orthogonal transform unit 113 can perform adaptive orthogonal transform for adaptively selecting the type (transform coefficient) of the orthogonal transform. The orthogonal transform unit 113 supplies the obtained transform coefficient Coeff to the quantization unit 114.

<Quantization Unit>

The quantization unit 114 uses the transform coefficient Coeff supplied from the orthogonal transform unit 113 and the transform information Tinfo supplied from the control unit 101 as inputs, and scales (quantizes) the transform coefficient Coeff on the basis of the transform information Tinfo. Note that a rate of this quantization is controlled by the rate control unit 123. The quantization unit 114 supplies a quantized transform coefficient obtained by the quantization, that is, a quantized transform coefficient level "level" to the encoding unit 115 and the inverse quantization unit 117.

<Encoding Unit>

The encoding unit 115 uses, as inputs, the quantized transform coefficient level "level" supplied from the quantization unit 114, the various encoding parameters (header information Hinfo, prediction mode information Pinfo, transform information Tinfo, filter information Finfo, and the like) supplied from the control unit 101, information regarding a filter such as a filter coefficient supplied from the in-loop filter unit 120, and information regarding an optimal prediction mode supplied from the prediction unit 122. The encoding unit 115 performs variable-length coding (for example, arithmetic encoding) for the quantized transform coefficient level "level" to generate a bit string (coded data).

Furthermore, the encoding unit 115 derives residual information Rinfo from the quantized transform coefficient level "level", and encodes the residual information Rinfo to generate a bit string.

Moreover, the encoding unit 115 includes the information regarding a filter supplied from the in-loop filter unit 120 to the filter information Finfo, and includes the information regarding an optimal prediction mode supplied from the prediction unit 122 to the prediction mode information Pinfo. Then, the encoding unit 115 encodes the above-described various encoding parameters (header information Hinfo, prediction mode information Pinfo, transform information Tinfo, filter information Finfo, and the like) to generate a bit string.

Furthermore, the encoding unit 115 multiplexes the bit string of the various types of information generated as described above to generate coded data. The encoding unit 115 supplies the coded data to the accumulation buffer 116.

<Accumulation Buffer>

The accumulation buffer 116 temporarily stores the coded data obtained by the encoding unit 115. The accumulation buffer 116 outputs the stored coded data to an outside of the image encoding device 100 as a bitstream or the like at predetermined timing. For example, the coded data is transmitted to a decoding side via an arbitrary recording medium, an arbitrary transmission medium, an arbitrary information processing device, or the like. That is, the accumulation buffer 116 is also a transmission unit that transmits coded data (bitstream).

<Inverse Quantization Unit>

The inverse quantization unit 117 performs processing regarding inverse quantization. For example, the inverse quantization unit 117 uses the quantized transform coefficient level "level" supplied from the quantization unit 114 and the transform information Tinfo supplied from the control unit 101 as inputs, and scales (inversely quantizes) the value of the quantized transform coefficient level "level" on the basis of the transform information Tinfo. Note that the inverse quantization is inverse processing of the quantization performed in the quantization unit 114.

The inverse quantization unit 117 supplies a transform coefficient Coeff IQ obtained by the inverse quantization to the inverse orthogonal transform unit 118. Note that, since the inverse orthogonal transform unit 118 is similar to an inverse orthogonal transform unit on the decoding side (to be described below), description (to be described below) to be given for the decoding side can be applied to the inverse quantization unit 117.

<Inverse Orthogonal Transform Unit>

The inverse orthogonal transform unit 118 performs processing regarding inverse orthogonal transform. For example, the inverse orthogonal transform unit 118 uses the transform coefficient Coeff IQ supplied from the inverse quantization unit 117 and the transform information Tinfo supplied from the control unit 101 as inputs, and inversely orthogonally transforms the transform coefficient Coeff IQ on the basis of the transform information Tinfo to derive a prediction residual D'. Note that the inverse orthogonal transform is inverse processing of the orthogonal transform performed in the orthogonal transform unit 113. That is, the inverse orthogonal transform unit 118 can perform adaptive inverse orthogonal transform for adaptively selecting the type (transform coefficient) of the inverse orthogonal transform.

The inverse orthogonal transform unit 118 supplies the prediction residual D' obtained by the inverse orthogonal transform to the calculation unit 119. Note that, since the inverse orthogonal transform unit 118 is similar to an inverse orthogonal transform unit on the decoding side (to be described below), description (to be described below) to be given for the decoding side can be applied to the inverse orthogonal transform unit 118.

<Calculation Unit>

The calculation unit 119 uses the prediction residual D' supplied from the inverse orthogonal transform unit 118 and the predicted image P supplied from the prediction unit 122 as inputs. The calculation unit 119 adds the prediction residual D' and the predicted image P corresponding to the prediction residual D' to derive a locally decoded image Rlocal. The calculation unit 119 supplies the derived locally decoded image Rlocal to the in-loop filter unit 120 and the frame memory 121.

<In-Loop Filter Unit>

The in-loop filter unit 120 performs processing regarding in-loop filter processing. For example, the in-loop filter unit 120 uses the locally decoded image Rlocal supplied from the calculation unit 119, the filter information Finfo supplied from the control unit 101, and the input image (original image) supplied from the rearrangement buffer 111 as inputs. Note that the information input to the in-loop filter unit 120 is arbitrary, and information other than the aforementioned information may be included. For example, information such as the prediction mode, motion information, a code amount target value, a quantization parameter QP, a picture type, a block (a CU, a CTU, or the like) may be input to the in-loop filter unit 120, as necessary.

The in-loop filter unit 120 appropriately performs filtering processing for the locally decoded image Rlocal on the basis of the filter information Finfo. The in-loop filter unit 120 also uses the input image (original image) and other input information for the filtering processing as necessary.

For example, the in-loop filter unit 120 applies four in-loop filters of a bilateral filter, a deblocking filter (DBF), an adaptive offset filter (sample adaptive offset (SAO)), and an adaptive loop filter (adaptive loop filter (ALF)) in this order. Note that which filter is applied and in which order the filters are applied are arbitrary and can be selected as appropriate.

Of course, the filtering processing performed by the in-loop filter unit 120 is arbitrary, and is not limited to the above example. For example, the in-loop filter unit 120 may apply a Wiener filter or the like.

The in-loop filter unit 120 supplies the filtered locally decoded image Rlocal to the frame memory 121. Note that, in a case of transmitting the information regarding filters such as filter coefficients to the decoding side, the in-loop filter unit 120 supplies the information regarding filters to the encoding unit 115.

<Frame Memory>

The frame memory 121 performs processing regarding storage of data relating to an image. For example, the frame memory 121 uses the locally decoded image Rlocal supplied from the calculation unit 119 and the filtered locally decoded image Rlocal supplied from the in-loop filter unit 120 as inputs, and holds (stores) the inputs. Furthermore, the frame memory 121 reconstructs and holds a decoded image R for each picture unit, using the locally decoded image Rlocal (stores the decoded image R in a buffer in the frame memory 121). The frame memory 121 supplies the decoded image R (or a part thereof) to the prediction unit 122 in response to a request from the prediction unit 122.

<Prediction Unit>

The prediction unit 122 performs processing regarding generation of a predicted image. For example, the prediction unit 122 uses, as inputs, the prediction mode information Pinfo supplied from the control unit 101, the input image (original image) supplied from the rearrangement buffer 111, and the decoded image R (or a part thereof) read from the frame memory 121. The prediction unit 122 performs prediction processing such as inter prediction, intra prediction, or the like, using the prediction mode information Pinfo and the input image (original image), performs prediction, using the decoded image R as a reference image, performs motion compensation processing on the basis of a prediction result, and generates a predicted image P. The prediction unit 122 supplies the generated predicted image P to the calculation units 112 and 119. Furthermore, the prediction unit 122 supplies a prediction mode selected by the above processing, that is, the information regarding an optimal prediction mode to the encoding unit 115, as necessary.

<Rate Control Unit>

The rate control unit 123 performs processing regarding rate control. For example, the rate control unit 123 controls a rate of a quantization operation of the quantization unit 114 so that an overflow or an underflow does not occur on the basis of the code amount of the coded data accumulated in the accumulation buffer 116.

Note that these processing units (the control unit 101, and the rearrangement buffer 111 to the rate control unit 123) have an arbitrary configuration. For example, each processing unit may be configured by a logic circuit that implements the above-described processing. Furthermore, each processing unit may include, for example, a central processing unit (CPU), a read only memory (ROM), a random access memory (RAM), and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Encoding Unit>

Figure 7:
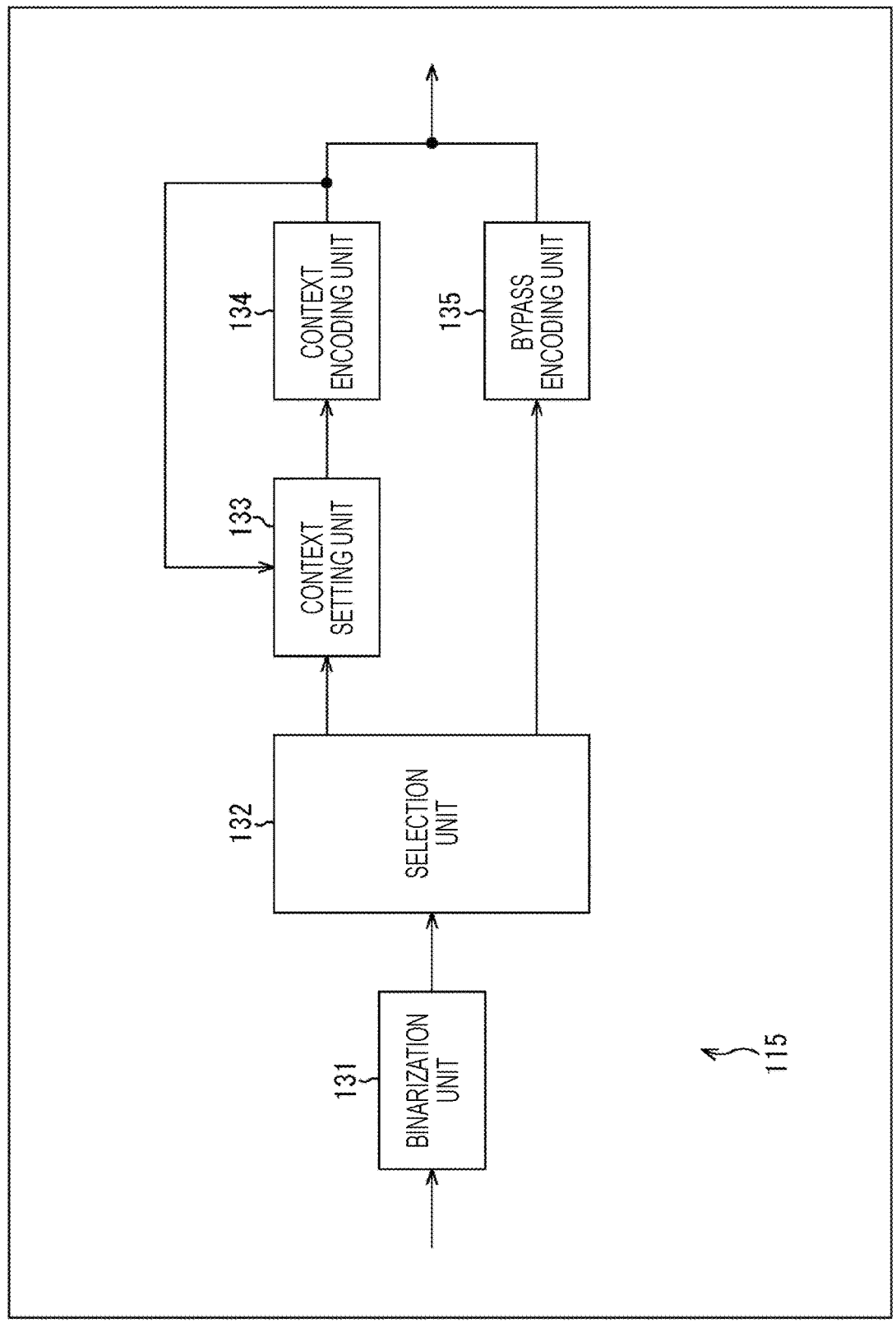
FIG. 7 is a block diagram illustrating a main configuration example of an encoding unit.

FIG. 7 is a block diagram illustrating a main configuration example of the encoding unit 115 in FIG. 6. As illustrated in FIG. 7, the encoding unit 115 includes a binarization unit 131, a selection unit 132, a context setting unit 133, a context encoding unit 134, and a bypass encoding unit 135.

Note that, although encoding of the adaptive orthogonal transform identifier is described here, the encoding unit 115 also encodes other encoding parameters, residual information Rinfo, and the like as described above. The encoding unit 115 encodes the adaptive orthogonal transform identifier by applying the method 1 described in <2-1. Encoding of adaptive orthogonal transform identifier>.

The binarization unit 131 performs processing regarding binarization of the adaptive orthogonal transform identifier. For example, the binarization unit 131 acquires the adaptive orthogonal transform identifier mts_idx supplied from the control unit 101. Furthermore, the binarization unit 131 binarizes the adaptive orthogonal transform identifier with a truncated unary code (or truncated rice code) to generate the bin sequence. Moreover, the binarization unit 131 supplies the generated bin sequence to the selection unit 132.

The selection unit 132 performs processing regarding selection of a supply destination of each bin of the bin sequence of the adaptive orthogonal transform identifier. For example, the selection unit 132 acquires the bin sequence of the adaptive orthogonal transform identifier supplied from the binarization unit 131.

Furthermore, the selection unit 132 selects, for each bin of the bin sequence of the acquired adaptive orthogonal transform identifier, whether to set the supply destination to the context setting unit 133 or the bypass encoding unit 135. The selection unit 132 performs the selection according to the method 1 described above in <2-1. Encoding of adaptive orthogonal transform identifier>. For example, the selection unit 132 may perform the selection according to the method 1-1 (that is, the table illustrated in A of FIG. 3). Furthermore, the selection unit 132 may perform the selection according to the method 1-2 (that is, the table illustrated in B of FIG. 3). Moreover, the selection unit 132 may perform the selection according to the method 1-3 (that is, the table illustrated in A of FIG. 4). Furthermore, the selection unit 132 may perform the selection according to the method 1-4 (that is, the table illustrated in B of FIG. 4).

In the case of assigning the context variable (index ctxInc) and performing context encoding, the selection unit 132 supplies the bin to the context setting unit 133. In the case of bypass encoding, the selection unit 132 supplies the bin to the bypass encoding unit 135.

The context setting unit 133 performs processing regarding context setting. For example, the context setting unit 133 acquires the bin supplied from the selection unit 132. The context setting unit 133 assigns the context variable (index ctxInc) to the bin. The context setting unit 133 performs the assignment according to the method 1 described above in <2-1. Encoding of adaptive orthogonal transform identifier>. For example, the context setting unit 133 may perform the assignment according to the method 1-1 (that is, the table illustrated in A of FIG. 3). Furthermore, the context setting unit 133 may perform the assignment according to the method 1-2 (that is, the table illustrated in B of FIG. 3). Moreover, the context setting unit 133 may perform the assignment according to the method 1-3 (that is, the table illustrated in A of FIG. 4). Furthermore, the context setting unit 133 may perform the assignment according to the method 1-4 (that is, the table illustrated in B of FIG. 4).

Furthermore, the context setting unit 133 can acquire a coding result from the context encoding unit 134. The context setting unit 133 can appropriately update the context variable (index ctxInc) using the coding result. The context setting unit 133 supplies the context variable (index ctxInc) derived in this manner to the context encoding unit 134.

The context encoding unit 134 performs processing regarding arithmetic encoding. For example, the context encoding unit 134 acquires the context variable (index ctxInc) supplied from the context setting unit 133. Furthermore, the context encoding unit 134 performs arithmetic encoding using the context variable (index ctxInc). That is, context encoding is performed. Moreover, the context encoding unit 134 supplies the coding result to the accumulation buffer 116 as coded data.

The bypass encoding unit 135 performs processing regarding bypass encoding. For example, the bypass encoding unit 135 acquires the bin supplied from the selection unit 132. The bypass encoding unit 135 performs bypass encoding (arithmetic encoding) for the bin. The bypass encoding unit 135 supplies the coding result to the accumulation buffer 116 as coded data.

As each of the processing units (the binarization unit 131 to the bypass encoding unit 135) performs the processing as described above, the encoding unit 115 can encode the adaptive orthogonal transform identifier by applying the method 1 (for example, any one of the method 1-1 to method 1-4). Therefore, an increase in the memory use amount can be suppressed. Furthermore, an increase in the processing amount (throughput) can be suppressed. That is, an increase in the load of the encoding processing can be suppressed.

<Flow of Image Encoding Processing>

Next, an example of a flow of image encoding processing executed by the image encoding device 100 having the above configuration will be described with reference to a flowchart of FIG. 8.

When the image encoding processing is started, in step S101, the rearrangement buffer 111 is controlled by the control unit 101 and rearranges frames of input moving image data from the display order to the encoding order.

In step S102, the control unit 101 sets the unit of processing (performs block division) for an input image held by the rearrangement buffer 111.

In step S103, the control unit 101 determines (sets) an encoding parameter for the input image held by the rearrangement buffer 111.

In step S104, the prediction unit 122 performs the prediction processing and generates a predicted image or the like in the optimal prediction mode. For example, in the prediction processing, the prediction unit 122 performs the intra prediction to generate a predicted image in an optimal intra prediction mode, performs the inter prediction to generate a predicted image in an optimal inter prediction mode, and selects an optimal prediction mode from among the predicted images on the basis of a cost function value and the like.

In step S105, the calculation unit 112 calculates a difference between the input image and the predicted image in the optimal mode selected by the prediction processing in step S104. That is, the calculation unit 112 generates the prediction residual D between the input image and the predicted image. The prediction residual D obtained in this way is reduced in the data amount as compared with the original image data. Therefore, the data amount can be compressed as compared with a case of encoding the image as it is.

In step S106, the orthogonal transform unit 113 performs orthogonal transform processing for the prediction residual D generated by the processing in step S105 to derive the transform coefficient Coeff.

In step S107, the quantization unit 114 quantizes the transform coefficient Coeff obtained by the processing in step S106 by using a quantization parameter calculated by the control unit 101 or the like to derive the quantized transform coefficient level "level".

In step S108, the inverse quantization unit 117 inversely quantizes the quantized transform coefficient level "level" generated by the processing in step S107 with characteristics corresponding to the characteristics of the quantization in step S107 to derive the transform coefficient Coeff IQ.

In step S109, the inverse orthogonal transform unit 118 inversely orthogonally transforms the transform coefficient Coeff IQ obtained by the processing in step S108 by a method corresponding to the orthogonal transform processing in step S106 to derive the prediction residual D'. Note that, since the inverse orthogonal transform processing is similar to inverse orthogonal transform processing (to be described below) performed on the decoding side, description (to be given below) for the decoding side can be applied to the inverse orthogonal transform processing in step S109.

In step S110, the calculation unit 119 adds the predicted image obtained by the prediction processing in step S104 to the prediction residual D' derived by the processing in step S109 to generate a locally decoded image.

In step S111, the in-loop filter unit 120 performs the in-loop filter processing for the locally decoded image derived by the processing in step S110.

In step S112, the frame memory 121 stores the locally decoded image derived by the processing in step S110 and the locally decoded image filtered in step S111.

In step S113, the encoding unit 115 encodes the quantized transform coefficient level "level" obtained by the processing in step S107. For example, the encoding unit 115 encodes the quantized transform coefficient level "level" that is information regarding the image by arithmetic encoding or the like to generate the coded data. Furthermore, at this time, the encoding unit 115 encodes the various encoding parameters (header information Hinfo, prediction mode information Pinfo, and transform information Tinfo). Moreover, the encoding unit 115 derives the residual information RInfo from the quantized transform coefficient level "level" and encodes the residual information RInfo.

In step S114, the accumulation buffer 116 accumulates the coded data thus obtained, and outputs the coded data to the outside of the image encoding device 100, for example, as a bitstream. The bitstream is transmitted to the decoding side via a transmission path or a recording medium, for example. Furthermore, the rate control unit 123 performs rate control as necessary. When the processing in step S114 ends, the image encoding processing ends.

<Flow of Encoding Processing>

Figure 8:
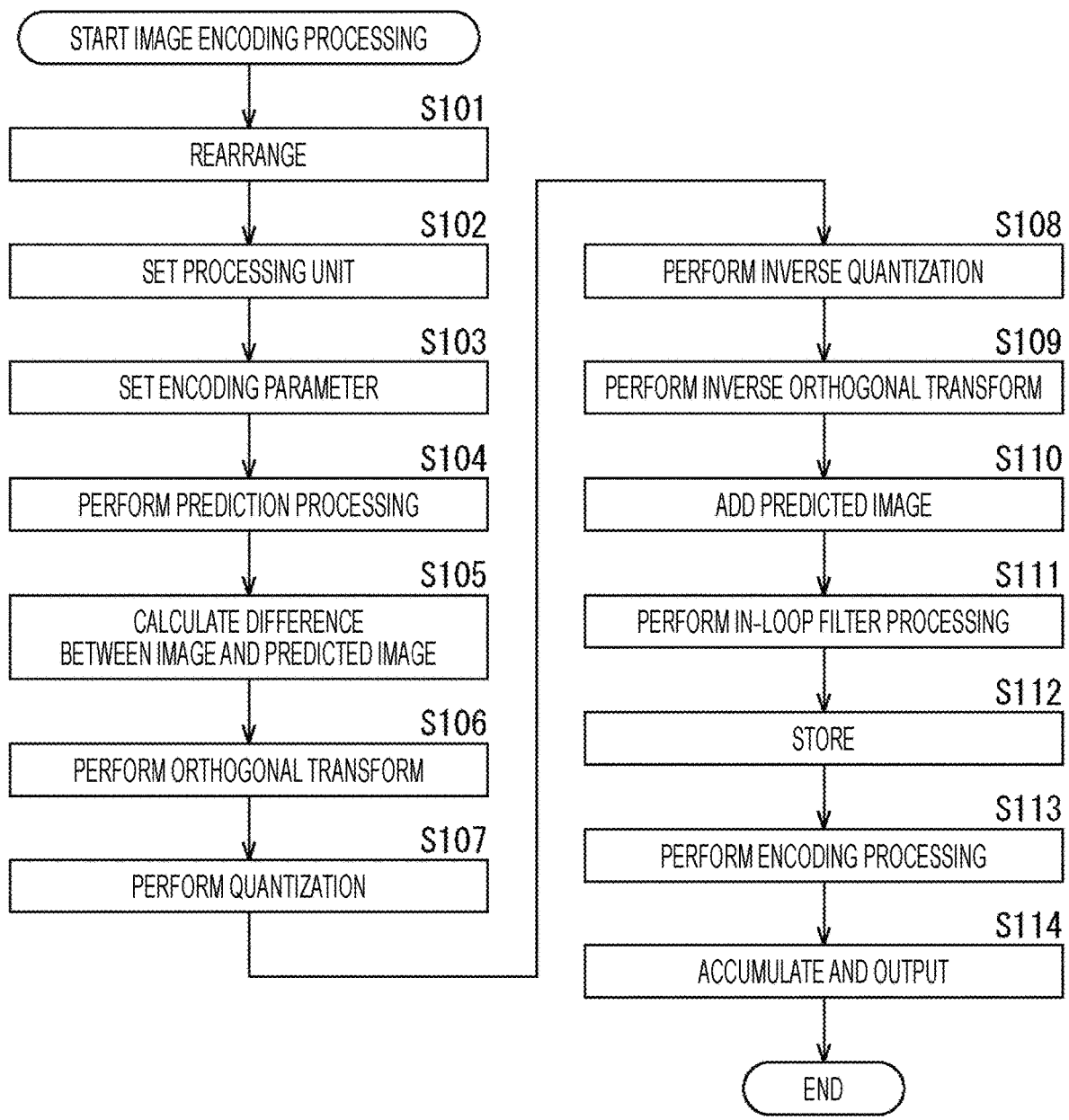
FIG. 8 is a flowchart for describing an example of a flow of image encoding processing.

In the encoding processing in step S113 in FIG. 8, the encoding unit 115 encodes the adaptive orthogonal transform identifier mts_idx. At that time, the encoding unit 115 encodes the adaptive orthogonal transform identifier by applying the method 1 described in <2-1.

Encoding of adaptive orthogonal transform identifier>. An example of a flow of encoding the adaptive orthogonal transform identifier mts_idx will be described with reference to the flowchart in FIG. 9.

When the encoding processing is started, in step S131, the binarization unit 131 of the encoding unit 115 binarizes the adaptive orthogonal transform identifier mts_idx by a truncated unary code (or truncated rice code) to generate the bin sequence.

In step S132, the selection unit 132 sets the first bin (binIdx=0) of the bin sequence as a bin to be processed. In this case, the selection unit 132 selects the context setting unit 133 as the supply destination of the bin (that is, context encoding is selected.). For example, the selection unit 132 selects context encoding as the encoding method for this bin according to any one of the tables illustrated in FIGS. 3 and 4 (that is, by applying any one of the method 1-1 to method 1-4).

In step S133, the context setting unit 133 assigns a predetermined context variable ctx (index ctxInc) determined in advance to the bin. Then, the context encoding unit 134 performs arithmetic encoding using the context variable. That is, context encoding is performed.

In step S134, the selection unit 132 sets an unprocessed bin among the second and subsequent bins in the bin sequence as a bin to be processed. In step S135, the selection unit 132 determines whether or not to bypass encode the bin to be processed. For example, the selection unit 132 determines whether or not to bypass encode the bin to be processed according to any of the tables illustrated in FIGS. 3 and 4 (by applying any one of the method 1-1 to method 1-4).

In a case where it is determined to perform bypass encoding, the processing proceeds to step S136. That is, in this case, the selection unit 132 selects the bypass encoding unit 135 as the bin supply destination. In step S136, the bypass encoding unit 135 performs bypass encoding (arithmetic encoding) for the bin to be processed. When the processing in step S136 is completed, the processing proceeds to step S138.

Furthermore, in step S135, in a case where it is determined not to perform the bypass encoding (to perform context encoding), the processing proceeds to step S137. That is, in this case, the selection unit 132 selects the context setting unit 133 as the bin supply destination. In step S137, the context setting unit 133 assigns a predetermined context variable ctx (index ctxInc) determined in advance to the bin. Then, the context encoding unit 134 performs arithmetic encoding using the context variable. That is, context encoding is performed. When the processing in step S137 is completed, the processing proceeds to step S138.

In step S138, the encoding unit 115 determines whether or not to terminate the encoding of the adaptive orthogonal transform identifier mts_idx. In a case where it is determined not to terminate the encoding, the processing returns to step S134 and the processing in step S134 and subsequent steps is repeated. Furthermore, in step S138, in a case where it is determined to terminate the encoding, the encoding processing is terminated.

By executing each processing as described above, the encoding unit 115 can encode the adaptive orthogonal transform identifier by applying the method 1 (for example, any one of the method 1-1 to method 1-4). Therefore, an increase in the memory use amount can be suppressed. Furthermore, an increase in the processing amount (throughput) can be suppressed. That is, an increase in the load of the encoding processing can be suppressed.

<2-4. Decoding Side>
<Image Decoding Device>

Figure 10:
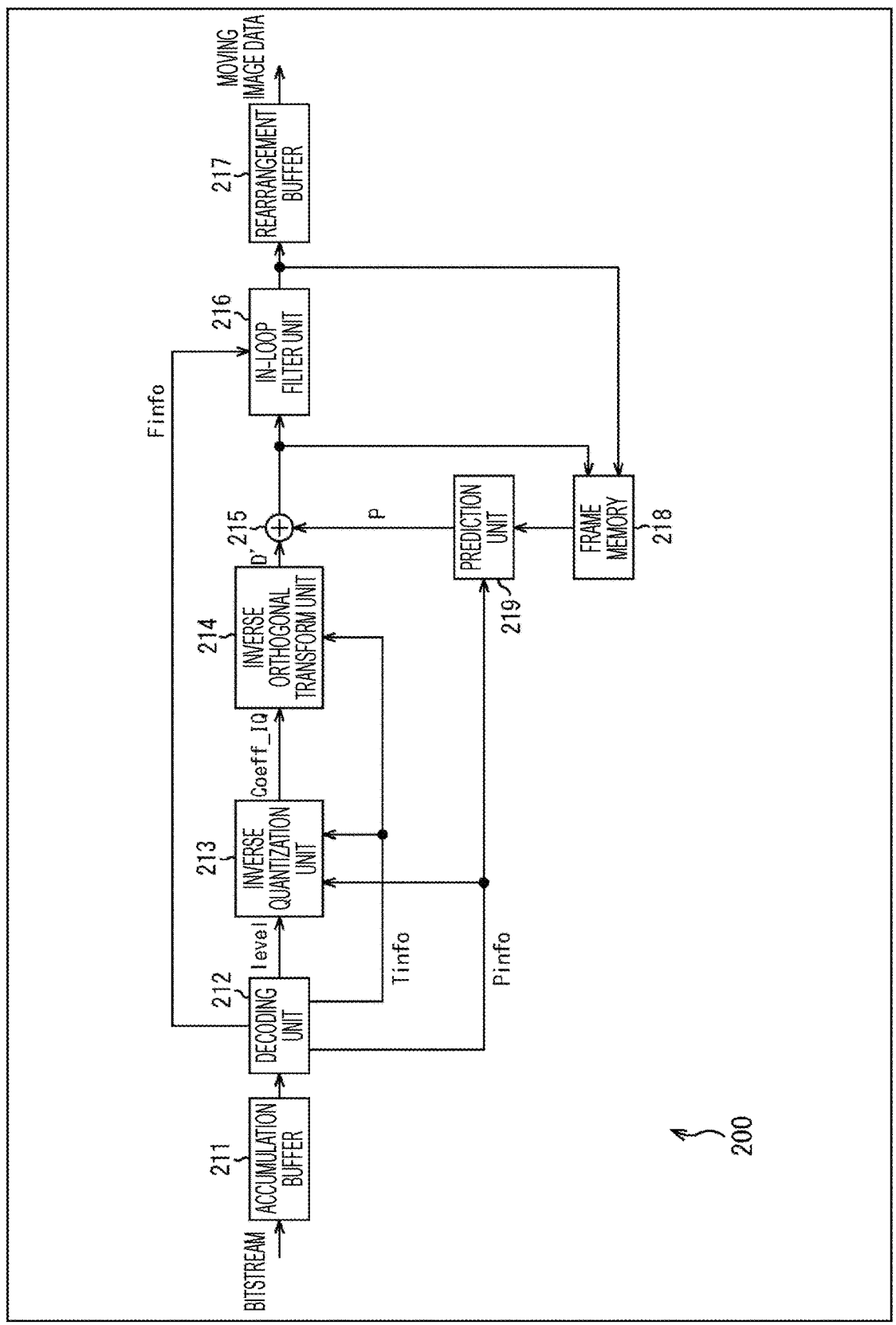
FIG. 10 is a block diagram illustrating a main configuration example of an image decoding device.

Next, the decoding side will be described. FIG. 10 is a block diagram illustrating an example of a configuration of an image decoding device as one mode of the image processing device to which the present technology is applied. An image decoding device 200 illustrated in FIG. 10 is a device that encodes coded data of a moving image. For example, the image decoding device 200 decodes the coded data by the decoding method described in any one of Non-Patent Documents 1 to 10 to generate moving image data. For example, the image decoding device 200 decodes the coded data (bitstream) generated by the above-described image encoding device 100 to generate moving image data.

Note that FIG. 10 illustrates main processing units, data flows, and the like, and those illustrated in FIG. 10 are not necessarily everything. That is, in the image decoding device 200, there may be a processing unit not illustrated as a block in FIG. 10, or processing or data flow not illustrated as an arrow or the like in FIG. 10.

In FIG. 10, the image decoding device 200 includes an accumulation buffer 211, a decoding unit 212, an inverse quantization unit 213, an inverse orthogonal transform unit 214, a calculation unit 215, an in-loop filter unit 216, a rearrangement buffer 217, a frame memory 218, and a prediction unit 219. Note that the prediction unit 219 includes an intra prediction unit and an inter prediction unit (not illustrated).

<Accumulation Buffer>

The accumulation buffer 211 acquires the bitstream input to the image decoding device 200 and holds (stores) the bitstream. The accumulation buffer 211 supplies the accumulated bitstream to the decoding unit 212 at predetermined timing or in a case where a predetermined condition is satisfied, for example.

<Decoding Unit>

The decoding unit 212 performs processing regarding image decoding. For example, the decoding unit 212 uses the bitstream supplied from the accumulation buffer 211 as an input, and performs variable length decoding for a syntax value of each syntax element from the bit string according to a definition of a syntax table to derive a parameter.

The parameter derived from the syntax element and the syntax value of the syntax element includes, for example, information such as header information Hinfo, prediction mode information Pinfo, transform information Tinfo, residual information Rinfo, and filter information Finfo. That is, the decoding unit 212 parses (analyzes and acquires) such information from the bitstream. These pieces of information will be described below.

<Header Information Hinfo>

The header information Hinfo includes, for example, header information such as a video parameter set (VPS)/a sequence parameter set (SPS)/a picture parameter set (PPS)/a slice header (SH). The header information Hinfo includes, for example, information defining image size (width PicWidth and height PicHeight), bit depth (luminance bitDepthY and chrominance bitDepthC), a chrominance array type ChromaArrayType, CU size maximum value MaxCUSize/minimum value MinCUSize, maximum depth MaxQTDepth/minimum depth MinQTDepth of quad-tree division, maximum depth MaxBTDepth/minimum depth MinBTDepth of binary-tree division, a maximum value MaxTSSize of a transform skip block (also called maximum transform skip block size), an on/off flag of each coding tool (also called enabled flag), and the like.

For example, an example of the on/off flag of the coding tool included in the header information Hinfo includes an on/off flag related to transform and quantization processing below. Note that the on/off flag of the coding tool can also be interpreted as a flag indicating whether or not a syntax related to the coding tool exists in the coded data. Furthermore, in a case where a value of the on/off flag is 1 (true), the value indicates that the coding tool is available. In a case where the value of the on/off flag is 0 (false), the value indicates that the coding tool is not available. Note that the interpretation of the flag value may be reversed.

An inter-component prediction enabled flag (ccp_enabled_flag) is flag information indicating whether or not inter-component prediction (cross-component prediction (CCP), also referred to as CC prediction) is available. For example, in a case where the flag information is "1" (true), the flag information indicates that the inter-component prediction is available. In a case where the flag information is "0" (false), the flag information indicates that the inter-component prediction is not available.

Note that this CCP is also referred to as inter-component linear prediction (CCLM or CCLMP).

<Prediction Mode Information Pinfo>

The prediction mode information Pinfo includes, for example, information such as size information PBSize (prediction block size) of a prediction block (PB) to be processed, intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax, a luminance intra prediction mode IntraPredModeY derived from the syntax, and the like.

Furthermore, the intra prediction mode information IPinfo includes, for example, an inter-component prediction flag (ccp_flag (cclmp_flag)), a multi-class linear prediction mode flag (mclm_flag), a chrominance sample position type identifier (chroma_sample_loc_type_idx), a chrominance MPM identifier (chroma_mpm_idx), a luminance intra prediction mode (IntraPredModeC) derived from these syntaxes, and the like.

The inter-component prediction flag (ccp_flag (cclmp_flag)) is flag information indicating whether or not to apply inter-component linear prediction. For example, ccp_flag==1 indicates that inter-component prediction is applied, and ccp_flag==0 indicates that the inter-component prediction is not applied.

The multi-class linear prediction mode flag (mclm_flag) is information regarding a linear prediction mode (linear prediction mode information). More specifically, the multi-class linear prediction mode flag (mclm_flag) is flag information indicating whether or not to set a multi-class linear prediction mode. For example, "0" indicates one-class mode (single class mode) (for example, CCLMP), and "1" indicates two-class mode (multi-class mode) (for example, MCLMP).

The chrominance sample position type identifier (chroma_sample_loc_type_idx) is an identifier for identifying a type of a pixel position of a chrominance component (also referred to as a chrominance sample position type). For example, in a case where the chrominance array type (ChromaArrayType), which is information regarding a color format, indicates 420 format, the chrominance sample position type identifier is assigned as in the following expression.

chroma_sample_loc_type_idx == 0: Type2 chroma_sample_loc_type_idx == 1: Type3 chroma_sample_loc_type_idx == 2: Type0 chroma_sample_loc_type_idx == 3: Type1

Note that the chrominance sample position type identifier (chroma_sample_loc_type_idx) is transmitted as (by being stored in) information (chroma_sample_loc_info ( )) regarding the pixel position of the chrominance component.

The chrominance MPM identifier (chroma_mpm_idx) is an identifier indicating which prediction mode candidate in a chrominance intra prediction mode candidate list (intraPredModeCandListC) is to be specified as a chrominance intra prediction mode.

The motion prediction information MVinfo includes, for example, information such as merge_idx, merge_flag, inter_pred_idc, ref_idx_LX, mvp_lX_flag, X={0,1}, mvd, and the like (see, for example, JCTVC-W1005, 7.3.8.6 Prediction Unit Syntax).

Of course, the information included in the prediction mode information Pinfo is arbitrary, and information other than the above information may be included.

<Transform Information Tinfo>

The transform information Tinfo includes, for example, the following information. Of course, the information included in the transform information Tinfo is arbitrary, and information other than the above information may be included:

The width TBWSize and the height TBHSize of the transform block to be processed (or may be logarithmic values log 2TBWSize and log 2TBHSize of TBWSize and TBHSize having a base of 2);

a transform skip flag (transform_skip_flag): a flag indicating whether or not to skip (inverse) primary transform and (inverse) secondary transform;

a scan identifier (scanIdx);

a secondary transform identifier (st_idx);

an adaptive orthogonal transform identifier (mts_idx);

a quantization parameter (qp); and a quantization matrix (scaling matrix (for example, JCTVC-W1005, 7.3.4 Scaling list data syntax)).

<Residual Information Rinfo>

The residual information Rinfo (for example, see 7.3.8.11 Residual Coding syntax of JCTVC-W1005) includes, for example, the following syntax:

cbf (coded block_flag): a residual data presence/absence flag;

last_sig_coeff_x pos: a last nonzero transform coefficient X coordinate;

last_sig_coeff_y pos: a last nonzero transform coefficient Y coordinate;

coded sub_block flag: a subblock nonzero transform coefficient presence/absence flag;

sig_coeff_flag: a nonzero transform coefficient presence/absence flag;

gr1_flag: a flag indicating whether or not the level of the nonzero transform coefficient is greater than 1 (also called GR1 flag);

gr2_flag: a flag indicating whether or not the level of the nonzero transform coefficient is greater than 2 (also called GR2 flag);

sign_flag: a code indicating the sign of nonzero transform coefficient (also called sign code);

coeff_abs_level_remaining: a residual level of the nonzero transform coefficient (also called a nonzero transform coefficient residual level);
and the like.

Of course, the information included in the residual information Rinfo is arbitrary, and information other than the above information may be included.

<Filter Information Finfo>

The filter information Finfo includes, for example, control information regarding the following filtering processing:

Control information regarding the deblocking filter (DBF)
Control information regarding the pixel adaptive offset (SAO)
Control information regarding the adaptive loop filter (ALF)
Control information regarding other linear/nonlinear filters More specifically, the filter information Finfo includes, for example, a picture to which each filter is applied, information for specifying an area in the picture, filter on/off control information for each CU, filter on/off control information for slice and tile boundaries, and the like. Of course, the information included in the filter information Finfo is arbitrary, and information other than the above information may be included.

Return to the description of the decoding unit 212. The decoding unit 212 refers to the residual information Rinfo and derives the quantized transform coefficient level "level" at each coefficient position in each transform block. The decoding unit 212 supplies the quantized transform coefficient level "level" to the inverse quantization unit 213.

Furthermore, the decoding unit 212 supplies the parsed header information Hinfo, prediction mode information Pinfo, quantized transform coefficient level "level", transform information Tinfo, and filter information Finfo to each block. Specific description is given as follows.

The header information Hinfo is supplied to the inverse quantization unit 213, the inverse orthogonal transform unit 214, the prediction unit 219, and the in-loop filter unit 216.

The prediction mode information Pinfo is supplied to the inverse quantization unit 213 and the prediction unit 219.

The transform information Tinfo is supplied to the inverse quantization unit 213 and the inverse orthogonal transform unit 214.

The filter information Finfo is supplied to the in-loop filter unit 216.

Of course, the above example is an example, and the present embodiment is not limited to this example. For example, each encoding parameter may be supplied to an arbitrary processing unit. Furthermore, other information may be supplied to an arbitrary processing unit.

<Inverse Quantization Unit>

The inverse quantization unit 213 has at least a configuration necessary for performing processing regarding the inverse quantization. For example, the inverse quantization unit 213 uses the transform information Tinfo and the quantized transform coefficient level "level" supplied from the decoding unit 212 as inputs, and, on the basis of the transform information Tinfo, scales (inversely quantizes) the value of the quantized transform coefficient level "level" to derive a transform coefficient Coeff IQ after inverse quantization.

Note that this inverse quantization is performed as inverse processing of the quantization by the quantization unit 114 of the image encoding device 100. Furthermore, the inverse quantization is processing similar to the inverse quantization performed by the inverse quantization unit 117 of the image encoding device 100. That is, the inverse quantization unit 117 of the image encoding device 100 performs processing (inverse quantization) similar to the inverse quantization unit 213.

The inverse quantization unit 213 supplies the derived transform coefficient Coeff IQ to the inverse orthogonal transform unit 214

<Inverse Orthogonal Transform Unit>

The inverse orthogonal transform unit 214 performs processing regarding inverse orthogonal transform. For example, the inverse orthogonal transform unit 214 uses the transform coefficient Coeff IQ supplied from the inverse quantization unit 213 and the transform information Tinfo supplied from the decoding unit 212 as inputs, and performs the inverse orthogonal transform processing for the transform coefficient Coeff IQ on the basis of the transform information Tinfo to derive the prediction residual D'.

Note that this inverse orthogonal transform is performed as inverse processing of the orthogonal transform by the orthogonal transform unit 113 of the image encoding device 100. Furthermore, the inverse orthogonal transform is processing similar to the inverse orthogonal transform performed by the inverse orthogonal transform unit 118 of the image encoding device 100. That is, the inverse orthogonal transform unit 118 of the image encoding device 100 performs processing (inverse orthogonal transform) similar to the inverse orthogonal transform unit 214.

The inverse orthogonal transform unit 214 supplies the derived prediction residual D' to the calculation unit 215.

<Calculation Unit>

The calculation unit 215 performs processing regarding addition of information regarding an image. For example, the calculation unit 215 uses the prediction residual D' supplied from the inverse orthogonal transform unit 214 and the predicted image P supplied from the prediction unit 219 as inputs. The calculation unit 215 adds the prediction residual D' and the predicted image P (prediction signal) corresponding to the prediction residual D' to derive the locally decoded image Rlocal, as illustrated in the following expression.

$$Rlocal = D' + P$$

The calculation unit 215 supplies the derived locally decoded image Rlocal to the in-loop filter unit 216 and the frame memory 218.

<In-Loop Filter Unit>

The in-loop filter unit 216 performs processing regarding in-loop filter processing. For example, the in-loop filter unit 216 uses the locally decoded image Rlocal supplied from the calculation unit 215 and the filter information Finfo supplied from the decoding unit 212 as inputs. Note that the information input to the in-loop filter unit 216 is arbitrary, and information other than the aforementioned information may be included.

The in-loop filter unit 216 appropriately performs filtering processing for the locally decoded image Rlocal on the basis of the filter information Finfo.

For example, the in-loop filter unit 216 applies four in-loop filters of a bilateral filter, a deblocking filter (DBF), an adaptive offset filter (sample adaptive offset (SAO)), and an adaptive loop filter (adaptive loop filter (ALF)) in this order. Note that which filter is applied and in which order the filters are applied are arbitrary and can be selected as appropriate.

The in-loop filter unit 216 performs filtering processing corresponding to the filtering processing performed on the encoding side (for example, by the in-loop filter unit 120 of the image encoding device 100). Of course, the filtering processing performed by the in-loop filter unit 216 is arbitrary, and is not limited to the above example. For example, the in-loop filter unit 216 may apply a Wiener filter or the like.

The in-loop filter unit 216 supplies the filtered locally decoded image Rlocal to the rearrangement buffer 217 and the frame memory 218.

<Rearrangement Buffer>

The rearrangement buffer 217 uses the locally decoded image Rlocal supplied from the in-loop filter unit 216 as an input and holds (stores) the locally decoded image Rlocal. The rearrangement buffer 217 reconstructs the decoded image R for each unit of picture, using the locally decoded image Rlocal, and holds (stores) the decoded image R (in the buffer). The rearrangement buffer 217 rearranges the obtained decoded images R from the decoding order to the reproduction order. The rearrangement buffer 217 outputs a rearranged decoded image R group to the outside of the image decoding device 200 as moving image data.

<Frame Memory>

The frame memory 218 performs processing regarding storage of data relating to an image. For example, the frame memory 218 uses the locally decoded image Rlocal supplied from the calculation unit 215 as an input, reconstructs the decoded image R for each unit of picture, and stores the decoded image R in the buffer in the frame memory 218.

Furthermore, the frame memory 218 uses the in-loop filtered locally decoded image Rlocal supplied from the in-loop filter unit 216 as an input, reconstructs the decoded image R for each unit of picture, and stores the decoded image R in the buffer in the frame memory 218. The frame memory 218 appropriately supplies the stored decoded image R (or a part thereof) to the prediction unit 219 as a reference image.

Note that the frame memory 218 may store the header information Hinfo, the prediction mode information Pinfo, the transform information Tinfo, the filter information Finfo, and the like related to generation of the decoded image.

<Prediction Unit>

The prediction unit 219 performs processing regarding generation of a predicted image. For example, the prediction unit 219 uses the prediction mode information Pinfo supplied from the decoding unit 212 as an input, and performs prediction by a prediction method specified by the prediction mode information Pinfo to derive the predicted image P. At the time of derivation, the prediction unit 219 uses the decoded image R (or a part thereof) before filtering or after filtering stored in the frame memory 218, the decoded image R being specified by the prediction mode information Pinfo, as the reference image. The prediction unit 219 supplies the derived predicted image P to the calculation unit 215.

Note that these processing units (the accumulation buffer 211 to the prediction unit 219) have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Decoding Unit>

Figure 11:
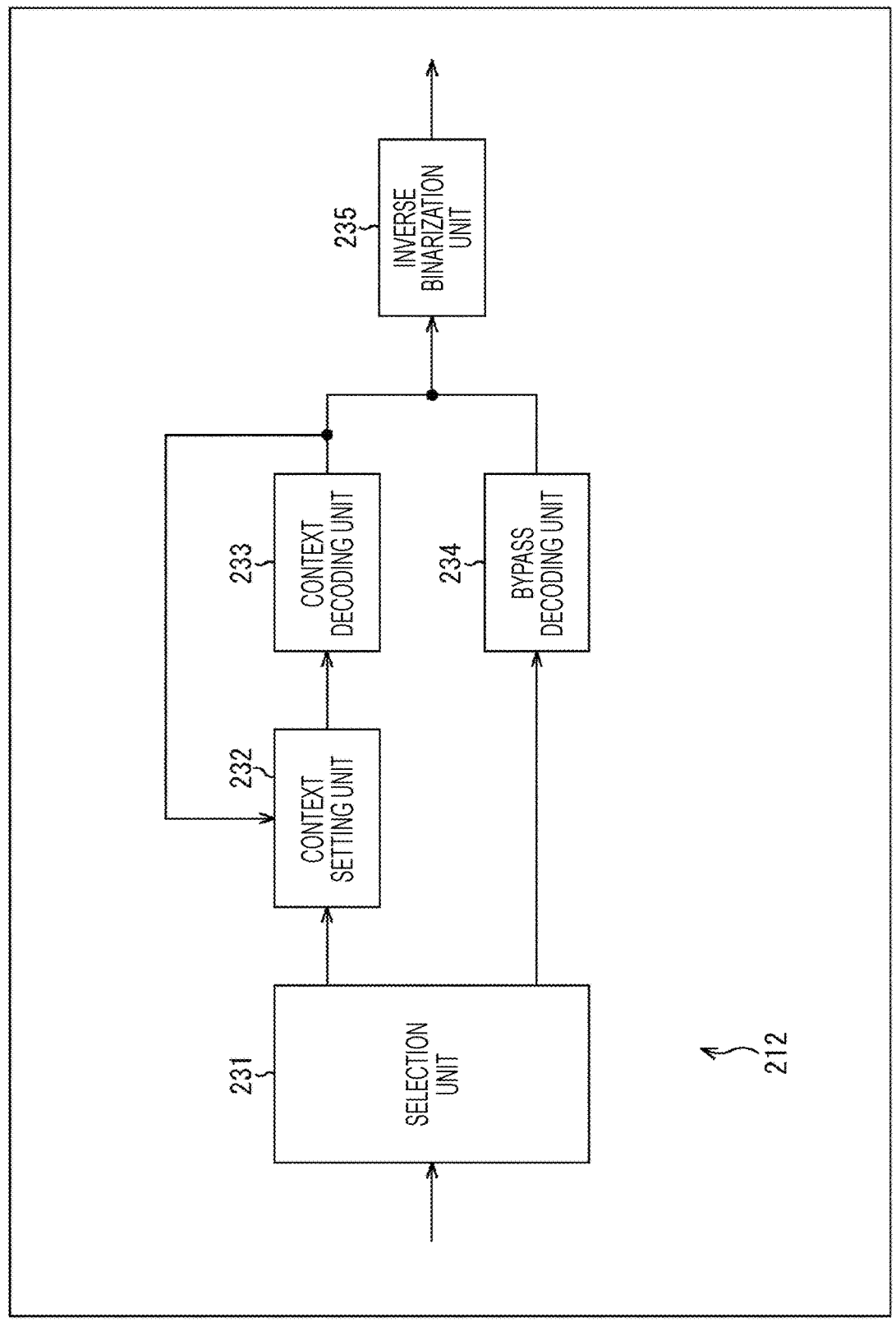
FIG. 11 is a block diagram illustrating a main configuration example of a decoding unit.

FIG. 11 is a block diagram illustrating a main configuration example of the decoding unit 212 in FIG. 10. As illustrated in FIG. 11, the decoding unit 212 includes a selection unit 231, a context setting unit 232, a context decoding unit 233, a bypass decoding unit 234, and an inverse binarization unit 235.

Note that, although decoding of coded data of the adaptive orthogonal transform identifier is described here, the decoding unit 212 also decodes coded data of other encoding parameters, residual information Rinfo, and the like as described above. The decoding unit 212 decodes the coded data of the adaptive orthogonal transform identifier by applying the method 1 described in <2-2. Decoding of adaptive orthogonal transform identifier>.

The selection unit 231 performs processing regarding selection of the supply destination of the coded data of each bin of the bin sequence of the binarized adaptive orthogonal transform identifier. For example, the selection unit 231 acquires the coded data of the bin sequence of the adaptive orthogonal transform identifier supplied from the accumulation buffer 211.

Furthermore, the selection unit 231 selects whether to set the supply destination to the context setting unit 232 or the bypass decoding unit 234 for the coded data of each bin of the bin sequence of the acquired adaptive orthogonal transform identifier. The selection unit 231 performs the selection according to the method 1 described above in <2-2. Decoding of adaptive orthogonal transform identifier>. For example, the selection unit 231 may perform the selection according to the method 1-1 (that is, the table illustrated in A of FIG. 3).

Furthermore, the selection unit 231 may perform the selection according to the method 1-2 (that is, the table illustrated in B of FIG. 3). Moreover, the selection unit 231 may perform the selection according to the method 1-3 (that is, the table illustrated in A of FIG. 4). Furthermore, the selection unit 231 may perform the selection according to the method 1-4 (that is, the table illustrated in B of FIG. 4).

In the case of assigning the context variable (index ctxInc) and performing context decoding, the selection unit 231 supplies the coded data of the bin to the context setting unit 232. In the case of bypass decoding, the selection unit 231 supplies the bin to the bypass decoding unit 234.

The context setting unit 232 performs processing regarding context setting. For example, the context setting unit 232 acquires the coded data of the bin supplied from the selection unit 231. The context setting unit 232 assigns the context variable (index ctxInc) to the bin. The context setting unit 232 performs the assignment according to the method 1 described above in <2-2. Decoding of adaptive orthogonal transform identifier>. For example, the context setting unit 232 may perform the assignment according to the method 1-1 (that is, the table illustrated in A of FIG. 3). Furthermore, the context setting unit 232 may perform the assignment according to the method 1-2 (that is, the table illustrated in B of FIG. 3). Moreover, the context setting unit 232 may perform the assignment according to the method 1-3 (that is, the table illustrated in A of FIG. 4). Furthermore, the context setting unit 232 may perform the assignment according to the method 1-4 (that is, the table illustrated in B of FIG. 4).

Furthermore, the context setting unit 232 can acquire a decoding result from the context decoding unit 233. The context setting unit 232 can appropriately update the context variable (index ctxInc) using the decoding result. The context setting unit 232 supplies the context variable (index ctxInc) derived in this manner to the context decoding unit 233.

The context decoding unit 233 performs processing regarding arithmetic decoding. For example, the context decoding unit 233 acquires the context variable (index ctxInc) supplied from the context setting unit 232. Furthermore, the context decoding unit 233 performs arithmetic decoding using the context variable (index ctxInc). That is, context decoding is performed. Furthermore, the context decoding unit 233 supplies the decoding result, that is, the bin to be processed of the bin sequence of the adaptive orthogonal transform identifier to the inverse binarization unit 235.

The bypass decoding unit 234 performs processing regarding bypass decoding. For example, the bypass decoding unit 234 acquires the coded data of the bin supplied from the selection unit 231. The bypass decoding unit 234 performs bypass decoding (arithmetic decoding) for the coded data of the bin. The bypass decoding unit 234 supplies the decoding result, that is, the bin to be processed of the bin sequence of the adaptive orthogonal transform identifier to the inverse binarization unit 235.

The inverse binarization unit 235 performs processing regarding inverse binarization (also referred to as multi-binarization) of the bin sequence of the adaptive orthogonal transform identifier. For example, the inverse binarization unit 235 acquires the bin sequence of the adaptive orthogonal transform identifier supplied from the context decoding unit 233 or the bypass decoding unit 234. The inverse binarization unit 235 inversely binarizes the acquired bin sequence to derive the adaptive orthogonal transform identifier mts_idx. This inverse binarization is inverse processing of the binarization by the binarization unit 131. That is, the inverse binarization unit 235 performs the inverse binarization using the truncated unary code (or truncated rice code). The inverse binarization unit 235 supplies the derived adaptive orthogonal transform identifier mts_idx to the inverse orthogonal transform unit 214 as Tinfo. The inverse orthogonal transform unit 214 appropriately performs adaptive orthogonal transform on the basis of the adaptive orthogonal transform identifier mts_idx.

As each of the processing units (the selection unit 231 to the inverse binarization unit 235) performs the processing as described above, the decoding unit 212 can decode the coded data of the adaptive orthogonal transform identifier by applying the method 1 (for example, any one of the method 1-1 to method 1-4). Therefore, an increase in the memory use amount can be suppressed. Furthermore, an increase in the processing amount (throughput) can be suppressed. That is, an increase in the load of the decoding processing can be suppressed.

<Flow of Image Decoding Processing>

Next, a flow of each processing executed by the image decoding device 200 having the above configuration will be described. First, an example of a flow of image decoding processing will be described with reference to the flowchart in FIG. 12.

When the image decoding processing is started, in step S201, the accumulation buffer 211 acquires and holds (accumulates) the coded data (bitstream) supplied from the outside of the image decoding device 200.

In step S202, the decoding unit 212 decodes the coded data (bitstream) to obtain a quantized transform coefficient level "level". Furthermore, the decoding unit 212 parses (analyzes and acquires) various encoding parameters from the coded data (bitstream) by this decoding.

In step S203, the inverse quantization unit 213 performs inverse quantization that is inverse processing of the quantization performed on the encoding side for the quantized transform coefficient level "level" obtained by the processing in step S202 to obtain the transform coefficient Coeff IQ.

In step S204, the inverse orthogonal transform unit 214 performs inverse orthogonal transform processing that is inverse processing of the orthogonal transform processing performed on the encoding side for the transform coefficient Coeff IQ obtained in step S203 to obtain the prediction residual D'.

In step S205, the prediction unit 219 executes prediction processing by a prediction method specified on the encoding side on the basis of the information parsed in step S202, and generates a predicted image P, for example, by reference to the reference image stored in the frame memory 218.

In step S206, the calculation unit 215 adds the prediction residual D' obtained in step S204 and the predicted image P obtained in step S205 to derive a locally decoded image Rlocal.

In step S207, the in-loop filter unit 216 performs the in-loop filter processing for the locally decoded image Rlocal obtained by the processing in step S206.

In step S208, the rearrangement buffer 217 derives a decoded image R, using the filtered locally decoded image Rlocal obtained by the processing in step S207, and rearranges a decoded image R group from the decoding order to the reproduction order. The decoded image R group rearranged in the reproduction order is output to the outside of the image decoding device 200 as a moving image.

Furthermore, in step S209, the frame memory 218 stores at least one of the locally decoded image Rlocal obtained by the processing in step S206, and the locally decoded image Rlocal after filtering processing obtained by the processing in step S207.

When the processing in step S209 ends, the image decoding processing ends.

<Flow of Decoding Processing>

Figure 12:
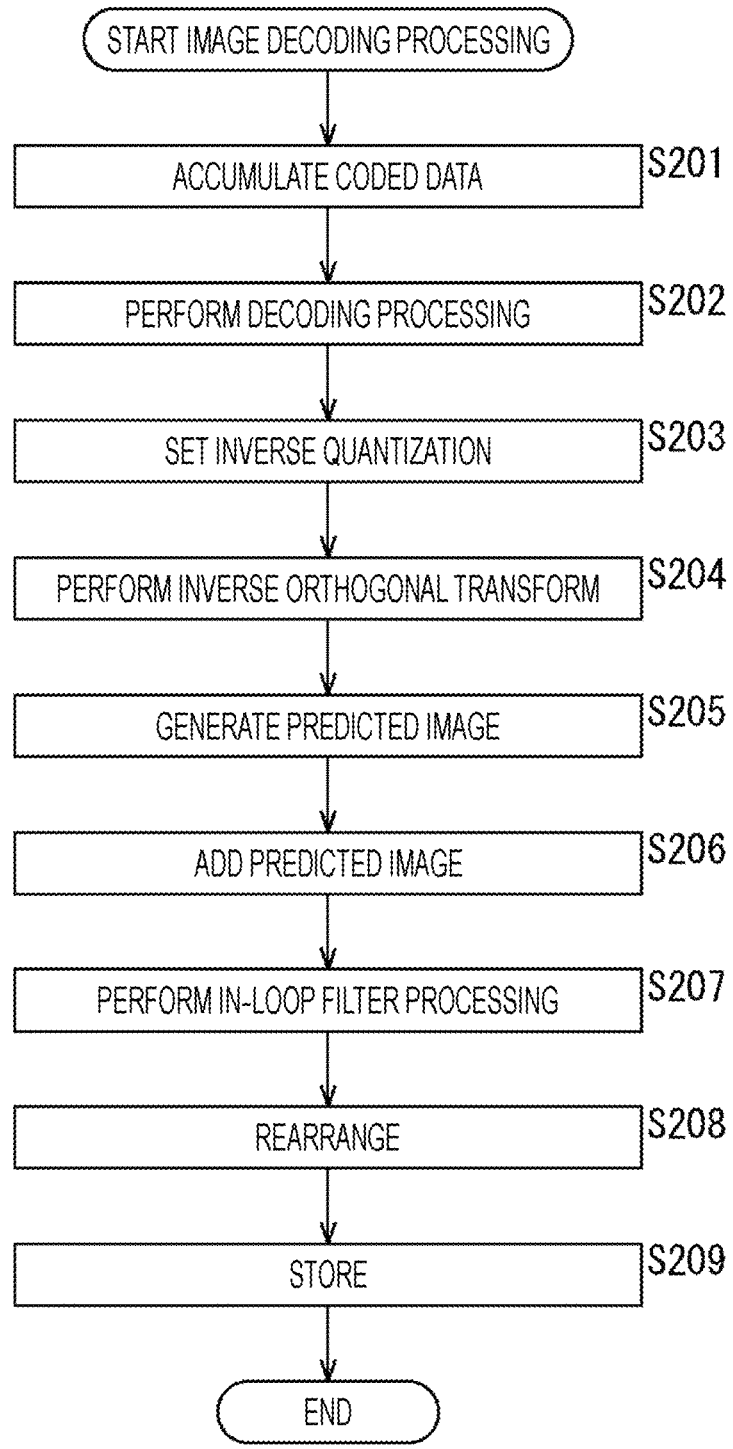
FIG. 12 is a flowchart for describing an example of a flow of image decoding processing.

In the decoding processing in step S202 in FIG. 12, the decoding unit 212 decodes the coded data of the adaptive orthogonal transform identifier mts_idx. At that time, the decoding unit 212 decodes the coded data of the adaptive orthogonal transform identifier by applying the method 1 described in <2-2. Decoding of adaptive orthogonal transform identifier>. An example of a flow of decoding the coded data of the adaptive orthogonal transform identifier mts_idx will be described with reference to the flowchart in FIG. 13.

When the decoding processing is started, in step S231, the selection unit 231 of the decoding unit 212 sets the first bin (binIdx=0) of the bin sequence of the adaptive orthogonal transform identifier mts_idx as the bin to be processed. In this case, the selection unit 231 selects the context setting unit 232 as the supply destination of the bin (that is, context decoding is selected.). For example, the selection unit 231 selects context decoding as the decoding method for this bin according to any one of the tables illustrated in FIGS. 3 and 4 (that is, by applying any one of the method 1-1 to method 1-4).

In step S232, the context setting unit 232 assigns a predetermined context variable ctx (index ctx Inc) determined in advance to the bin. Then, the context decoding unit 233 performs arithmetic decoding using the context variable. That is, context decoding is performed.

In step S233, the selection unit 231 sets an unprocessed bin among the second and subsequent bins in the bin sequence as a bin to be processed. In step S234, the selection unit 231 determines whether or not to perform bypass decoding for the bin to be processed. For example, the selection unit 231 determines whether or not to bypass decode the coded data of the bin to be processed according to any one of the tables illustrated in FIGS. 3 and 4 (that is, by applying any one of the method 1-1 to method 1-4).

In a case where it is determined to perform the bypass decoding, the processing proceeds to step S235. That is, in this case, the selection unit 231 selects the bypass decoding unit 234 as the supply destination of the coded data of the bin. In step S235, the bypass decoding unit 234 performs bypass decoding for the coded data of the bin to be processed. When the processing in step S235 is completed, the processing proceeds to step S237.

Furthermore, in step S234, in a case where it is determined not to perform the bypass decoding (to perform context decoding), the processing proceeds to step S236. That is, in this case, the selection unit 231 selects the context setting unit 232 as the supply destination of the coded data of the bin. In step S236, the context setting unit 232 assigns a predetermined context variable ctx (index ctxInc) determined in advance to the bin. Then, the context decoding unit 233 performs arithmetic decoding using the context variable. That is, context decoding is performed. When the processing in step S236 is completed, the processing proceeds to step S237.

In step S237, the inverse binarization unit 235 inversely binarizes the bin sequence using the truncated unary code (or truncated rice code) to derive the adaptive orthogonal transform identifier mts_idx.

In step S238, the decoding unit 212 determines whether or not to terminate decoding of the adaptive orthogonal transform identifier mts_idx. In a case where it is determined not to terminate the decoding, the processing returns to step S233 and the processing in step S233 and subsequent steps is repeated. Furthermore, in step S238, in a case where it is determined to terminate the decoding, the decoding processing is terminated.

By executing each processing in this manner, the decoding unit 212 can decode the coded data of the adaptive orthogonal transform identifier by applying the method 1 (for example, any one of the method 1-1 to method 1-4). Therefore, an increase in the memory use amount can be suppressed. Furthermore, an increase in the processing amount (throughput) can be suppressed. That is, an increase in the load of the decoding processing can be suppressed.

3. Second Embodiment

<3-1. Encoding of Adaptive Orthogonal Transform Identifier>

In the present embodiment, assignment (method 0) of a context variable to each bin of a bin sequence obtained by binarizing an adaptive orthogonal transform identifier indicating a mode of adaptive orthogonal transform in image encoding, which has been performed as in the table illustrated in B of FIG. 1, is performed as follows.

That is, the context variable based on a parameter regarding a block size is assigned to a first bin of a bin sequence obtained by binarizing the adaptive orthogonal transform identifier indicating a mode of adaptive orthogonal transform in image encoding, and context encoding is performed for the first bin of the bin sequence.

More specifically, the parameter regarding the block size is a difference between a logarithmic value of a long side of a transformation block and a logarithmic value of a minimum transformation block size to which the adaptive orthogonal transform is applicable. That is, the context variable based on the difference between a logarithmic value of a long side of a transformation block and a logarithmic value of a minimum transformation block size to which the adaptive orthogonal transform is applicable is assigned to the first bin of the bin sequence obtained by binarizing the adaptive orthogonal transform identifier indicating a mode of adaptive orthogonal transform in image encoding, and context encoding is performed for the first bin (method 2).

For example, as illustrated in the table in A of FIG. 14, a context variable ctx (index ctxInc) may be assigned to the first bin of the bin sequence obtained by binarizing the adaptive orthogonal transform identifier on the basis of a difference (max (log 2W, log 2H)−log 2MinMtsSize) between a longer one (max (log 2W, log 2H)) between a logarithmic value (log 2W) of a transform block size in a horizontal direction and a logarithmic value (log 2H) of the transform block size in a vertical direction, and a logarithmic value (log 2MinMtsSize) of a minimum transform block size to which the adaptive orthogonal transform is applicable, and context encoding may be performed for the first bin, and bypass encoding may be performed for second to fourth bins of the bin sequence (method 2-1).

In the case of the example in A of FIG. 14, the index ctxInc based on the difference (max (log 2W, log 2H)−log 2MinMtsSize) is assigned to the first bin (binIdx=0) of the bin sequence of the adaptive orthogonal transform identifier and context encoding is performed for the first bin, and bypass encoding (bypass) is performed for the second to fourth bins (binIdx=1 to 3).

Furthermore, for example, as illustrated in the table in B of FIG. 14, the context variable ctx (index ctxInc) may be assigned to the first bin of the bin sequence obtained by binarizing the adaptive orthogonal transform identifier on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable, and context encoding may be performed for the first bin, a predetermined context variable (index ctxInc) may be assigned to the second bin of the bin sequence and context encoding may be performed for the second bin, and bypass encoding may be performed for the third and fourth bins of the bin sequence (method 2-2).

In the case of the example in B of FIG. 14, the index ctxInc based on the difference (max (log 2W, log 2H)−log 2MinMtsSize) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, and bypass encoding (bypass) is performed for the third and fourth bins (binIdx=2 and 3).

Moreover, for example, as illustrated in the table in A of FIG. 15, the context variable ctx (index ctxInc) may be assigned to the first bin of the bin sequence obtained by binarizing the adaptive orthogonal transform identifier on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable, and context encoding may be performed for the first bin, predetermined context variables (indexes ctxInc) different from each other may be assigned to the second and third bins of the bin sequence and context encoding may be performed for the second and third bins, and bypass encoding may be performed for the fourth bin of the bin sequence (method 2-3).

In the case of the example in A of FIG. 15, the index ctxInc based on the difference (max (log 2W, log 2H)−log 2MinMtsSize) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and bypass encoding (bypass) is performed for the fourth bin (binIdx=3).

Moreover, for example, as illustrated in the table in B of FIG. 15, the context variable ctx (index ctxInc) may be assigned to the first bin of the bin sequence obtained by binarizing the adaptive orthogonal transform identifier on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable, and context encoding may be performed for the first bin, predetermined context variables (indexes ctxInc) different from one another may be assigned to the second to fourth bins of the bin sequence and context encoding may be performed for the second to fourth bins (method 2-4).

In the case of the example in B of FIG. 15, the index ctxInc based on the difference (max (log 2W, log 2H)−log 2MinMtsSize) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and the index ctxInc=B3 is assigned to the fourth bin (binIdx=3) and context encoding is performed for the fourth bin.

Note that, in the tables of FIGS. 14 and 15, non-overlapping unique values are set in the indexes B1, B2, and B3.

Examples of the number of contexts, the number of context encoding bins, and the number of bypass encoding bins for each of these methods are illustrated in the table of FIG. 16. For example, in the case of the method 0, the number of contexts is 9, the number of context encoding bins is 4, and the number of bypass encoding bins is 0. In contrast, in the case of the method 2-1, the number of contexts is 4, the number of context encoding bins is 1, and the number of bypass encoding bins is 3. Furthermore, in the case of the method 2-2, the number of contexts is 5, the number of context encoding bins is 2, and the number of bypass encoding bins is 2. Moreover, in the case of the method 2-3, the number of contexts is 6, the number of context encoding bins is 3, and the number of bypass encoding bins is 1. Furthermore, in the case of the method 2-4, the number of contexts is 7, the number of context encoding bins is 4, and the number of bypass encoding bins is 0.

As described above, in any case of the method 2-1 to the method 2-4, the number of contexts required for encoding can be reduced as compared with the case of the method 0. That is, by applying the method 2, the number of contexts assigned to the first bin (binIdx=0) can be reduced. Therefore, an increase in the memory use amount can be suppressed.

Furthermore, in any case of the method 2-1 to the method 2-3, the number of context encoding bins required for encoding can be reduced as compared with the case of the method 0. Note that, in the case of the method 2-4, the number of context encoding bins required for encoding is equivalent to that in the case of the method 0. That is, by applying the method 2, the bypass encoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 2, an increase in the load of the encoding processing can be suppressed.

<3-2. Decoding of Adaptive Orthogonal Transform Identifier>

Similarly, in the case of decoding, assignment (method 0) of a context variable to each bin of a bin sequence of a binarized adaptive orthogonal transform identifier indicating a mode of inverse adaptive orthogonal transform in image decoding, which has been performed as in the table illustrated in B of FIG. 1, is performed as follows.

That is, the context variable based on a parameter regarding a block size is assigned to a first bin of a bin sequence of the binarized adaptive orthogonal transform identifier, and context encoding is performed for the first bin of the bin sequence.

More specifically, the parameter regarding the block size is a difference between a logarithmic value of a long side of a transformation block and a logarithmic value of a minimum transformation block size to which the adaptive orthogonal transform is applicable. That is, the context variable based on the difference between a logarithmic value of a long side of a transformation block and a logarithmic value of a minimum transformation block size to which the adaptive orthogonal transform is applicable is assigned to the first bin of the bin sequence of the binarized adaptive orthogonal transform identifier, and context decoding is performed for the first bin (method 2).

For example, as illustrated in the table in A of FIG. 14, a context variable ctx (index ctxInc) may be assigned to the first bin of the bin sequence of the binarized adaptive orthogonal transform identifier on the basis of a difference (max (log 2W, log 2H)−log 2MinMtsSize) between a longer one (max (log 2W, log 2H)) between a logarithmic value (log 2W) of a transform block size in a horizontal direction and a logarithmic value (log 2H) of the transform block size in a vertical direction, and a logarithmic value (log 2MinMtsSize) of a minimum transform block size to which the adaptive orthogonal transform is applicable, and context decoding may be performed for the first bin, and bypass decoding may be performed for the second to fourth bins of the bin sequence (method 2-1).

In the case of the example in A of FIG. 14, the index ctxInc based on the difference (max (log 2W, log 2H)−log 2MinMtsSize) is assigned to the first bin (binIdx=0) of the bin sequence of the adaptive orthogonal transform identifier and context decoding is performed for the first bin, and bypass decoding (bypass) is performed for the second to fourth bins (binIdx=1 to 3).

Furthermore, for example, as illustrated in the table in B of FIG. 14, the context variable ctx (index ctxInc) may be assigned to the first bin of the bin sequence of the binarized adaptive orthogonal transform identifier on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable, and context decoding may be performed for the first bin, a predetermined context variable (index ctxInc) may be assigned to the second bin of the bin sequence and context decoding may be performed for the second bin, and bypass decoding may be performed for the third and fourth bins of the bin sequence (method 2-2).

In the case of the example in B of FIG. 14, the index ctxInc based on the difference (max (log 2W, log 2H)−log 2MinMtsSize) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, and bypass decoding (bypass) is performed for the third and fourth bins (binIdx=2 and 3).

Moreover, for example, as illustrated in the table in A of FIG. 15, the context variable ctx (index ctxInc) may be assigned to the first bin of the bin sequence of the binarized adaptive orthogonal transform identifier on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable, and context decoding may be performed for the first bin, predetermined context variables (indexes ctxInc) different from each other may be assigned to the second and third bins of the bin sequence and context decoding may be performed for the second and third bins, and bypass decoding may be performed for the fourth bin of the bin sequence (method 2-3).

In the case of the example in A of FIG. 15, the index ctxInc based on the difference (max (log 2W, log 2H)−log 2MinMtsSize) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and bypass decoding (bypass) is performed for the fourth bin (binIdx=3).

Moreover, for example, as illustrated in the table in B of FIG. 15, the context variable ctx (index ctx Inc) may be assigned to the first bin of the bin sequence of the binarized adaptive orthogonal transform identifier on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable, and context decoding may be performed for the first bin, predetermined context variables (indexes ctxInc) different from one another may be assigned to the second to fourth bins of the bin sequence and context decoding may be performed for the second to fourth bins (method 2-4).

In the case of the example in B of FIG. 15, the index ctxInc based on the difference (max (log 2W, log 2H)−log 2MinMtsSize) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and the index ctxInc=B3 is assigned to the fourth bin (binIdx=3) and context decoding is performed for the fourth bin.

Note that, even in the case of decoding, non-overlapping unique values are set in the indexes B1, B2, and B3 in the tables of FIGS. 14 and 15, similarly to the case of encoding.

The number of contexts, the number of context encoding bins, and the number of bypass encoding bins for each of these methods are similar to those for encoding (FIG. 16).

As described above, in any case of the method 2-1 to the method 2-4, the number of contexts required for decoding can be reduced as compared with the case of the method 0. That is, by applying the method 2, the number of contexts assigned to the first bin (binIdx=0) can be reduced. Therefore, an increase in the memory use amount can be suppressed.

Furthermore, in any case of the method 2-1 to the method 2-3, the number of context encoding bins required for decoding can be reduced as compared with the case of the method 0. Note that, in the case of the method 2-4, the number of context encoding bins required for decoding is equivalent to that in the case of the method 0. That is, by applying the method 2, the bypass decoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 2, an increase in the load of the decoding processing can be suppressed.

<3-3. Encoding Side>
<Configuration>

Next, the encoding side will be described. The configuration of the encoding side in this case is similar to that of the first embodiment. That is, the image encoding device 100 in this case has a configuration similar to the configuration described with reference to FIG. 6. Furthermore, the encoding unit 115 in this case has a configuration similar to the configuration described with reference to FIG. 7.

<Flow of Encoding Processing>

Furthermore, the image encoding device 100 in this case performs processing basically similar to the case of the first embodiment. That is, image encoding processing executed by the image encoding device 100 in this case is performed by a flow similar to the case described with reference to the flowchart in FIG. 8.

Figure 17:
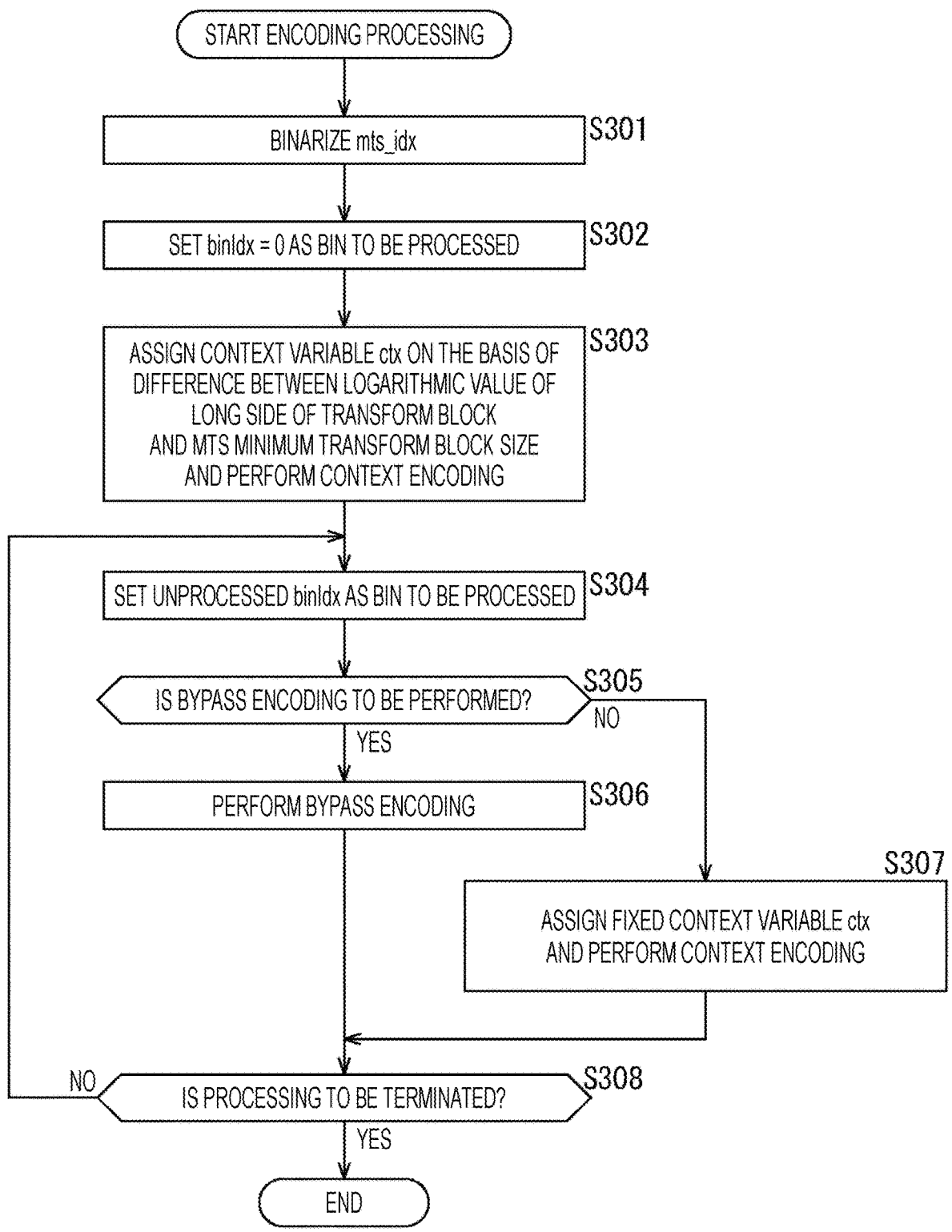
FIG. 17 is a flowchart for describing an example of a flow of encoding processing.

An example of the flow of the encoding processing for encoding the adaptive orthogonal transform identifier, which is executed by the encoding unit 115 in this case, will be described with reference to the flowchart in FIG. 17.

Figure 9:
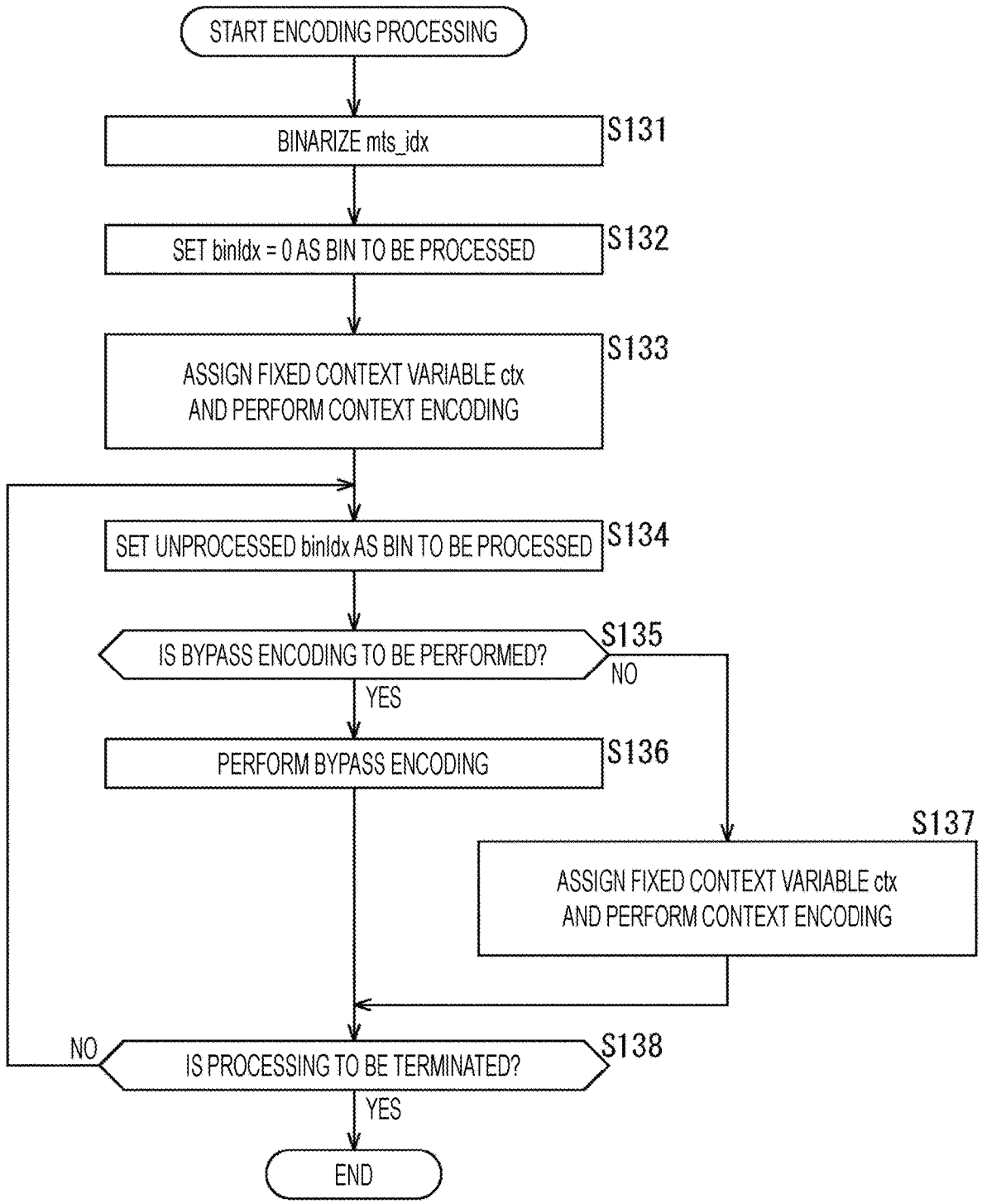
FIG. 9 is a flowchart for describing an example of a flow of image encoding processing.

In this encoding processing, processing in steps S301 and S302 is executed similarly to the processing in steps S131 and S132 in FIG. 9. That is, in this case, the selection unit 132 selects the context setting unit 133 as the supply destination of the bin (that is, context encoding is selected.). For example, the selection unit 132 selects context encoding as the encoding method for this bin according to any one of the tables illustrated in FIGS. 14 and 15 (that is, by applying any one of the method 2-1 to method 2-4).

In step S303, the context setting unit 133 assigns to the bin the context variable ctx (index ctxInc) on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable. Then, the context encoding unit 134 performs arithmetic encoding using the context variable. That is, context encoding is performed.

Processing in steps S304 to S308 is also executed similarly to the processing in steps S134 to S138 in FIG. 9. In step S308, in a case where it is determined to terminate the encoding, the encoding processing is terminated.

By executing each processing as described above, the encoding unit 115 can encode the adaptive orthogonal transform identifier by applying the method 2 (for example, any one of the method 2-1 to method 2-4). Therefore, an increase in the memory use amount can be suppressed. Furthermore, an increase in the processing amount (throughput) can be suppressed. That is, an increase in the load of the encoding processing can be suppressed.

<3-4. Decoding Side>
<Configuration>

Next, the decoding side will be described. The configuration on the decoding side in this case is similar to that of the first embodiment. That is, the image decoding device 200 in this case has a configuration similar to the configuration described with reference to FIG. 10. Furthermore, the decoding unit 212 in this case has a configuration similar to the configuration described with reference to FIG. 11.

<Flow of Decoding Processing>

Furthermore, the image decoding device 200 in this case performs processing basically similar to the case of the first embodiment. That is, image decoding processing executed by the image decoding device 200 in this case is performed by a flow similar to the case described with reference to the flowchart in FIG. 12.

Figure 18:
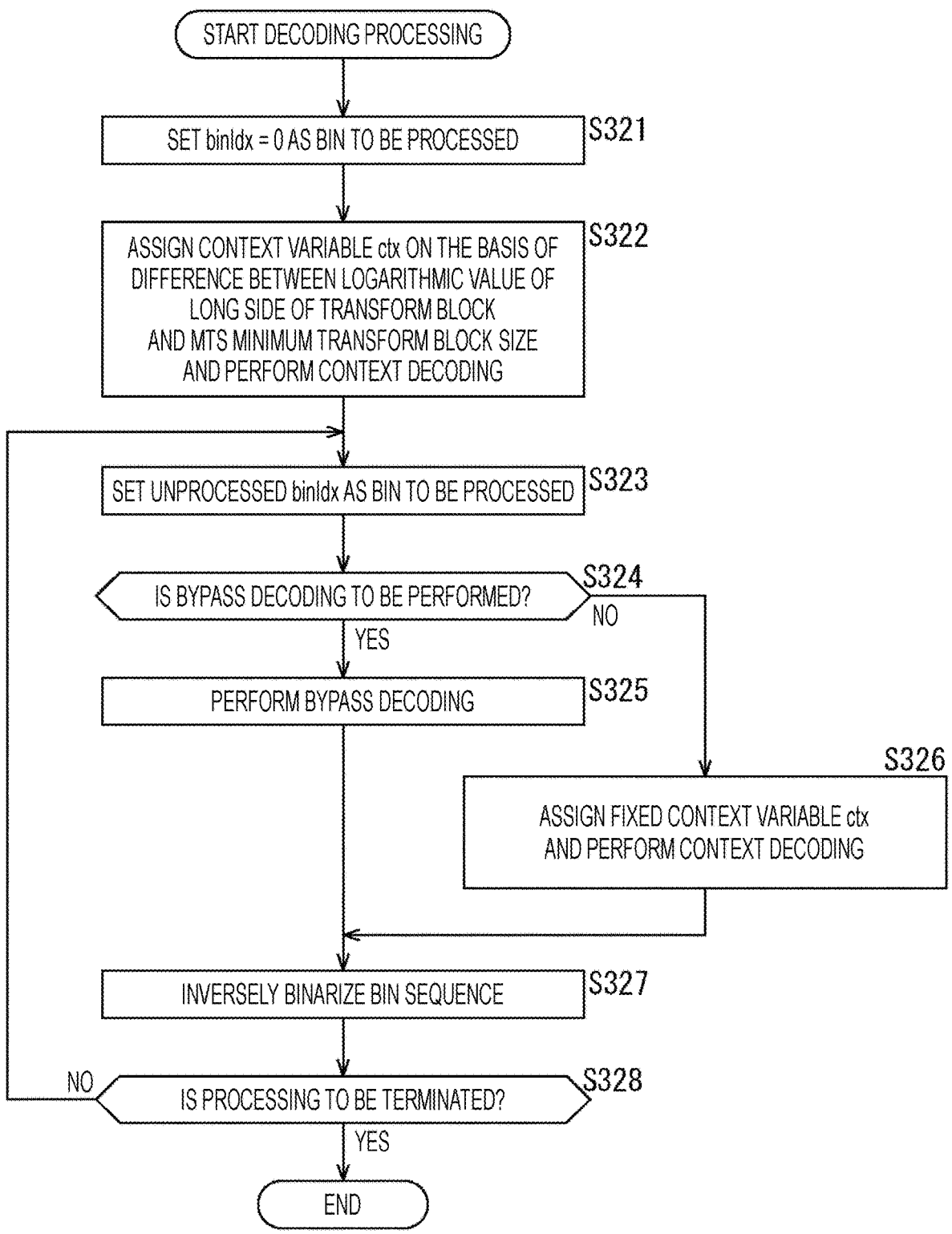
FIG. 18 is a flowchart for describing an example of a flow of decoding processing.

An example of a flow of the decoding processing for decoding coded data of the adaptive orthogonal transform identifier, which is executed by the decoding unit 212 in this case, will be described with reference to the flowchart in FIG. 18.

Figure 13:
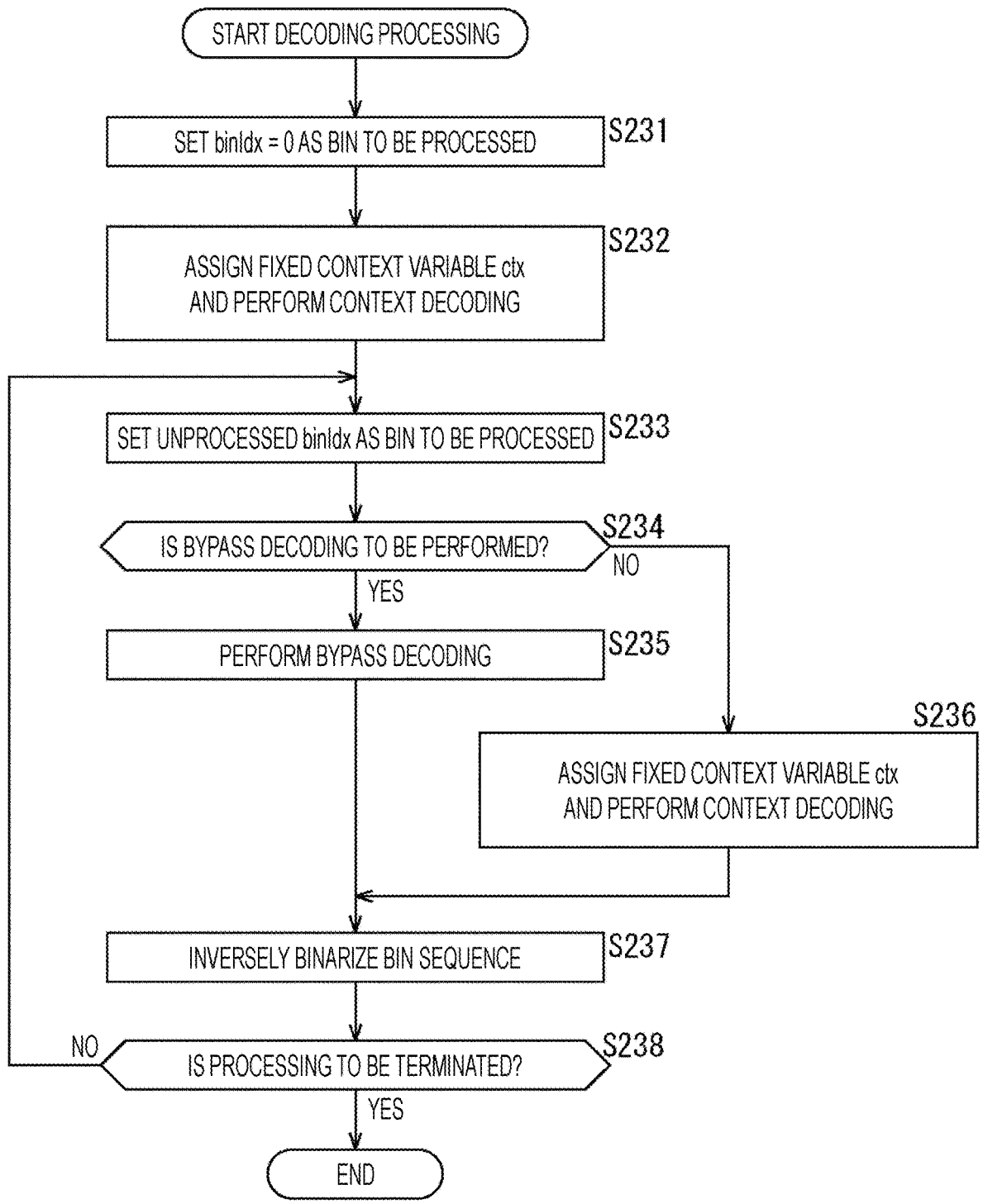
FIG. 13 is a flowchart for describing an example of a flow of decoding processing.

In this decoding processing, the processing of step S321 is performed similarly to the processing of step S231 of FIG. 13. That is, in this case, the selection unit 231 selects the context setting unit 232 as the supply destination of the bin (that is, context decoding is selected.). For example, the selection unit 231 selects context decoding as the decoding method for this bin according to any one of the tables illustrated in FIGS. 14 and 15 (that is, by applying any one of the method 2-1 to method 2-4).

In step S322, the context setting unit 232 assigns to the bin the context variable ctx (index ctxInc) on the basis of the difference (max (log 2W, log 2H)−log 2MinMtsSize) between a longer one between a logarithmic value of a transform block size in a horizontal direction and a logarithmic value of the transform block size in a vertical direction, and a logarithmic value of a minimum transform block size to which the adaptive orthogonal transform is applicable. Then, the context decoding unit 233 performs arithmetic decoding using the context variable. That is, context decoding is performed.

Processing in steps S323 to S328 is also executed similarly to the processing in steps S233 to S238 in FIG. 13. In step S328, in a case where it is determined to terminate the decoding, the decoding processing is terminated.

By executing each processing in this manner, the decoding unit 212 can decode the coded data of the adaptive orthogonal transform identifier by applying the method 2 (for example, any one of the method 2-1 to method 2-4). Therefore, an increase in the memory use amount can be suppressed. Furthermore, an increase in the processing amount (throughput) can be suppressed. That is, an increase in the load of the decoding processing can be suppressed.

4. Third Embodiment

<4-1. Encoding of Adaptive Orthogonal Transform Identifier>

In the present embodiment, assignment (method 0) of a context variable to each bin of a bin sequence obtained by binarizing an adaptive orthogonal transform identifier indicating a mode of adaptive orthogonal transform in image encoding, which has been performed as in the table illustrated in B of FIG. 1, is performed as follows.

That is, the context variable based on a parameter regarding a block size is assigned to a first bin of a bin sequence obtained by binarizing the adaptive orthogonal transform identifier indicating a mode of adaptive orthogonal transform in image encoding, and context encoding is performed for the first bin of the bin sequence.

More specifically, the parameter regarding the block size is a minimum value between a difference between a logarithmic value of a long side of a transformation block and a logarithmic value of a minimum transformation block size to which the adaptive orthogonal transform can be applied, and a predetermined threshold value. That is, the context variable based on a smaller value between the difference between a logarithmic value of a long side of a transformation block and a logarithmic value of a minimum transformation block size to which the adaptive orthogonal transform is applicable, and a predetermined threshold value, is assigned to the first bin of the bin sequence obtained by binarizing the adaptive orthogonal transform identifier indicating a mode of adaptive orthogonal transform in image encoding, and context encoding is performed for the first bin (method 3).

Note that this threshold value TH is an arbitrary value. By setting this threshold value to a value smaller than the maximum value of the difference between a logarithmic value of a long side of a transformation block and a logarithmic value of the minimum transformation block size to which the adaptive orthogonal transform is applicable, the number of contexts can be reduced as compared with the case of the method 2. Therefore, the memory use amount can be reduced.

For example, as illustrated in the table in A of FIG. 19, a context variable ctx (index ctxInc) may be assigned to the first bin of the bin sequence obtained by binarizing the adaptive orthogonal transform identifier on the basis of a smaller value (min(max(log 2W, log 2H)−log 2MinMtsSize, TH)) between the difference (max (log 2W, log 2H)−log 2MinMtsSize) between a longer one (max (log 2W, log 2H)) between a logarithmic value (log 2W) of a transform block size in a horizontal direction and a logarithmic value (log 2H) of the transform block size in a vertical direction, and a logarithmic value (log 2MinMtsSize) of a minimum transform block size to which the adaptive orthogonal transform is applicable, and a predetermined threshold value (TH), and context encoding may be performed for the first bin, and bypass encoding may be performed for the second to fourth bins of the bin sequence (method 3-1).

In the case of the example in A of FIG. 19, the index ctxInc based on the minimum value (min(max(log 2W, log 2H)−log 2MinMtsSize, TH)) is assigned to the first bin (binIdx=0) of the bin sequence of the adaptive orthogonal transform identifier and context encoding is performed for the first bin, and bypass encoding (bypass) is performed for the second to fourth bins (binIdx=1 to 3).

Furthermore, for example, as illustrated in the table in B of FIG. 19, the context variable ctx (index ctxInc) may be assigned to the first bin of the bin sequence obtained by binarizing the adaptive orthogonal transform identifier on the basis of a smaller value (min(max(log 2W, log 2H)−log 2MinMtsSize, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context encoding may be performed for the first bin, a predetermined context variable (index ctxInc) may be assigned to the second bin of the bin sequence and context encoding may be performed for the second bin, and bypass encoding may be performed for the third and fourth bins of the bin sequence (method 3-2).

In the case of the example in B of FIG. 19, the index ctxInc based on the minimum value (min(max(log 2W, log 2H)−log 2MinMtsSize, TH)) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, and bypass encoding (bypass) is performed for the third and fourth bins (binIdx=2 and 3).

Moreover, for example, as illustrated in the table in A of FIG. 20, the context variable ctx (index ctxInc) may be assigned to the first bin of the bin sequence obtained by binarizing the adaptive orthogonal transform identifier on the basis of a smaller value (min(max(log 2W, log 2H)−log 2MinMtsSize, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context encoding may be performed for the first bin, predetermined context variables (indexes ctxInc) different from each other may be assigned to the second and third bins of the bin sequence and context encoding may be performed for the second and third bins, and bypass encoding may be performed for the fourth bin of the bin sequence (method 3-3).

In the case of the example in A of FIG. 20, the index ctxInc based on the minimum value (min(max(log 2W, log 2H)−log 2MinMtsSize, TH)) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and bypass encoding (bypass) is performed for the fourth bin (binIdx=3).

Moreover, for example, as illustrated in the table in B of FIG. 20, the context variable ctx (index ctxInc) may be assigned to the first bin of the bin sequence obtained by binarizing the adaptive orthogonal transform identifier on the basis of a smaller value (min(max(log 2W, log 2H)−log 2MinMtsSize, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context encoding may be performed for the first bin, and predetermined context variables (indexes ctxInc) different from one another may be assigned to the second to fourth bins of the bin sequence and context encoding may be performed for the second to fourth bins (method 3-4).

In the case of the example in B of FIG. 20, the index ctxInc based on the minimum value (min(max(log 2W, log 2H)−log 2MinMtsSize, TH)) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and the index ctxInc=B3 is assigned to the fourth bin (binIdx=3) and context encoding is performed for the fourth bin.

Note that, in the tables of FIGS. 19 and 20, non-overlapping unique values are set in the indexes B1, B2, and B3.

Examples of the number of contexts, the number of context encoding bins, and the number of bypass encoding bins for each of these methods are illustrated in the table of FIG. 21. The table illustrated in A of FIG. 21 illustrates an example in a case where the threshold value TH=2. In this example, for example, in the case of the method 0, the number of contexts is 9, the number of context encoding bins is 4, and the number of bypass encoding bins is 0. In contrast, in the case of the method 3-1, the number of contexts is 3, the number of context encoding bins is 1, and the number of bypass encoding bins is 3. Furthermore, in the case of the method 3-2, the number of contexts is 4, the number of context encoding bins is 2, and the number of bypass encoding bins is 2. Moreover, in the case of the method 3-3, the number of contexts is 5, the number of context encoding bins is 3, and the number of bypass encoding bins is 1. Furthermore, in the case of the method 3-4, the number of contexts is 6, the number of context encoding bins is 4, and the number of bypass encoding bins is 0.

Furthermore, the table illustrated in B of FIG. 21 illustrates an example in a case where the threshold value TH=1. In this example, in the case of the method 3-1, the number of contexts is 2. Furthermore, in the case of the method 3-2, the number of contexts is 3. Moreover, in the case of the method 3-3, the number of contexts is 4. Furthermore, in the case of the method 3-4, the number of contexts is 5.

As described above, in any case of the method 3-1 to the method 3-4, the number of contexts required for encoding can be reduced as compared with the case of the method 0. That is, by applying the method 3, the number of contexts assigned to the first bin (binIdx=0) can be reduced. Therefore, an increase in the memory use amount can be suppressed.

Furthermore, in any case of the method 3-1 to the method 3-3, the number of context encoding bins required for encoding can be reduced as compared with the case of the method 0. Note that, in the case of the method 3-4, the number of context encoding bins required for encoding is equivalent to that in the case of the method 0. That is, by applying the method 3, the bypass encoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 3, an increase in the load of the encoding processing can be suppressed.

<4-2. Decoding of Adaptive Orthogonal Transform Identifier>

Similarly, in the case of decoding, assignment (method 0) of a context variable to each bin of a bin sequence of a binarized adaptive orthogonal transform identifier indicating a mode of inverse adaptive orthogonal transform in image decoding, which has been performed as in the table illustrated in B of FIG. 1, is performed as follows.

That is, the context variable based on a parameter regarding a block size is assigned to a first bin of a bin sequence of the binarized adaptive orthogonal transform identifier, and context encoding is performed for the first bin of the bin sequence.

More specifically, the parameter regarding the block size is a minimum value between a difference between a logarithmic value of a long side of a transformation block and a logarithmic value of a minimum transformation block size to which the adaptive orthogonal transform can be applied, and a predetermined threshold value. That is, the context variable based on a smaller value between the difference between a logarithmic value of a long side of a transformation block and a logarithmic value of a minimum transformation block size to which the adaptive orthogonal transform is applicable, and a predetermined threshold value, is assigned to the first bin of the bin sequence of the binarized adaptive orthogonal transform identifier, and context decoding is performed for the first bin (method 3).

Note that, as in the case of encoding, the threshold value TH is an arbitrary value. By setting this threshold value to a value smaller than the maximum value of the difference between a logarithmic value of a long side of a transformation block and a logarithmic value of the minimum transformation block size to which the adaptive orthogonal transform is applicable, the number of contexts can be reduced as compared with the case of the method 2. Therefore, the memory use amount can be reduced.

For example, as illustrated in the table in A of FIG. 19, a context variable ctx (index ctxInc) may be assigned to the first bin of the bin sequence of the binarized adaptive orthogonal transform identifier on the basis of a smaller value (min(max(log 2W, log 2H)−log 2MinMtsSize, TH)) between the difference (max (log 2W, log 2H)−log 2MinMtsSize) between a longer one (max (log 2W, log 2H)) between a logarithmic value (log 2W) of a transform block size in a horizontal direction and a logarithmic value (log 2H) of the transform block size in a vertical direction, and a logarithmic value (log 2MinMtsSize) of a minimum transform block size to which the adaptive orthogonal transform is applicable, and a predetermined threshold value (TH), and context decoding may be performed for the first bin, and bypass decoding may be performed for the second to fourth bins of the bin sequence (method 3-1).

In the case of the example in A of FIG. 19, the index ctxInc based on the minimum value (min(max(log 2W, log 2H)−log 2MinMtsSize, TH)) is assigned to the first bin (binIdx=0) of the bin sequence of the adaptive orthogonal transform identifier and context decoding is performed for the first bin, and bypass decoding (bypass) is performed for the second to fourth bins (binIdx=1 to 3).

Furthermore, for example, as illustrated in the table in B of FIG. 19, the context variable ctx (index ctxInc) may be assigned to the first bin of the bin sequence of the binarized adaptive orthogonal transform identifier on the basis of a smaller value (min(max(log 2W, log 2H)−log 2MinMtsSize, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context decoding may be performed for the first bin, a predetermined context variable (index ctxInc) may be assigned to the second bin of the bin sequence and context decoding may be performed for the second bin, and bypass decoding may be performed for the third and fourth bins of the bin sequence (method 3-2).

In the case of the example in B of FIG. 19, the index ctxInc based on the minimum value (min(max(log 2W, log 2H)−log 2MinMtsSize, TH) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, and bypass decoding (bypass) is performed for the third and fourth bins (binIdx=2 and 3).

Moreover, for example, as illustrated in the table in A of FIG. 20, the context variable ctx (index ctxInc) may be assigned to the first bin of the bin sequence of the binarized adaptive orthogonal transform identifier on the basis of a smaller value (min(max(log 2W, log 2H)−log 2MinMtsSize, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context decoding may be performed for the first bin, predetermined context variables (indexes ctxInc) different from each other may be assigned to the second and third bins of the bin sequence and context decoding may be performed for the second and third bins, and bypass decoding may be performed for the fourth bin of the bin sequence (method 3-3).

In the case of the example in A of FIG. 20, the index ctxInc based on the minimum value (min(max(log 2w, log 2H)−log 2MinMtsSize, TH) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and bypass decoding (bypass) is performed for the fourth bin (binIdx=3).

Moreover, for example, as illustrated in the table in B of FIG. 20, the context variable ctx (index ctxInc) may be assigned to the first bin of the bin sequence of the binarized adaptive orthogonal transform identifier on the basis of a smaller value (min(max(log 2W, log 2H)−log 2MinMtsSize, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context decoding may be performed for the first bin, and predetermined context variables (indexes ctxInc) different from one another may be assigned to the second to fourth bins of the bin sequence and context decoding may be performed for the second to fourth bins (method 3-4).

In the case of the example in B of FIG. 20, the index ctxInc based on the minimum value (min(max(log 2W, log 2H)−log 2MinMtsSize, TH)) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and the index ctxInc=B3 is assigned to the fourth bin (binIdx=3) and context decoding is performed for the fourth bin. Note that, even in the case of decoding, non-overlapping unique values are set in the indexes B1, B2, and B3 in the tables of FIGS. 19 and 20, similarly to the case of encoding.

The number of contexts, the number of context encoding bins, and the number of bypass encoding bins for each of these methods are similar to those for encoding (A in FIG. 21 and B in FIG. 21).

As described above, in any case of the method 3-1 to the method 3-4, the number of contexts required for decoding can be reduced as compared with the case of the method 0. That is, by applying the method 3, the number of contexts assigned to the first bin (binIdx=0) can be reduced. Therefore, an increase in the memory use amount can be suppressed.

Furthermore, in any case of the method 3-1 to the method 3-3, the number of context encoding bins required for decoding can be reduced as compared with the case of the method 0. Note that, in the case of the method 3-4, the number of context encoding bins required for decoding is equivalent to that in the case of the method 0. That is, by applying the method 3, the bypass decoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 3, an increase in the load of the decoding processing can be suppressed.

<4-3. Encoding Side>
<Configuration>

Next, the encoding side will be described. The configuration of the encoding side in this case is similar to that of the first embodiment. That is, the image encoding device 100 in this case has a configuration similar to the configuration described with reference to FIG. 6. Furthermore, the encoding unit 115 in this case has a configuration similar to the configuration described with reference to FIG. 7.

<Flow of Encoding Processing>

Furthermore, the image encoding device 100 in this case performs processing basically similar to the case of the first embodiment. That is, image encoding processing executed by the image encoding device 100 in this case is performed by a flow similar to the case described with reference to the flowchart in FIG. 8.

Figure 22:
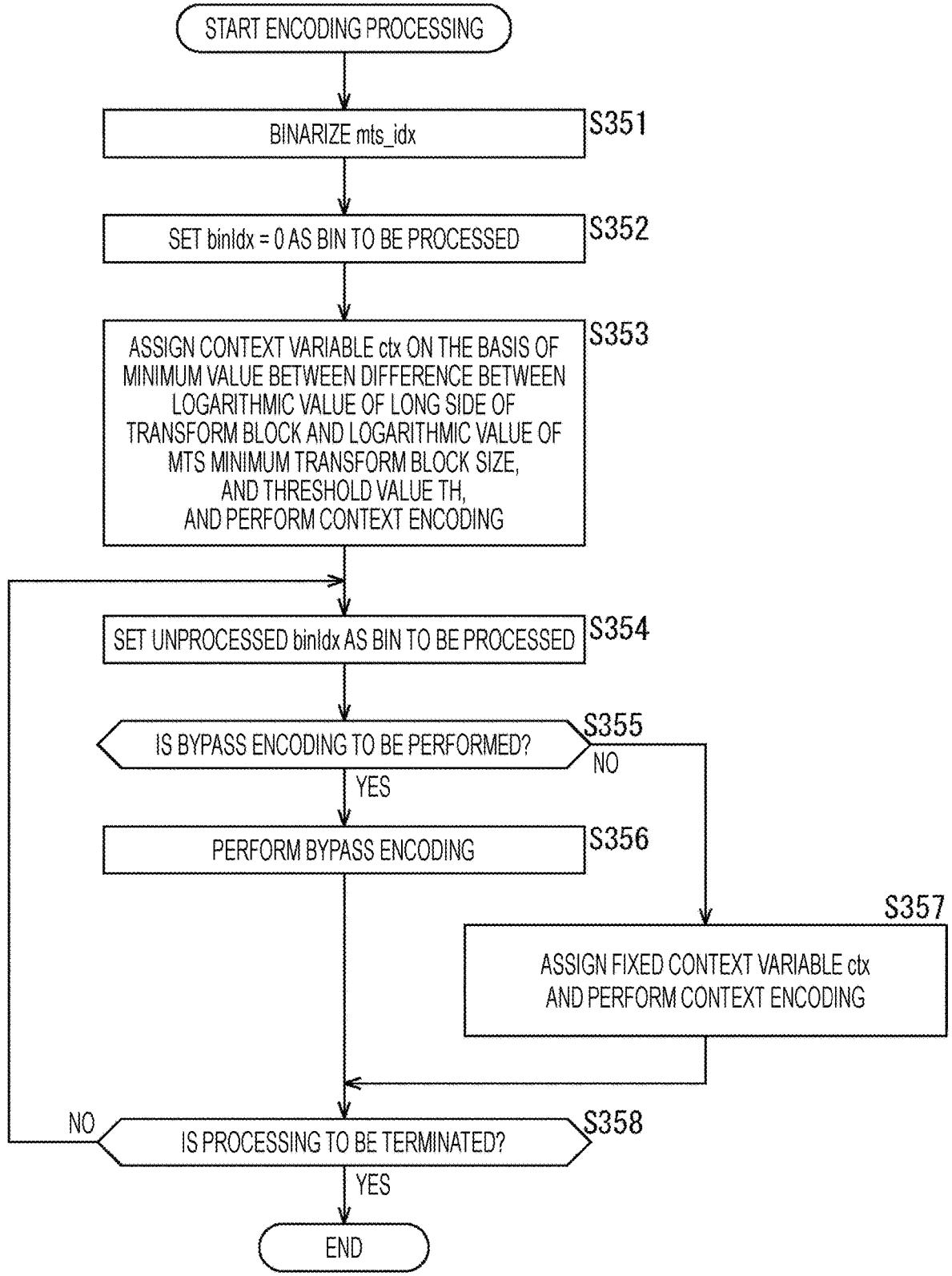
FIG. 22 is a flowchart for describing an example of a flow of encoding processing.

An example of the flow of the encoding processing for encoding the adaptive orthogonal transform identifier, which is executed by the encoding unit 115 in this case, will be described with reference to the flowchart in FIG. 22.

In this encoding processing, processing in steps S351 and S352 is executed similarly to the processing in steps S131 and S132 in FIG. 9. That is, in this case, the selection unit 132 selects the context setting unit 133 as the supply destination of the bin (that is, context encoding is selected.). For example, the selection unit 132 selects context encoding as the encoding method for this bin according to any one of the tables illustrated in FIGS. 19 and 20 (that is, by applying any one of the method 3-1 to method 3-4).

In step S353, the context setting unit 133 assigns to the bin the context variable ctx (index ctxInc) on the basis of the minimum value (min(max(log 2W, log 2H)−log 2MinMtsSize, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value. Then, the context encoding unit 134 performs arithmetic encoding using the context variable. That is, context encoding is performed.

Processing in steps S354 to S358 is also executed similarly to the processing in steps S134 to S138 in FIG. 9. In step S358, in a case where it is determined to terminate the encoding, the encoding processing is terminated.

By executing each processing as described above, the encoding unit 115 can encode the adaptive orthogonal transform identifier by applying the method 3 (for example, any one of the method 3-1 to method 3-4). Therefore, an increase in the memory use amount can be suppressed. Furthermore, an increase in the processing amount (throughput) can be suppressed. That is, an increase in the load of the encoding processing can be suppressed.

<4-4. Decoding Side>
<Configuration>

Next, the decoding side will be described. The configuration on the decoding side in this case is similar to that of the first embodiment. That is, the image decoding device 200 in this case has a configuration similar to the configuration described with reference to FIG. 10. Furthermore, the decoding unit 212 in this case has a configuration similar to the configuration described with reference to FIG. 11.

<Flow of Decoding Processing>

Furthermore, the image decoding device 200 in this case performs processing basically similar to the case of the first embodiment. That is, image decoding processing executed by the image decoding device 200 in this case is performed by a flow similar to the case described with reference to the flowchart in FIG. 12.

Figure 23:
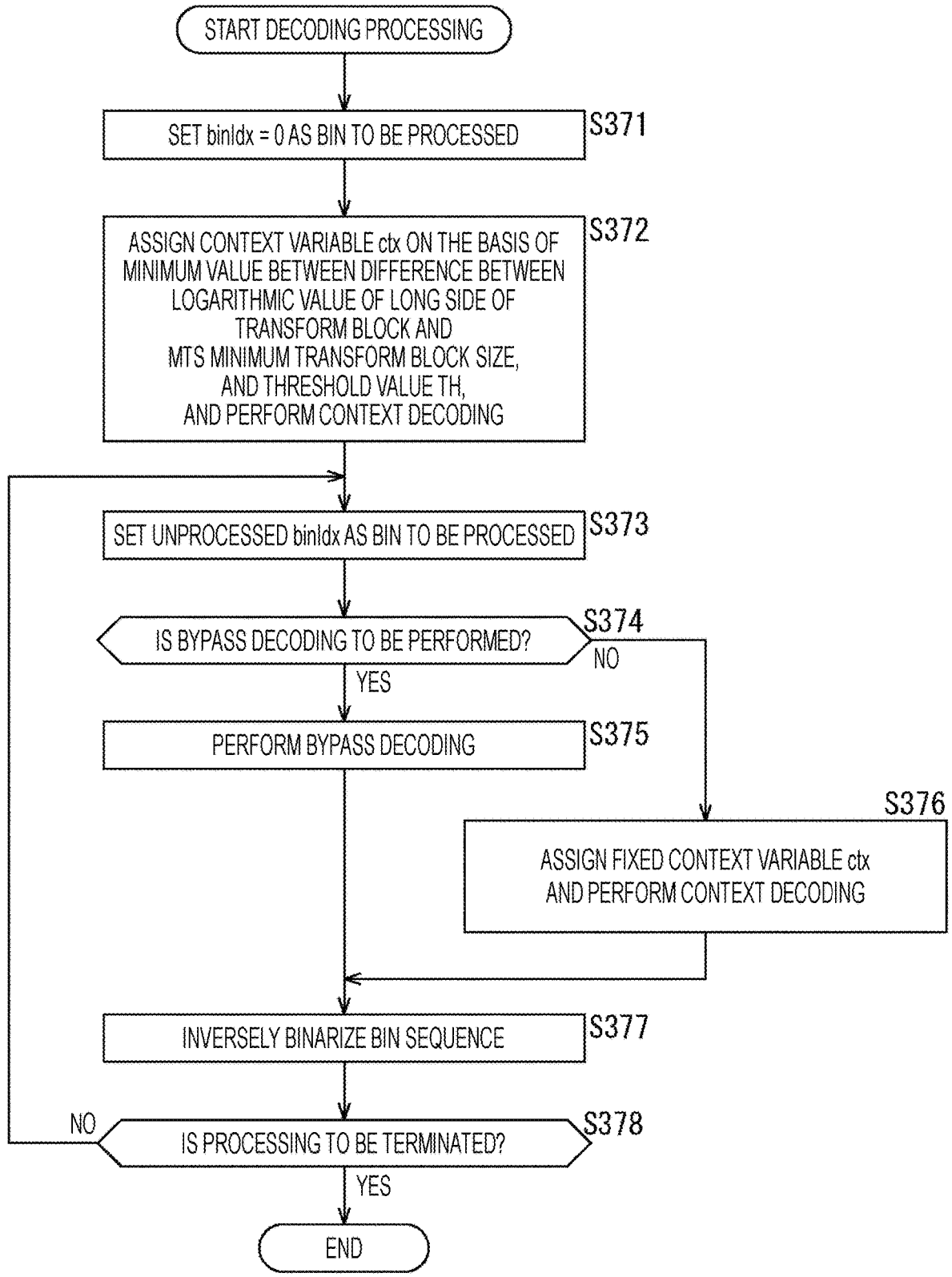
FIG. 23 is a flowchart for describing an example of a flow of decoding processing.

An example of a flow of the decoding processing for decoding coded data of the adaptive orthogonal transform identifier, which is executed by the decoding unit 212 in this case, will be described with reference to the flowchart in FIG. 23.

In this decoding processing, the processing of step S371 is performed similarly to the processing of step S231 of FIG. 13. That is, in this case, the selection unit 231 selects the context setting unit 232 as the supply destination of the bin (that is, context decoding is selected.). For example, the selection unit 231 selects context decoding as the decoding method for this bin according to any one of the tables illustrated in FIGS. 19 and 20 (that is, by applying any one of the method 3-1 to method 3-4).

In step S372, the context setting unit 232 assigns to the bin the context variable ctx (index ctxInc) on the basis of the minimum value (min(max(log 2W, log 2H)−log 2MinMts-Size, TH)) between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value. Then, the context decoding unit 233 performs arithmetic decoding using the context variable. That is, context decoding is performed.

Processing in steps S373 to S378 is also executed similarly to the processing in steps S233 to S238 in FIG. 13. In step S378, in a case where it is determined to terminate the decoding, the decoding processing is terminated.

By executing each processing in this manner, the decoding unit 212 can decode the coded data of the adaptive orthogonal transform identifier by applying the method 3 (for example, any one of the method 3-1 to method 3-4). Therefore, an increase in the memory use amount can be suppressed. Furthermore, an increase in the processing amount (throughput) can be suppressed. That is, an increase in the load of the decoding processing can be suppressed.

5. Fourth Embodiment

<5-1. Encoding of Adaptive Orthogonal Transform Identifier>

In the present embodiment, assignment (method 0) of a context variable to each bin of a bin sequence obtained by binarizing an adaptive orthogonal transform identifier indicating a mode of adaptive orthogonal transform in image encoding, which has been performed as in the table illustrated in B of FIG. 1, is performed as follows.

That is, the context variable based on a parameter regarding a block size is assigned to a first bin of a bin sequence obtained by binarizing the adaptive orthogonal transform identifier indicating a mode of adaptive orthogonal transform in image encoding, and context encoding is performed for the first bin of the bin sequence.

More specifically, the parameter regarding the block size is a result of right-bit shifting the minimum value between a difference between a logarithmic value of a long side of a transformation block and a logarithmic value of a minimum transformation block size to which the adaptive orthogonal transform can be applied, and a predetermined threshold value. That is, the context variable based on a result of right-bit shifting the minimum value between the difference between a logarithmic value of a long side of a transformation block and a logarithmic value of a minimum transformation block size to which the adaptive orthogonal transform is applicable, and a predetermined threshold value, is assigned to the first bin of the bin sequence obtained by binarizing the adaptive orthogonal transform identifier indicating a mode of adaptive orthogonal transform in image encoding, and context encoding is performed for the first bin (method 4).

Note that this threshold value TH is an arbitrary value. By setting this threshold value to a value smaller than the maximum value of the difference between a logarithmic value of a long side of a transformation block and a logarithmic value of the minimum transformation block size to which the adaptive orthogonal transform is applicable, the number of contexts can be reduced as compared with the case of the method 2. Furthermore, the value of a scale parameter shift that is a shift amount of the right bit shift is arbitrary. In the case of the method 4, since the minimum value is further right-bit shifted, the number of contexts can be reduced as compared with the case of the method 3. Therefore, the memory use amount can be reduced.

For example, as illustrated in the table in A of FIG. 24, a context variable ctx (index ctxInc) may be assigned to the first bin of the bin sequence obtained by binarizing the adaptive orthogonal transform identifier on the basis of a result (min(max(log 2W, log 2H)−log 2MinMtsSize, TH)>>shift) of right-bit shifting a smaller value (min(max (log 2W, log 2H)−log 2MinMtsSize, TH)) between the difference (max (log 2W, log 2H)−log 2MinMtsSize) between a longer one (max (log 2W, log 2H)) between a logarithmic value (log 2W) of a transform block size in a horizontal direction and a logarithmic value (log 2H) of the transform block size in a vertical direction, and a logarithmic value (log 2MinMtsSize) of a minimum transform block size to which the adaptive orthogonal transform is applicable, and a predetermined threshold value (TH), and context encoding may be performed for the first bin, and bypass encoding may be performed for the second to fourth bins of the bin sequence (method 4-1).

In the case of the example in A of FIG. 24, the index ctxInc based on the result of right bit shift (min(max(log 2W, log 2H)−log 2MinMtsSize, TH)>>shift) is assigned to the first bin (binIdx=0) of the bin sequence of the adaptive orthogonal transform identifier and context encoding is performed for the first bin, and bypass encoding (bypass) is performed for the second to fourth bins (binIdx=1 to 3).

Furthermore, for example, as illustrated in the table in B of FIG. 24, the context variable ctx (index ctxInc) may be assigned to the first bin of the bin sequence obtained by binarizing the adaptive orthogonal transform identifier on the basis of a result (min(max(log 2W, log 2H)−log 2MinMtsSize, TH)>>shift) of right-bit shifting a smaller value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context encoding may be performed for the first bin, a predetermined context variable (index ctxInc) may be assigned to the second bin of the bin sequence and context encoding may be performed for the second bin, and bypass encoding may be performed for the third and fourth bins of the bin sequence (method 4-2).

In the case of the example in B of FIG. 24, the index ctxInc based on the result of right bit shift (min(max(log 2W, log 2H)−log 2MinMtsSize, TH)>>shift) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, and bypass encoding (bypass) is performed for the third and fourth bins (binIdx=2 and 3).

Moreover, for example, as illustrated in the table in A of FIG. 25, the context variable ctx (index ctxInc) may be assigned to the first bin of the bin sequence obtained by binarizing the adaptive orthogonal transform identifier on the basis of a result (min(max(log 2W, log 2H)−log 2MinMtsSize, TH)>>shift) of right-bit shifting a smaller value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context encoding may be performed for the first bin, predetermined context variables (indexes ctx Inc) different from each other may be assigned to the second and third bins of the bin sequence and context encoding may be performed for the second and third bins, and bypass encoding may be performed for the fourth bin of the bin sequence (method 4-3).

In the case of the example in A of FIG. 25, the index ctxInc based on the result of right bit shift (min(max(log 2W, log 2H)−log 2MinMtsSize, TH)>>shift) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and bypass encoding (bypass) is performed for the fourth bin (binIdx=3).

Moreover, for example, as illustrated in the table in B of FIG. 25, the context variable ctx (index ctxInc) may be assigned to the first bin of the bin sequence obtained by binarizing the adaptive orthogonal transform identifier on the basis of a result (min(max(log 2W, log 2H)−log 2MinMtsSize, TH)>>shift) of right-bit shifting a smaller value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context encoding may be performed for the first bin, and predetermined context variables (indexes ctxInc) different from one another may be assigned to the second to fourth bins of the bin sequence and context encoding may be performed for the second to fourth bins (method 4-4).

In the case of the example in B of FIG. 25, the index ctxInc based on the result of right bit shift (min(max(log 2W, log 2H)−log 2MinMtsSize, TH)>>shift) is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and the index ctxInc=B3 is assigned to the fourth bin (binIdx=3) and context encoding is performed for the fourth bin.

Note that, in the tables of FIGS. 24 and 25, non-overlapping unique values are set in the indexes B1, B2, and B3.

Examples of the number of contexts, the number of context encoding bins, and the number of bypass encoding bins for each of these methods are illustrated in the table of FIG. 26. The table illustrated in FIG. 26 is an example in a case of the threshold value TH=2 and the scale parameter (shift amount of the right bit shift) shift=1. In this example, for example, in the case of the method 0, the number of contexts is 9, the number of context encoding bins is 4, and the number of bypass encoding bins is 0. In contrast, in the case of the method 4-1, the number of contexts is 2, the number of context encoding bins is 1, and the number of bypass encoding bins is 3. Furthermore, in the case of the method 4-2, the number of contexts is 3, the number of context encoding bins is 2, and the number of bypass encoding bins is 2. Moreover, in the case of the method 4-3, the number of contexts is 4, the number of context encoding bins is 3, and the number of bypass encoding bins is 1. Furthermore, in the case of the method 4-4, the number of contexts is 5, the number of context encoding bins is 4, and the number of bypass encoding bins is 0.

As described above, in any case of the method 4-1 to the method 4-4, the number of contexts required for encoding can be reduced as compared with the case of the method 0. That is, by applying the method 4, the number of contexts assigned to the first bin (binIdx=0) can be reduced. Therefore, an increase in the memory use amount can be suppressed.

Furthermore, in any case of the method 4-1 to the method 4-3, the number of context encoding bins required for encoding can be reduced as compared with the case of the method 0. Note that, in the case of the method 4-4, the number of context encoding bins required for encoding is equivalent to that in the case of the method 0. That is, by applying the method 4, the bypass encoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 4, an increase in the load of the encoding processing can be suppressed.

<5-2. Decoding of Adaptive Orthogonal Transform Identifier>

Similarly, in the case of decoding, assignment (method 0) of a context variable to each bin of a bin sequence of a binarized adaptive orthogonal transform identifier indicating a mode of inverse adaptive orthogonal transform in image decoding, which has been performed as in the table illustrated in B of FIG. 1, is performed as follows.

That is, the context variable based on a parameter regarding a block size is assigned to a first bin of a bin sequence of the binarized adaptive orthogonal transform identifier, and context encoding is performed for the first bin of the bin sequence.

More specifically, the parameter regarding the block size is a result of right-bit shifting the minimum value between a difference between a logarithmic value of a long side of a transformation block and a logarithmic value of a minimum transformation block size to which the adaptive orthogonal transform can be applied, and a predetermined threshold value. That is, the context variable based on a result of right-bit shifting the minimum value between the difference between a logarithmic value of a long side of a transformation block and a logarithmic value of a minimum transformation block size to which the adaptive orthogonal transform is applicable, and a predetermined threshold value, is assigned to the first bin of the bin sequence of the binarized adaptive orthogonal transform identifier, and context decoding is performed for the first bin (method 4).

Note that, as in the case of encoding, the threshold value TH is an arbitrary value. By setting this threshold value to a value smaller than the maximum value of the difference between a logarithmic value of a long side of a transformation block and a logarithmic value of the minimum transformation block size to which the adaptive orthogonal transform is applicable, the number of contexts can be reduced as compared with the case of the method 2. Furthermore, the value of a scale parameter shift that is a shift amount of the right bit shift is arbitrary. In the case of the method 4, since the minimum value is further right-bit shifted, the number of contexts can be reduced as compared with the case of the method 3. Therefore, the memory use amount can be reduced.

For example, as illustrated in the table in A of FIG. 24, a context variable ctx (index ctxInc) may be assigned to the first bin of the bin sequence of the binarized adaptive orthogonal transform identifier on the basis of a result (min(max(log 2W, log 2H)−log 2MinMtsSize, TH)>>shift) of right-bit shifting a smaller value (min(max(log 2W, log 2H)−log 2MinMtsSize, TH)) between the difference (max (log 2W, log 2H)−log 2MinMtsSize) between a longer one (max (log 2W, log 2H)) between a logarithmic value (log 2W) of a transform block size in a horizontal direction and a logarithmic value (log 2H) of the transform block size in a vertical direction, and a logarithmic value (log 2MinMtsSize) of a minimum transform block size to which the adaptive orthogonal transform is applicable, and a predetermined threshold value (TH), and context decoding may be performed for the first bin, and bypass decoding may be performed for the second to fourth bins of the bin sequence (method 4-1).

In the case of the example in A of FIG. 24, the index ctxInc based on the result of the right bit shift (min(max(log 2W, log 2H)−log 2MinMtsSize, TH)>>shift) is assigned to the first bin (binIdx=0) of the bin sequence of the adaptive orthogonal transform identifier and context decoding is performed for the first bin, and bypass decoding (bypass) is performed for the second to fourth bins (binIdx=1 to 3).

Furthermore, for example, as illustrated in the table in B of FIG. 24, the context variable ctx (index ctxInc) may be assigned to the first bin of the bin sequence of the binarized adaptive orthogonal transform identifier on the basis of a result (min(max(log 2W, log 2H)−log 2MinMtsSize, TH)>>shift) of right-bit shifting a smaller value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context decoding may be performed for the first bin, a predetermined context variable (index ctxInc) may be assigned to the second bin of the bin sequence and context decoding may be performed for the second bin, and bypass decoding may be performed for the third and fourth bins of the bin sequence (method 4-2).

In the case of the example in B of FIG. 24, the index ctxInc based on the result of the right bit shift (min(max(log 2W, log 2H)−log 2MinMtsSize, TH)>>shift) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, and bypass decoding (bypass) is performed for the third and fourth bins (binIdx=2 and 3).

Moreover, for example, as illustrated in the table in A of FIG. 25, the context variable ctx (index ctxInc) may be assigned to the first bin of the bin sequence of the binarized adaptive orthogonal transform identifier on the basis of a result (min(max(log 2W, log 2H)−log 2MinMtsSize, TH)>>shift) of right-bit shifting a smaller value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context decoding may be performed for the first bin, predetermined context variables (indexes ctxInc) different from each other may be assigned to the second and third bins of the bin sequence and context decoding may be performed for the second and third bins, and bypass decoding may be performed for the fourth bin of the bin sequence (method 4-3).

In the case of the example in A of FIG. 25, the index ctxInc based on the result of the right bit shift (min(max(log 2W, log 2H)−log 2MinMtsSize, TH)>>shift) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and bypass decoding (bypass) is performed for the fourth bin (binIdx=3).

Moreover, for example, as illustrated in the table in B of FIG. 25, the context variable ctx (index ctxInc) may be assigned to the first bin of the bin sequence of the binarized adaptive orthogonal transform identifier on the basis of a result (min(max(log 2W, log 2H)−log 2MinMtsSize, TH)>>shift) of right-bit shifting a smaller value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, and context decoding may be performed for the first bin, and predetermined context variables (indexes ctxInc) different from one another may be assigned to the second to fourth bins of the bin sequence and context decoding may be performed for the second to fourth bins (method 4-4).

In the case of the example in B of FIG. 25, the index ctxInc based on the result of the right bit shift (min(max(log 2W, log 2H)−log 2MinMtsSize, TH)>>shift) is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, the index ctxInc=B2 is assigned to the third bin (binIdx=2) and context decoding is performed for the third bin, and the index ctxInc=B3 is assigned to the fourth bin (binIdx=3) and context decoding is performed for the fourth bin.

Note that, even in the case of decoding, non-overlapping unique values are set in the indexes B1, B2, and B3 in the tables of FIGS. 24 and 25, similarly to the case of encoding.

The number of contexts, the number of context encoding bins, and the number of bypass encoding bins for each of these methods are similar to those for encoding (FIG. 26).

As described above, in any case of the method 4-1 to the method 4-4, the number of contexts required for decoding can be reduced as compared with the case of the method 0. That is, by applying the method 4, the number of contexts assigned to the first bin (binIdx=0) can be reduced. Therefore, an increase in the memory use amount can be suppressed.

Furthermore, in any case of the method 4-1 to the method 4-3, the number of context encoding bins required for decoding can be reduced as compared with the case of the method 0. Note that, in the case of the method 4-4, the number of context encoding bins required for decoding is equivalent to that in the case of the method 0. That is, by applying the method 4, the bypass decoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 4, an increase in the load of the decoding processing can be suppressed.

<5-3. Encoding Side>
<Configuration>

Next, the encoding side will be described. The configuration of the encoding side in this case is similar to that of the first embodiment. That is, the image encoding device 100 in this case has a configuration similar to the configuration described with reference to FIG. 6. Furthermore, the encoding unit 115 in this case has a configuration similar to the configuration described with reference to FIG. 7.

<Flow of Encoding Processing>

Furthermore, the image encoding device 100 in this case performs processing basically similar to the case of the first embodiment. That is, image encoding processing executed by the image encoding device 100 in this case is performed by a flow similar to the case described with reference to the flowchart in FIG. 8.

Figure 27:
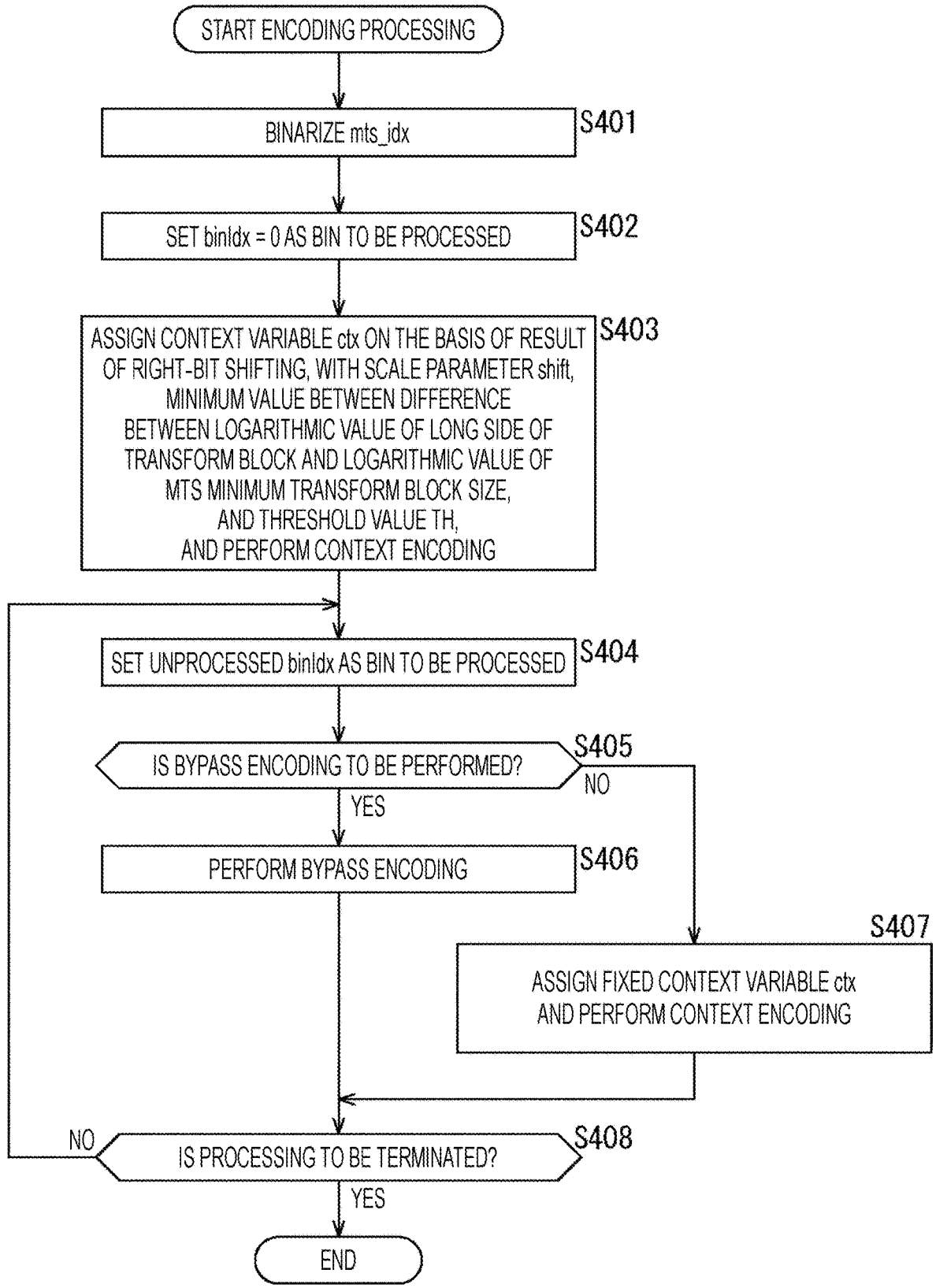
FIG. 27 is a flowchart for describing an example of a flow of encoding processing.

An example of the flow of the encoding processing for encoding the adaptive orthogonal transform identifier, which is executed by the encoding unit 115 in this case, will be described with reference to the flowchart in FIG. 27.

In this encoding processing, processing in steps S401 and S402 is executed similarly to the processing in steps S131 and S132 in FIG. 9. That is, in this case, the selection unit 132 selects the context setting unit 133 as the supply destination of the bin (that is, context encoding is selected.). For example, the selection unit 132 selects context encoding as the encoding method for this bin according to any one of the tables illustrated in FIGS. 24 and 25 (that is, by applying any one of the method 4-1 to method 4-4).

In step S403, the context setting unit 133 assigns to the bin the context variable ctx (index ctxInc) on the basis of the result (min(max(log 2W, log 2H)−log 2MinMtsSize, TH)>>shift) of right-bit shifting the minimum value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, by a scale parameter shift. Then, the context encoding unit 134 performs arithmetic encoding using the context variable. That is, context encoding is performed.

Processing in steps S404 to S408 is also executed similarly to the processing in steps S134 to S138 in FIG. 9. In step S408, in a case where it is determined to terminate the encoding, the encoding processing is terminated.

By executing each processing as described above, the encoding unit 115 can encode the adaptive orthogonal transform identifier by applying the method 4 (for example, any one of the method 4-1 to method 4-4). Therefore, an increase in the memory use amount can be suppressed. Furthermore, an increase in the processing amount (throughput) can be suppressed. That is, an increase in the load of the encoding processing can be suppressed.

<5-4. Decoding Side>
<Configuration>

Next, the decoding side will be described. The configuration on the decoding side in this case is similar to that of the first embodiment. That is, the image decoding device 200 in this case has a configuration similar to the configuration described with reference to FIG. 10. Furthermore, the decoding unit 212 in this case has a configuration similar to the configuration described with reference to FIG. 11.

<Flow of Decoding Processing>

Furthermore, the image decoding device 200 in this case performs processing basically similar to the case of executed by the image decoding device 200 in this case is performed by a flow similar to the case described with reference to the flowchart in FIG. 12.

Figure 28:
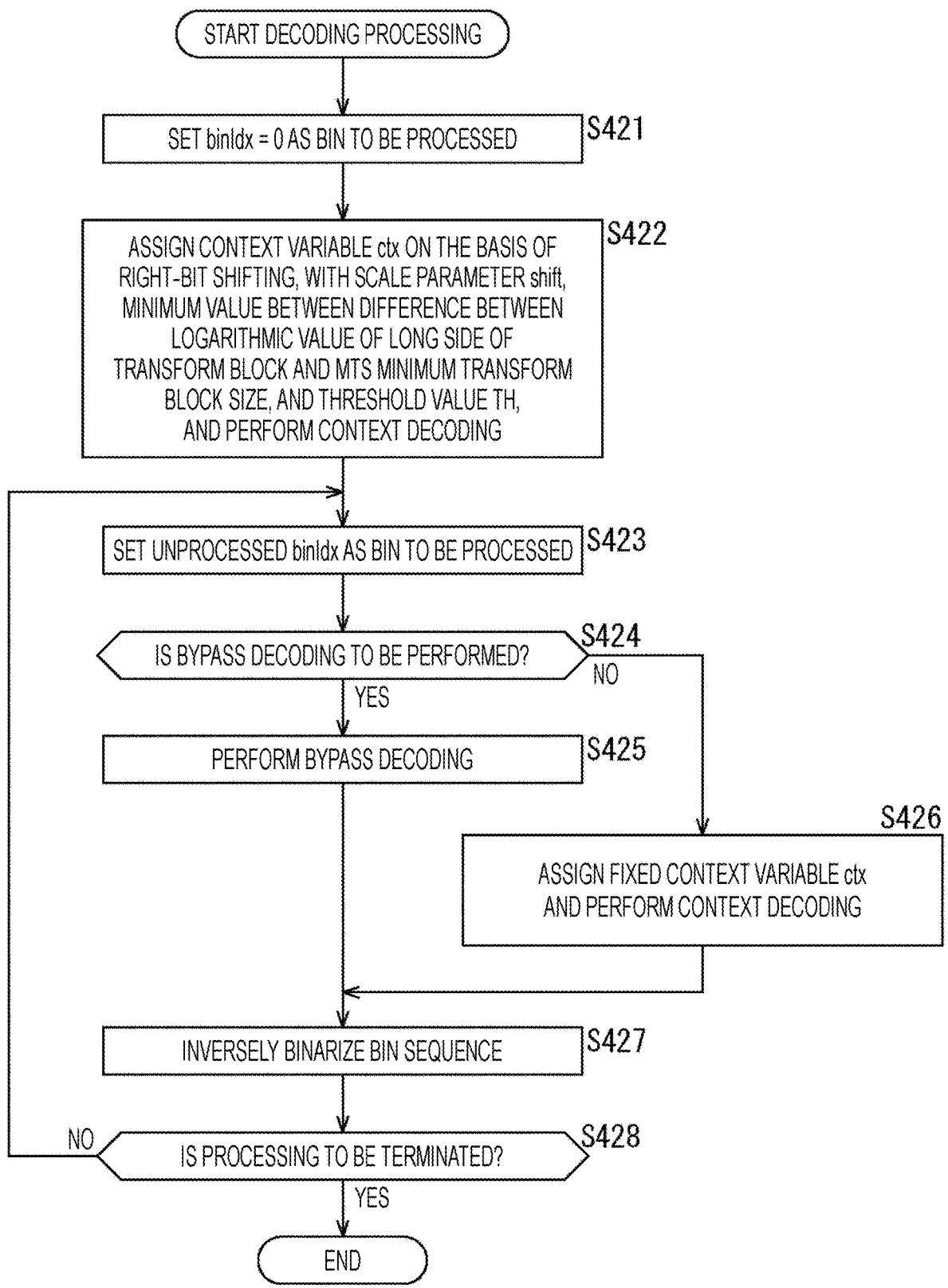
FIG. 28 is a flowchart for describing an example of a flow of decoding processing.

An example of a flow of the decoding processing for decoding coded data of the adaptive orthogonal transform identifier, which is executed by the decoding unit 212 in this case, will be described with reference to the flowchart in FIG. 28.

In this decoding processing, the processing of step S421 is performed similarly to the processing of step S231 of FIG. 13. That is, in this case, the selection unit 231 selects the context setting unit 232 as the supply destination of the bin (that is, context decoding is selected.). For example, the selection unit 231 selects context decoding as the decoding method for this bin according to any one of the tables illustrated in FIGS. 24 and 25 (that is, by applying any one of the method 4-1 to method 4-4).

In step S422, the context setting unit 232 assigns to the bin the context variable ctx (index ctxInc) on the basis of the result (min(max(log 2W, log 2H)−log 2MinMtsSize, TH)>>shift) of right-bit shifting the minimum value between the difference between a longer one between a logarithmic value of a transform block size in a horizontal direction and a logarithmic value of the transform block size in a vertical direction, and a logarithmic value of a minimum transform block size to which the adaptive orthogonal transform is applicable, and a predetermined threshold value, by a scale parameter shift. Then, the context decoding unit 233 performs arithmetic decoding using the context variable. That is, context decoding is performed.

Processing in steps S423 to S428 is also executed similarly to the processing in steps S233 to S238 in FIG. 13. In step S428, in a case where it is determined to terminate the decoding, the decoding processing is terminated.

By executing each processing in this manner, the decoding unit 212 can decode the coded data of the adaptive orthogonal transform identifier by applying the method 4 (for example, any one of the method 4-1 to method 4-4). Therefore, an increase in the memory use amount can be suppressed. Furthermore, an increase in the processing amount (throughput) can be suppressed. That is, an increase in the load of the decoding processing can be suppressed.

6. Fifth Embodiment

<6-1. Encoding of Adaptive Orthogonal Transform identifier>

In the present embodiment, assignment (method 0) of a context variable to each bin of a bin sequence obtained by binarizing an adaptive orthogonal transform identifier indicating a mode of adaptive orthogonal transform in image encoding, which has been performed as in the table illustrated in B of FIG. 1, is performed as follows.

That is, the context variable based on a parameter regarding a block size is assigned to a first bin of a bin sequence obtained by binarizing the adaptive orthogonal transform identifier indicating a mode of adaptive orthogonal transform in image encoding, and context encoding is performed for the first bin of the bin sequence.

More specifically, the context variable according to whether or not the parameter regarding the block size is equal to or larger than a predetermined threshold value is assigned and context encoding is performed (method 5).

For example, as in the table illustrated in A of FIG. 29, a context variable ctx (index ctxInc) may be assigned to the first bin of the bin sequence obtained by binarizing the adaptive orthogonal transform identifier according to whether or not a parameter (S) regarding the block size is equal to or larger than a predetermined threshold value (TH) (S<TH?) and context encoding may be performed for the first bin, and bypass encoding may be performed for second to fourth bins of the bin sequence (method 5-1).

In the example in A of FIG. 29, in the case where the parameter regarding the block size is less than the predetermined threshold value (S<TH), the index ctxInc=A0 is assigned to the first bin (binIdx=0) of the bin sequence of the adaptive orthogonal transform identifier and context encoding is performed for the first bin, and in the case where the parameter regarding the block size is equal to or larger than the predetermined threshold value (S>TH), the index ctxInc=A1 is assigned to the first bin and context encoding is performed for the first bin. Furthermore, bypass encoding (bypass) is performed for the second to fourth bins (binIdx=1 to 3).

Furthermore, for example, as in the table illustrated in B of FIG. 29, the context variable ctx (index ctxInc) may be assigned to the first bin of the bin sequence obtained by binarizing the adaptive orthogonal transform identifier according to whether or not the parameter regarding the block size is equal to or larger than the predetermined threshold value (S<TH?) and context encoding may be performed for the first bin, the predetermined context variable (index ctxInc) may be assigned to the second bin and context encoding may be performed for the second bin, and bypass encoding may be performed for the third and fourth bins of the bin sequence (method 5-2).

In the case of the example in B of FIG. 29, in the case where the parameter regarding the block size is less than the predetermined threshold value (S<TH), the index ctxInc=A0 is assigned to the first bin (binIdx=0) of the bin sequence of the adaptive orthogonal transform identifier and context encoding is performed for the first bin, in the case where the parameter regarding the block size is equal to or larger than the predetermined threshold value (S≥TH), the index ctxInc performed for the first bin, the index ctxInc=B1 is assigned to the second bin (binIdx=1) and context encoding is performed for the second bin, and bypass encoding (bypass) is performed for the third and fourth bins (binIdx=2 and 3).

Moreover, for example, as in the table illustrated in A of FIG. 30, the context variable ctx (index ctxInc) may be assigned to the first bin of the bin sequence obtained by binarizing the adaptive orthogonal transform identifier according to whether or not the parameter regarding a block size is equal to or larger than the predetermined threshold value (S<TH?) and context encoding may be performed for the first bin, the predetermined context variables (indexes ctxInc) different from each other may be assigned to the second and third bins and context encoding may be performed for the second and third bins, and bypass encoding may be performed for the fourth bin of the bin sequence (method 5-3).

In the case of the example in A of FIG. 30, in the case where the parameter regarding the block size is less than the predetermined threshold value (S<TH), the index ctxInc=A0 is assigned to the first bin (binIdx=0) of the bin sequence of the adaptive orthogonal transform identifier and context encoding is performed for the first bin, and in the case where the parameter regarding the block size is equal to or larger than the predetermined threshold value (S>TH), the index ctxInc performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and bypass encoding (bypass) is performed for the fourth bin (binIdx=3).

Moreover, for example, as in the table illustrated in B of FIG. 30, the context variable ctx (index ctxInc) may be assigned to the first bin of the bin sequence obtained by binarizing the adaptive orthogonal transform identifier according to whether or not the parameter regarding a block size is equal to or larger than the predetermined threshold value (S<TH?) and context encoding may be performed for the first bin, and the predetermined context variables (indexes ctxInc) different from one another may be assigned to the second to fourth bins and context encoding may be performed for the second to fourth bins (method 5-4).

In the case of the example in B of FIG. 30, in the case where the parameter regarding the block size is less than the predetermined threshold value (S<TH), the index ctxInc=A0 is assigned to the first bin (binIdx=0) of the bin sequence of the adaptive orthogonal transform identifier and context encoding is performed for the first bin, and in the case where the parameter regarding the block size is equal to or larger than the predetermined threshold value (S>TH), the index ctxInc performed for the first bin, the index ctxInc=B1 is assigned to the second bin (binIdx=1) and context encoding is performed for the second bin, the index ctxInc=B2 is assigned to the third bin (binIdx=2) and context encoding is performed for the third bin, and the index ctxInc=B3 is assigned to the fourth bin (binIdx=3) and context encoding is performed for the fourth bin. Note that, in the tables of FIGS. 29 and 30, non-overlapping unique values are set in the indexes A0, A1, B1, B2, and B3.

Note that the parameter S may be any parameter as long as the parameter S relates to a block size.

For example, the parameter S may be a product of a width tbWidth and a height tbHeight of a transform block, that is, the area of the transform block.

$$S = tbWidth * tbHeght$$

Furthermore, the parameter S may be a sum of a logarithmic value of the width tbWidth and a logarithmic value of the height tbHeight of the transform block, that is, a logarithmic value of the area of the transform block.

$$S = \log2(tbWidth) + \log2(tbHeight)$$

Moreover, the parameter S may be a maximum value of the width tbWidth and the height tbHeight of the transform block, that is, a size of a long side of the transform block.

$$S = \max(tbWidth, tbHeight)$$

Furthermore, the parameter S may be a minimum value of the width tbWidth and the height tbHeight of the transform block, that is, a size of a short side of the transform block.

$$S = \min(tbWidth, tbHeight)$$

Moreover, the parameter S may be a maximum value of the logarithmic value of the width tbWidth and the logarithmic value of the height tbHeight of the transform block, that is, a logarithmic value of the size of the long side of the transform block.

$$S = \max(\log2(tbWidth), \log2(tbHeight)$$

Furthermore, the parameter S may be a minimum value of the logarithmic value of the width tbWidth and the logarithmic value of the height tbHeight of the transform block, that is, a logarithmic value of the size of the short side of the transform block.

$$S = \min(\log2(tbWidth), \log2(tbHeight)$$

Moreover, the parameter S may be a ratio cbSubDiv of an area of a coding block to an area of a CTU. An example of a value of the ratio cbSubDiv of the area of the coding block to the area of the CTU is illustrated in the table of FIG. 31.

$$S = cbSubDiv$$

Furthermore, the parameter S may be a result of right-bit shifting the ratio cbSubDiv of the area of the coding block to the area of the CTU by a scale parameter shift. Note that the scale parameter shift may be a difference between a logarithmic value of the block size of the CTU and a logarithmic value of the maximum transform block size. Furthermore, the logarithmic value of the maximum transform block size may be 5.

$$S = cbSubDiv >> shift$$
$$shift = (\log2CTUSize - \log2MaxTsSize$$
$$\log2MaxTsSize = 5$$

Moreover, the parameter S may be an absolute value of a difference between the logarithmic value of the width tbWidth and the logarithmic value of the height tbHeight of the transform block.

$$S = abs(\log2(tbWidth) - \log2(tbHeight))$$

Examples of the number of contexts, the number of context encoding bins, and the number of bypass encoding bins for each of these methods are illustrated in the table of FIG. 32. In this example, for example, in the case of the method 0, the number of contexts is 9, the number of context encoding bins is 4, and the number of bypass encoding bins is 0. In contrast, in the case of the method 5-1, the number of contexts is 2, the number of context encoding bins is 1, and the number of bypass encoding bins is 3. Furthermore, in the case of the method 5-2, the number of contexts is 3, the number of context encoding bins is 2, and the number of bypass encoding bins is 2. Moreover, in the case of the method 5-3, the number of contexts is 4, the number of context encoding bins is 3, and the number of bypass encoding bins is 1. Furthermore, in the case of the method 5-4, the number of contexts is 5, the number of context encoding bins is 4, and the number of bypass encoding bins is 0.

As described above, in any case of the method 5-1 to the method 5-4, the number of contexts required for encoding can be reduced as compared with the case of the method 0. That is, by applying the method 5, the number of contexts assigned to the first bin (binIdx=0) can be reduced. Therefore, an increase in the memory use amount can be suppressed.

Furthermore, in any case of the method 5-1 to the method 5-3, the number of context encoding bins required for encoding can be reduced as compared with the case of the method 0. Note that, in the case of the method 5-4, the number of context encoding bins required for encoding is equivalent to that in the case of the method 0. That is, by applying the method 5, the bypass encoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 5, an increase in the load of the encoding processing can be suppressed.

<6-2. Decoding of Adaptive Orthogonal Transform Identifier>

Similarly, in the case of decoding, assignment (method 0) of a context variable to each bin of a bin sequence of a binarized adaptive orthogonal transform identifier indicating a mode of inverse adaptive orthogonal transform in image decoding, which has been performed as in the table illustrated in B of FIG. 1, is performed as follows.

That is, the context variable based on a parameter regarding a block size is assigned to a first bin of a bin sequence of the binarized adaptive orthogonal transform identifier, and context encoding is performed for the first bin of the bin sequence.

More specifically, the context variable according to whether or not the parameter regarding the block size is equal to or larger than a predetermined threshold value is assigned and context decoding is performed (method 5).

For example, as in the table illustrated in A of FIG. 29, the context variable ctx (index ctxInc) may be assigned to the first bin of the bin sequence of the binarized adaptive orthogonal transform identifier according to whether or not the parameter (S) regarding the block size is equal to or larger than the predetermined threshold value (TH) (S<TH?) and context decoding may be performed for the first bin, and bypass decoding may be performed for second to fourth bins of the bin sequence (method 5-1).

In the example in A of FIG. 29, in the case where the parameter regarding the block size is less than the predetermined threshold value (S<TH), the index ctxInc=A0 is assigned to the first bin (binIdx=0) of the bin sequence of the adaptive orthogonal transform identifier and context decoding is performed for the first bin, and in the case where the parameter regarding the block size is equal to or larger than the predetermined threshold value (S≥TH), the index ctxInc=A1 is assigned to the first bin and context decoding is performed for the first bin. Furthermore, bypass decoding (bypass) is performed for the second to fourth bins (binIdx=1 to 3).

Furthermore, for example, as in the table illustrated in B of FIG. 29, the context variable ctx (index ctxInc) may be assigned to the first bin of the bin sequence of the binarized adaptive orthogonal transform identifier according to whether or not the parameter regarding the block size is equal to or larger than the predetermined threshold value (S<TH?) and context decoding may be performed for the first bin, the predetermined context variable (index ctxInc) may be assigned to the second bin and context decoding may be performed for the second bin, and bypass decoding may be performed for the third and fourth bins of the bin sequence (method 5-2).

In the example in B of FIG. 29, in the case where the parameter regarding the block size is less than the predetermined threshold value (S<TH), the index ctxInc=A0 is assigned to the first bin (binIdx=0) of the bin sequence of the adaptive orthogonal transform identifier and context decoding is performed for the first bin, and in the case where the parameter regarding the block size is equal to or larger than the predetermined threshold value (S≥TH), the index ctxInc=A1 is assigned to the first bin and context decoding is performed for the first bin. Furthermore, the index ctxInc=B1 is assigned to the second bin (binIdx=1) and context decoding is performed for the second bin, and bypass decoding (bypass) is performed for the third and fourth bins (binIdx=2 and 3).

Moreover, for example, as in the table illustrated in A of FIG. 30, the context variable ctx (index ctxInc) may be assigned to the first bin of the bin sequence of the binarized adaptive orthogonal transform identifier according to whether or not the parameter regarding the block size is equal to or larger than the predetermined threshold value (S<TH?) and context decoding may be performed for the first bin, predetermined context variables (indexes ctxInc) different from each other may be assigned to the second and third bins and context decoding may be performed for the second and third bins, and bypass decoding may be performed for the fourth bin of the bin sequence (method 5-3).

In the example in A of FIG. 30, in the case where the parameter regarding the block size is less than the predetermined threshold value (S<TH), the index ctxInc=A0 is assigned to the first bin (binIdx=0) of the bin sequence of the adaptive orthogonal transform identifier and context decoding is performed for the first bin, and in the case where the parameter regarding the block size is equal to or larger than the predetermined threshold value (S≥TH), the index ctxInc=A1 is assigned to the first bin and context decoding is performed for the first bin. Furthermore, the index ctxInc=B1 is assigned to the second bin (binIdx=1) and context decoding is performed for the second bin, the index ctxInc=B2 is assigned to the third bin (binIdx=2) and context decoding is performed for the third bin, and bypass decoding (bypass) is performed for the fourth bin (binIdx=3).

Moreover, for example, as in the table illustrated in B of FIG. 30, the context variable ctx (index ctxInc) may be assigned to the first bin of the bin sequence of the binarized adaptive orthogonal transform identifier according to whether or not the parameter regarding a block size is equal to or larger than the predetermined threshold value (S<TH?) and context decoding may be performed for the first bin, and the predetermined context variables (indexes ctxInc) different from one another may be assigned to the second to fourth bins and context decoding may be performed for the second to fourth bins (method 5-4).

In the example in B of FIG. 25, in the case where the parameter regarding the block size is less than the predetermined threshold value (S<TH), the index ctxInc=A0 is assigned to the first bin (binIdx=0) of the bin sequence of the adaptive orthogonal transform identifier and context decoding is performed for the first bin, and in the case where the parameter regarding the block size is equal to or larger than the predetermined threshold value (S≥TH), the index ctxInc=A1 is assigned to the first bin and context decoding is performed for the first bin. Furthermore, the index ctxInc=B1 is assigned to the second bin (binIdx=1) and context decoding is performed for the second bin, the index ctxInc=B2 is assigned to the third bin (binIdx=2) and context decoding is performed for the third bin, and the index ctxInc=B3 is assigned to the fourth bin (binIdx=3) and context decoding is performed for the fourth bin.

Note that, even in the case of decoding, non-overlapping unique values are set in the indexes A0, A1, B1, B2, and B3 in the tables of FIGS. 29 and 30, similarly to the case of encoding.

Furthermore, in the case of decoding, the parameter S may be any parameter as long as the parameter S relates to a block size, similarly to the case of encoding. For example, the parameter S may be able to be derived by the various methods described in <6-1. Encoding of adaptive orthogonal transform identifier>.

The number of contexts, the number of context encoding bins, and the number of bypass encoding bins for each of these methods are similar to those for encoding (FIG. 32).

As described above, in any case of the method 5-1 to the method 5-4, the number of contexts required for decoding can be reduced as compared with the case of the method 0. That is, by applying the method 5, the number of contexts assigned to the first bin (binIdx=0) can be reduced. Therefore, an increase in the memory use amount can be suppressed.

Furthermore, in any case of the method 5-1 to the method 5-3, the number of context encoding bins required for decoding can be reduced as compared with the case of the method 0. Note that, in the case of the method 5-4, the number of context encoding bins required for decoding is equivalent to that in the case of the method 0. That is, by applying the method 5, the bypass decoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

As described above, by applying the method 5, an increase in the load of the decoding processing can be suppressed.

<6-3. Encoding Side>
<Configuration>

Next, the encoding side will be described. The configuration of the encoding side in this case is similar to that of the first embodiment. That is, the image encoding device 100 in this case has a configuration similar to the configuration described with reference to FIG. 6. Furthermore, the encoding unit 115 in this case has a configuration similar to the configuration described with reference to FIG. 7.

<Flow of Encoding Processing>

Furthermore, the image encoding device 100 in this case performs processing basically similar to the case of the first embodiment. That is, image encoding processing executed by the image encoding device 100 in this case is performed by a flow similar to the case described with reference to the flowchart in FIG. 8.

Figure 33:
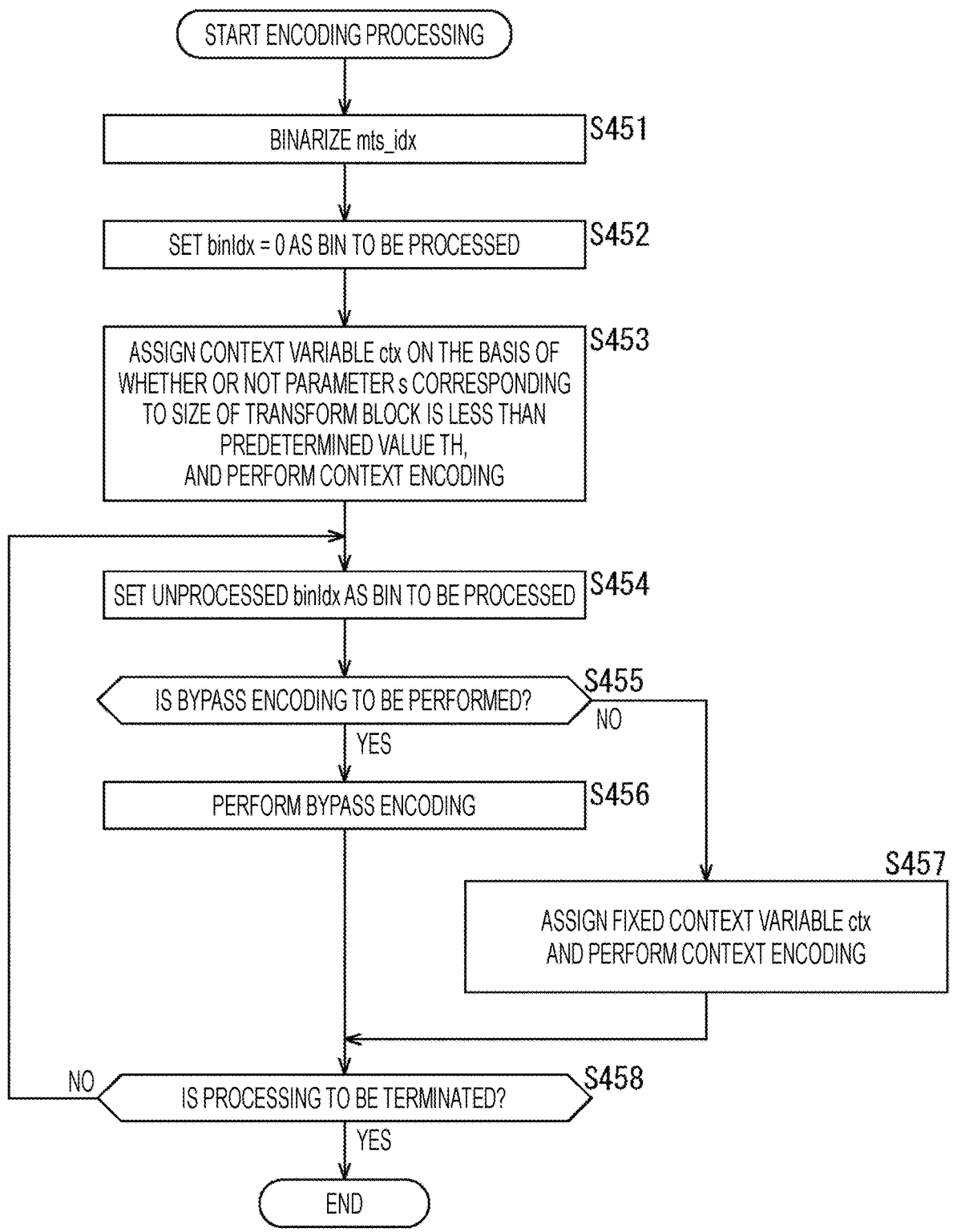
FIG. 33 is a flowchart for describing an example of a flow of encoding processing.

An example of the flow of the encoding processing for encoding the adaptive orthogonal transform identifier, which is executed by the encoding unit 115 in this case, will be described with reference to the flowchart in FIG. 33.

In this encoding processing, processing in steps S451 and S452 is executed similarly to the processing in steps S131 and S132 in FIG. 9. That is, in this case, the selection unit 132 selects the context setting unit 133 as the supply destination of the bin (that is, context encoding is selected.). For example, the selection unit 132 selects context encoding as the encoding method for this bin according to any one of the tables illustrated in FIGS. 29 and 30 (that is, by applying any one of the method 5-1 to method 5-4).

In step S453, the context setting unit 133 assigns the context variable ctx (index ctxInc) to the bin according to whether or not the parameter (S) regarding the block size is equal to or larger than the predetermined threshold value (TH) (S<TH?).

For example, in the case where the parameter regarding the block size is less than the predetermined threshold value (S<TH), the context setting unit 133 assigns the index ctxInc=A0 to the bin. Furthermore, in the case where the parameter regarding the block size is equal to or larger than the predetermined threshold value (S≥TH), the context setting unit 133 assigns the index ctxInc=A1 to the bin.

Then, the context encoding unit 134 performs arithmetic encoding using the context variable. That is, context encoding is performed.

Processing in steps S454 to S458 is also executed similarly to the processing in steps S134 to S138 in FIG. 9. In step S408, in a case where it is determined to terminate the encoding, the encoding processing is terminated.

By executing each processing as described above, the encoding unit 115 can encode the adaptive orthogonal transform identifier by applying the method 5 (for example, any one of the method 5-1 to method 5-4). Therefore, an increase in the memory use amount can be suppressed. Furthermore, an increase in the processing amount (throughput) can be suppressed. That is, an increase in the load of the encoding processing can be suppressed.

<6-4. Decoding Side>
<Configuration>

Next, the decoding side will be described. The configuration on the decoding side in this case is similar to that of the first embodiment. That is, the image decoding device 200 in this case has a configuration similar to the configuration described with reference to FIG. 10. Furthermore, the decoding unit 212 in this case has a configuration similar to the configuration described with reference to FIG. 11.

<Flow of Decoding Processing>

Furthermore, the image decoding device 200 in this case performs processing basically similar to the case of the first embodiment. That is, image decoding processing executed by the image decoding device 200 in this case is performed by a flow similar to the case described with reference to the flowchart in FIG. 12.

Figure 34:
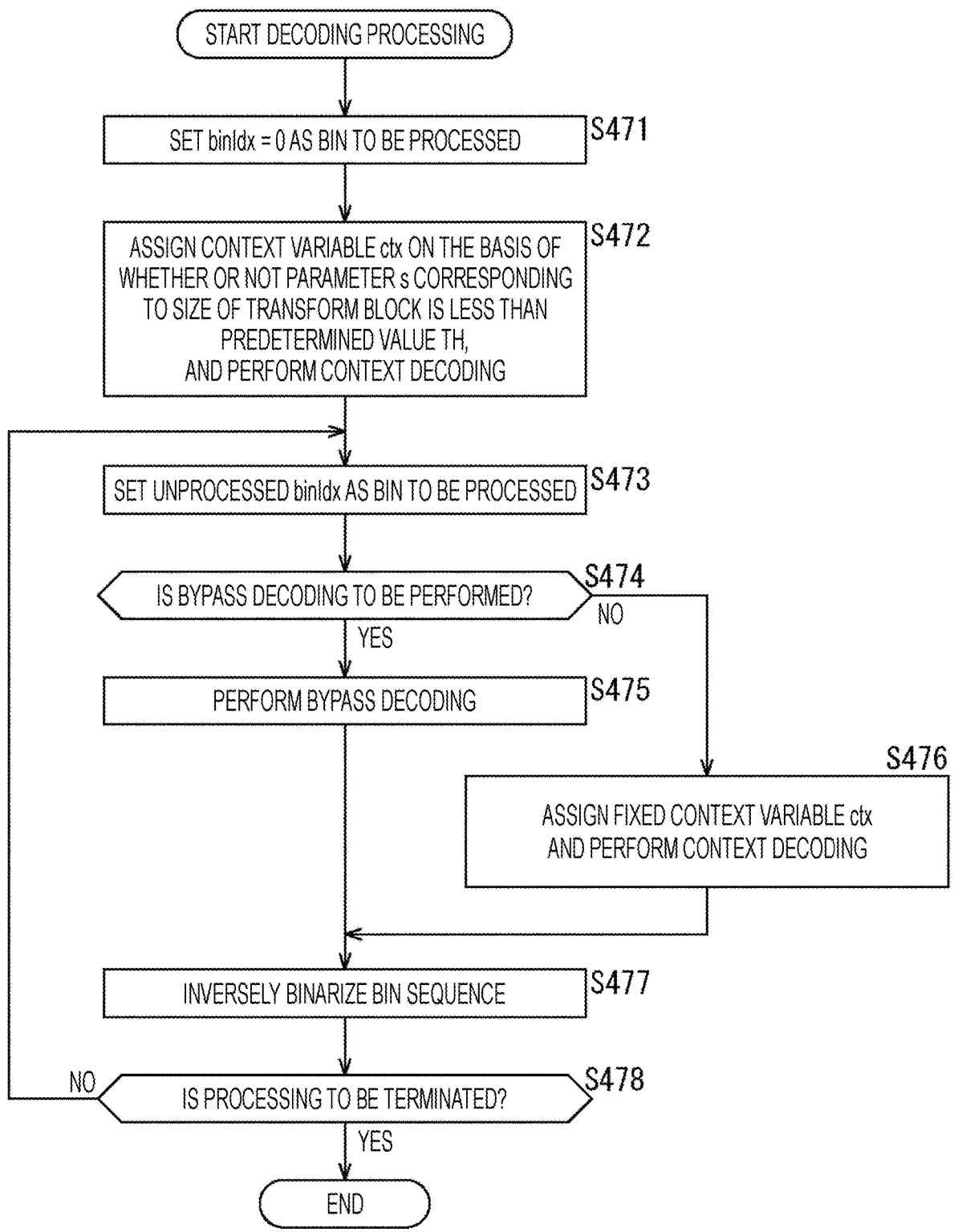
FIG. 34 is a flowchart for describing an example of a flow of decoding processing.

An example of a flow of the decoding processing for decoding coded data of the adaptive orthogonal transform identifier, which is executed by the decoding unit 212 in this case, will be described with reference to the flowchart in FIG. 34.

In this decoding processing, the processing of step S471 is performed similarly to the processing of step S231 of FIG. 13. That is, in this case, the selection unit 231 selects the context setting unit 232 as the supply destination of the bin (that is, context decoding is selected.). For example, the selection unit 231 selects context decoding as the decoding method for this bin according to any one of the tables illustrated in FIGS. 29 and 30 (that is, by applying any one of the method 5-1 to method 5-4).

In step S472, the context setting unit 232 assigns the context variable ctx (index ctxInc) to the bin according to whether or not the parameter (S) regarding the block size is equal to or larger than the predetermined threshold value (TH) (S<TH?).

For example, in the case where the parameter regarding the block size is less than the predetermined threshold value (S<TH), the context setting unit 232 assigns the index ctxInc=A0 to the bin. Furthermore, in the case where the parameter regarding the block size is equal to or larger than the predetermined threshold value (S≥TH), the context setting unit 232 assigns the index ctxInc=A1 to the bin.

Then, the context decoding unit 233 performs arithmetic decoding using the context variable. That is, context decoding is performed.

Processing in steps S473 to S478 is also executed similarly to the processing in steps S233 to S238 in FIG. 13. In step S478, in a case where it is determined to terminate the decoding, the decoding processing is terminated.

By executing each processing in this manner, the decoding unit 212 can decode the coded data of the adaptive orthogonal transform identifier by applying the method 5 (for example, any one of the method 5-1 to method 5-4). Therefore, an increase in the memory use amount can be suppressed. Furthermore, an increase in the processing amount (throughput) can be suppressed. That is, an increase in the load of the decoding processing can be suppressed.

7. Sixth Embodiment

<7-1. Encoding of Adaptive Orthogonal Transform identifier>

In the present embodiment, binarization (method 0) of an adaptive orthogonal transform identifier indicating a mode of adaptive orthogonal transform in image encoding, which has been performed as in the table illustrated in A of FIG. 2, is performed as follows.

That is, the adaptive orthogonal transform identifier is binarized into a bin sequence configured by one bin (one bit) indicating whether or not a transform type is other than a transform type DCT2×DCT2 and two bins (two bits) indicating another transform type, and is encoded (method 6).

For example, as in the table illustrated in A of FIG. 35, in the case where the transform type of the adaptive orthogonal transform identifier is DCT2×DCT2, the adaptive orthogonal transform identifier is binarized into the bin sequence of one bin (=0), and in the case where the transform type of the adaptive orthogonal transform identifier is other than DCT2×DCT2, the adaptive orthogonal transform identifier is binarized into the bin sequence of three bins.

In the case of the example of A of FIG. 35, the adaptive orthogonal transform identifier mts_idx=0 is binarized into a bin sequence "0" indicating that the transform type is DCT2×DCT2 and encoded. Furthermore, the adaptive orthogonal transform identifier mts_idx=1 is binarized into a bin sequence "100" indicating that the transform type is other than DCT2×DCT2 and is DST7×DST7 and encoded. Moreover, the adaptive orthogonal transform identifier mts_idx=2 is binarized into a bin sequence "101" indicating that the transform type is other than DCT2×DCT2 and is DCT8×DST7 and encoded. Furthermore, the adaptive orthogonal transform identifier mts_idx=3 is binarized into a bin sequence "110" indicating that the transform type is other than DCT2×DCT2 and is DST7×DCT8 and encoded. Moreover, the adaptive orthogonal transform identifier mts_idx=4 is binarized into a bin sequence "111" indicating that the transform type is other than DCT2×DCT2 and is DCT8×DCT8 and encoded.

By binarizing the adaptive orthogonal transform identifier in this manner, the length of the bin sequence (bin length) can be made up to three bins. In the case of the example of A of FIG. 2 (method 0), the length of the bin sequence (bin length) is up to four bins, so the bin length can be shortened by one bin by applying the method 6.

Note that, as in the table illustrated in B of FIG. 35, this bin sequence may be divided into a prefix portion of one bin indicating whether or not the transform type is other than DCT2×DCT2 and a suffix portion of two bins indicating another transform type and binarized.

Furthermore, the context variable may be assigned to each bin of the bin sequence of the adaptive orthogonal transform identifier generated by binarization according to the method 6, by any of the methods 0 to 5, and encoding may be performed.

For example, as in the table illustrated in A of FIG. 36, a predetermined context variable ctx (index ctxInc), that is, a fixed (one-to-one corresponding) context variable ctx may be assigned to a first bin of the bin sequence obtained by binarizing the adaptive orthogonal transform identifier, and context encoding may be performed for the first bin, and bypass encoding may be performed for the second and third bins of the bin sequence (method 1-1).

In the case of the example in A of FIG. 36, the index ctxInc=A0 is assigned to the first bin (binIdx=0) of the bin sequence of the adaptive orthogonal transform identifier and context encoding is performed for the first bin, and bypass encoding is performed for the second and third bins (binIdx=1 and 2).

Furthermore, for example, as in the table illustrated in B of FIG. 36, predetermined context variables ctx (indexes ctxInc) different from each other may be assigned to the first and second bins of the bin sequence obtained by binarizing the adaptive orthogonal transform identifier, and context encoding may be performed for the first and second bins, and bypass encoding may be performed for the third bin of the bin sequence (method 1-2).

In the case of the example in B of FIG. 36, the index ctxInc=A0 is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, and bypass encoding is performed for the third bin (binIdx=2).

Moreover, for example, as in the table illustrated in C of FIG. 36, predetermined context variables ctx (indexes ctxInc) different from one another may be assigned to the first to third bins of the bin sequence obtained by binarizing the adaptive orthogonal transform identifier, and context encoding may be performed for the first to third bins (method 1-3).

In the case of the example in C of FIG. 36, the index ctxInc=A0 is assigned to the first bin (binIdx=0) of the bin sequence of the adaptive orthogonal transform identifier and context encoding is performed for the first bin, the index ctxInc=B1 is assigned to the second bin (binIdx=1) and context encoding is performed for the second bin, and the index ctxInc=B2 is assigned to the third bin (binIdx=2) and context encoding is performed for the third bin.

Note that, in the tables of FIG. 36, non-overlapping unique values are set in the indexes A0, B1, and B2.

Examples of the number of contexts, the number of context encoding bins, the number of bypass encoding bins, and the bin length of the worst case for each of these methods are illustrated in the table of FIG. 37. For example, in the case of the method 0, the bin length of the worst case is 4. Therefore, in the case of the method 0, the number of contexts is 9, the number of context encoding bins is 4, and the number of bypass encoding bins is 0. In contrast, in the case of combining the method 6 and the method 1-1 (method 6-1), the bin length of the worst case is 3. Therefore, the number of contexts is 2, the number of context encoding bins is 1, and the number of bypass encoding bins is 2. Furthermore, in the case of combining the method 6 and the method 1-2 (method 6-2), the bin length of the worst case is 3. Therefore, the number of contexts is 3, the number of context encoding bins is 2, and the number of bypass encoding bins is 1. Moreover, in the case of combining the method 6 and the method 1-3 (method 6-3, the bin length of the worst case is 3. Therefore, the number of contexts is 4 the number of context encoding bins is 3 and the number of bypass encoding bins is 0.

As described above, in any case of the method 6-1 to the method 6-3, the number of contexts required for encoding can be reduced as compared with the case of the method 0. That is, by applying the method 6, the bin length of the worst case can be reduced, and moreover, by applying the method 1, the number of contexts assigned to the first bin (binIdx=0) can be reduced. Therefore, an increase in the memory use amount can be suppressed.

Furthermore, in any case of the method 6-1 to the method 6-3, the number of context encoding bins required for encoding can be reduced as compared with the case of the method 0. That is, by applying the method 6, the bin length of the worst case is reduced, and moreover, by applying the method 1, the bypass encoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

Note that, by combining another method (for example, any one of the method 2 to method 5) instead of the method 1 with the method 6, the effects of the method 6 and the effects of the another method can be combined. Therefore, in either case, an increase in the memory use amount and the processing amount (throughput) can be suppressed.

As described above, by applying the method 6, an increase in the load of the encoding processing can be suppressed.

<7-2. Decoding of Adaptive Orthogonal Transform Identifier>

In the present embodiment, inverse binarization (method 0) of an adaptive orthogonal transform identifier indicating a mode of inverse adaptive orthogonal transform in image decoding, which has been performed as in the table illustrated in A of FIG. 2, is performed as follows.

That is, a bin sequence configured by one bin (one bit) indicating whether or not a transform type is other than a transform type DCT2×DCT2 and two bins (two bits) indicating another transform type, which is obtained by decoding, is inversely binarized to derive the adaptive orthogonal transform identifier (method 6).

For example, as in the table illustrated in A of FIG. 35, the bin sequence of one bin (=0) is inversely binarized to derive the adaptive orthogonal transform identifier with the transform type of DCT2×DCT2, and the bin sequence of three bins is inversely binarized to derive the adaptive orthogonal transform identifier with the transform type of other than DCT2×DCT2.

In the case of the example in A of FIG. 35, the bin sequence "0" obtained by decoding coded data is inversely binarized to derive the adaptive orthogonal transform identifier mts_idx=0 indicating that the transform type is DCT2×DCT2. Furthermore, the bin sequence "100" obtained by decoding the coded data is inversely binarized to derive the adaptive orthogonal transform identifier mts_idx=1 indicating that the transform type is other than DCT2×DCT2 and is DST7×DST7. Moreover, the bin sequence "101" obtained by decoding the coded data is inversely binarized to derive the adaptive orthogonal transform identifier mts_idx=2 indicating that the transform type is other than DCT2×DCT2 and is DCT8×DST7. Furthermore, the bin sequence "110" obtained by decoding the coded data is inversely binarized to derive the adaptive orthogonal transform identifier mts_idx=3 indicating that the transform type is other than DCT2×DCT2 and is DST7×DCT8. Moreover, the bin sequence "111" obtained by decoding the coded data is inversely binarized to derive the adaptive orthogonal transform identifier mts_idx=4 indicating that the transform type is other than DCT2×DCT2 and is DCT8×DCT8.

By inversely binarizing the adaptive orthogonal transform identifier in this manner, the length of the bin sequence (bin length) can be made up to three bins. In the case of the example of A of FIG. 2 (method 0), the length of the bin sequence (bin length) is up to four bins, so the bin length can be shortened by one bin by applying the method 6.

Note that, as in the table illustrated in B of FIG. 35, this bin sequence may be divided into a prefix portion of one bin indicating whether or not the transform type is other than DCT2×DCT2 and a suffix portion of two bins indicating another transform type and inversely binarized.

Furthermore, in the case of applying this inverse binarization of the method 6, the context variable may be assigned to each bin of the bin sequence by any of the method 0 to method 5, and decoding may be performed.

For example, as in the table illustrated in A of FIG. 36, a predetermined context variable ctx (index ctxInc), that is, a fixed (one-to-one corresponding) context variable ctx may be assigned to a first bin of the bin sequence obtained by binarizing the adaptive orthogonal transform identifier, and context decoding may be performed for the first bin, and bypass decoding may be performed for the second and third bins of the bin sequence (method 1-1).

In the case of the example in A of FIG. 36, the index ctxInc=A0 is assigned to the first bin (binIdx=0) of the bin sequence of the adaptive orthogonal transform identifier and context decoding is performed for the first bin, and bypass decoding (bypass) is performed for the second and third bins (binIdx=1 and 2).

Furthermore, for example, as in the table illustrated in B of FIG. 36, predetermined context variables ctx (indexes ctxInc) different from each other may be assigned to the first and second bins of the bin sequence obtained by binarizing the adaptive orthogonal transform identifier, and context decoding may be performed for the first and second bins, and bypass decoding may be performed for the third bin of the bin sequence (method 1-2).

In the case of the example in B of FIG. 36, the index ctxInc=A0 is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, and bypass decoding (bypass) is performed for the third bin (binIdx=2).

Moreover, for example, as in the table illustrated in C of FIG. 36, predetermined context variables ctx (indexes ctxInc) different from one another may be assigned to the first to third bins of the bin sequence obtained by binarizing the adaptive orthogonal transform identifier, and context decoding may be performed for the first to third bins (method 1-3).

In the case of the example in C of FIG. 36, the index ctxInc=A0 is assigned to the first bin (binIdx=0) of the bin sequence of the adaptive orthogonal transform identifier and context decoding is performed for the first bin, the index ctxInc=B1 is assigned to the second bin (binIdx=1) and context decoding is performed for the second bin, and the index ctxInc=B2 is assigned to the third bin (binIdx=2) and context decoding is performed for the third bin.

Note that, in the tables of FIG. 36, non-overlapping unique values are set in the indexes A0, B1, and B2.

The number of contexts, the number of context encoding bins, the number of bypass encoding bins, and the bin length of the worst case for each of these methods are similar to those for encoding (FIG. 37).

As described above, in any case of the method 6-1 to the method 6-3, the number of contexts required for decoding can be reduced as compared with the case of the method 0. That is, by applying the method 6, the bin length of the worst case can be reduced, and moreover, by applying the method 1, the number of contexts assigned to the first bin (binIdx=0) can be reduced. Therefore, an increase in the memory use amount can be suppressed.

Furthermore, in any case of the method 6-1 to the method 6-3, the number of context encoding bins required for decoding can be reduced as compared with the case of the method 0. That is, by applying the method 6, the bin length of the worst case is reduced, and moreover, by applying the method 1, the bypass decoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

Note that, by combining another method (for example, any one of the method 2 to method 5) instead of the method 1 with the method 6, the effects of the method 6 and the effects of the another method can be combined. Therefore, in either case, an increase in the memory use amount and the processing amount (throughput) can be suppressed.

As described above, by applying the method 6, an increase in the load of the decoding processing can be suppressed.

<7-3. Encoding Side>
<Configuration>

Next, the encoding side will be described. The configuration of the encoding side in this case is similar to that of the first embodiment. That is, the image encoding device 100 in this case has a configuration similar to the configuration described with reference to FIG. 6. Furthermore, the encoding unit 115 in this case has a configuration similar to the configuration described with reference to FIG. 7.

<Flow of Encoding Processing>

Furthermore, the image encoding device 100 in this case performs processing basically similar to the case of the first embodiment. That is, image encoding processing executed by the image encoding device 100 in this case is performed by a flow similar to the case described with reference to the flowchart in FIG. 8.

Figure 38:
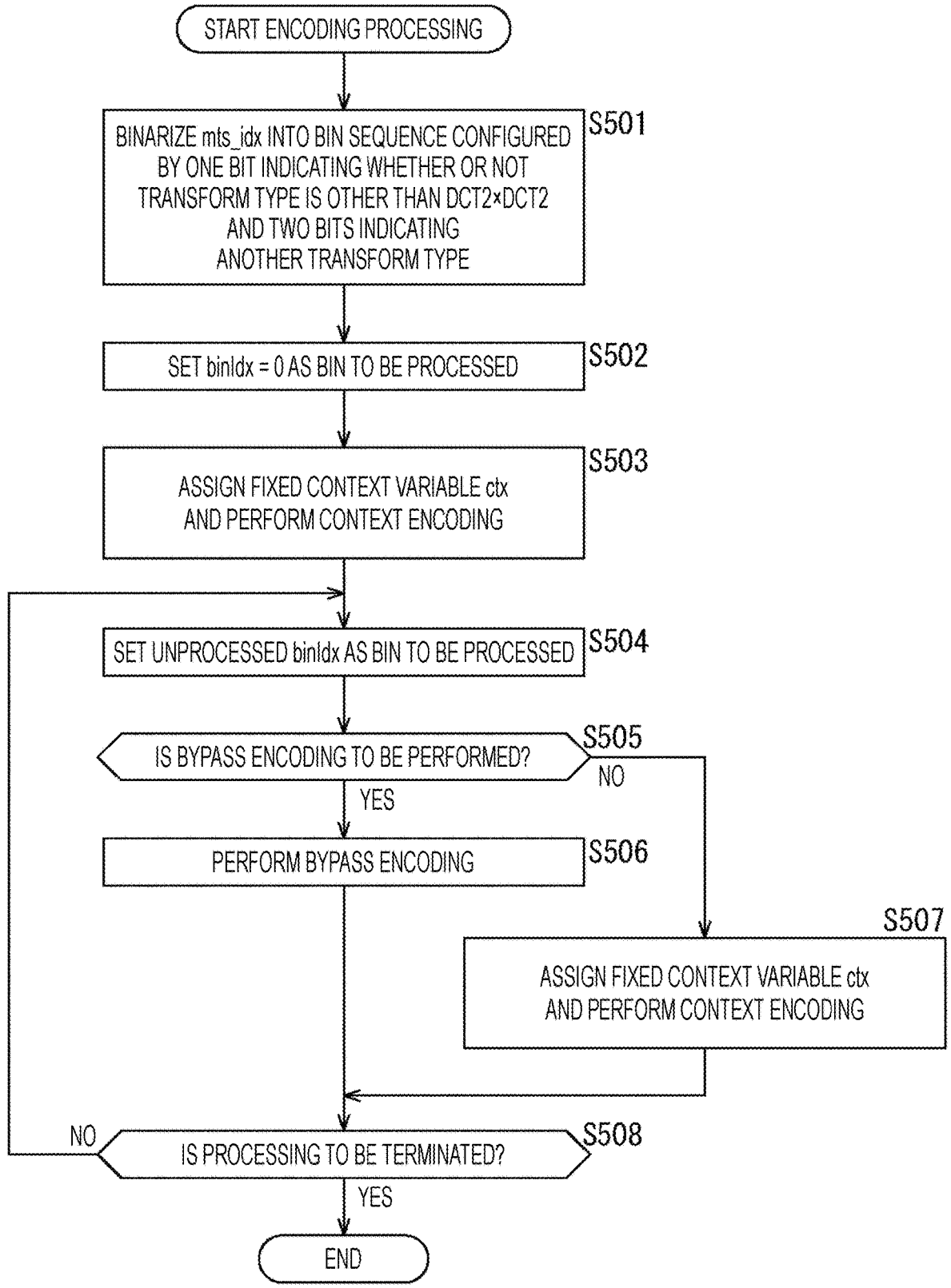
FIG. 38 is a flowchart for describing an example of a flow of encoding processing.

An example of the flow of the encoding processing for encoding the adaptive orthogonal transform identifier, which is executed by the encoding unit 115 in this case, will be described with reference to the flowchart in FIG. 38.

When the encoding processing is started, in step S501, the binarization unit 131 of the encoding unit 115 binarizes the adaptive orthogonal transform identifier mts_idx into the bin sequence configured by one bin (one bit) indicating whether or not the transform type is other than the transform type DCT2×DCT2 and two bins (two bits) indicating another transform type.

Processing in steps S502 to S508 is also executed similarly to the processing in steps S132 to S138 in FIG. 9.

By executing each processing in this manner, the encoding unit 115 can binarize the adaptive orthogonal transform identifier by applying the method 6 and can encode the bin sequence by applying the method 1 (for example, any of the method 1-1 to method 1-3). Therefore, an increase in the memory use amount can be suppressed. Furthermore, an increase in the processing amount (throughput) can be suppressed. That is, an increase in the load of the encoding processing can be suppressed.

<7-4. Decoding Side>
<Configuration>

Next, the decoding side will be described. The configuration on the decoding side in this case is similar to that of the first embodiment. That is, the image decoding device 200 in this case has a configuration similar to the configuration described with reference to FIG. 10. Furthermore, the decoding unit 212 in this case has a configuration similar to the configuration described with reference to FIG. 11.

<Flow of Decoding Processing>

Furthermore, the image decoding device 200 in this case performs processing basically similar to the case of the first embodiment. That is, image decoding processing executed by the image decoding device 200 in this case is performed by a flow similar to the case described with reference to the flowchart in FIG. 12.

Figure 39:
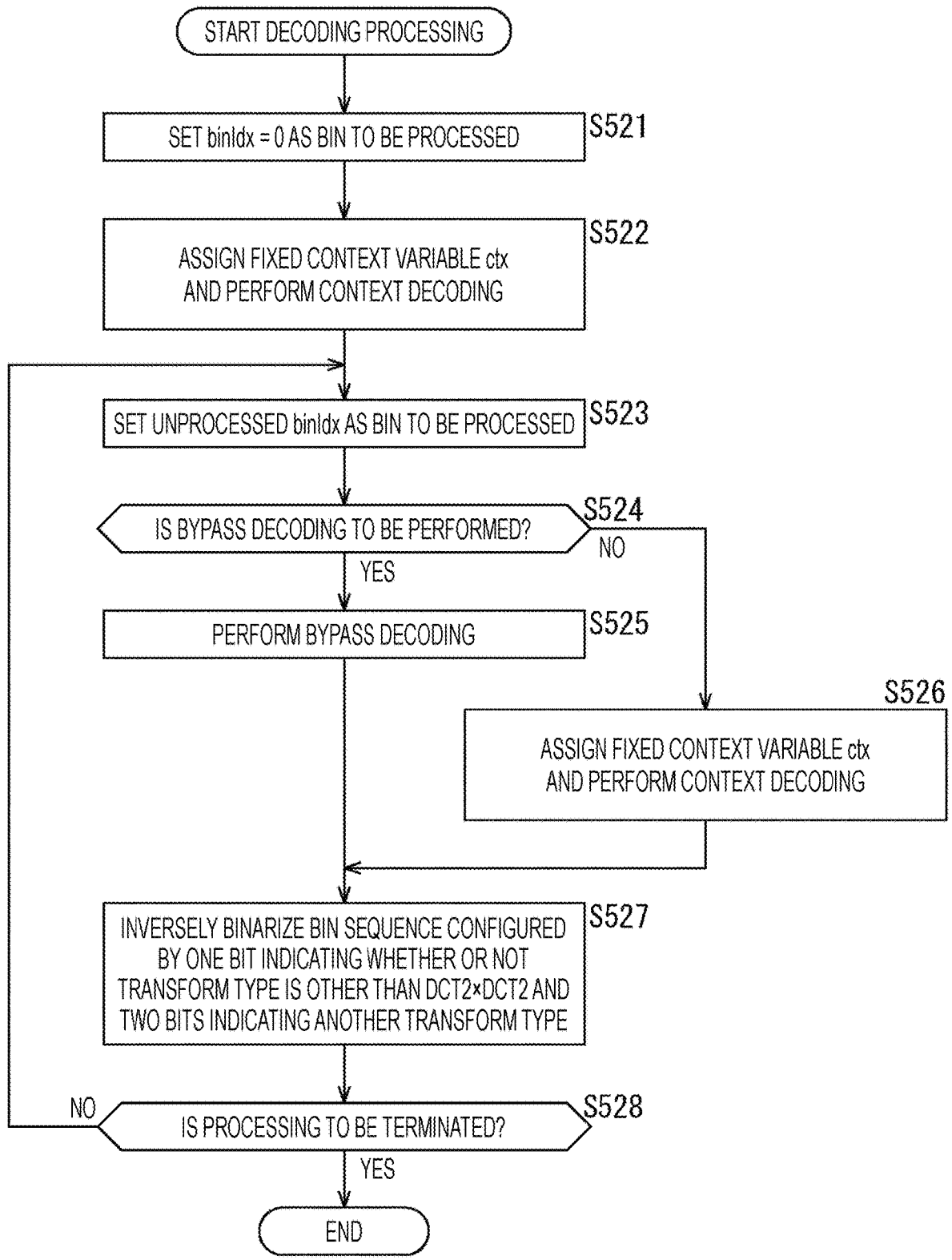
FIG. 39 is a flowchart for describing an example of a flow of decoding processing.

An example of a flow of the decoding processing for decoding coded data of the adaptive orthogonal transform identifier, which is executed by the decoding unit 212 in this case, will be described with reference to the flowchart in FIG. 39.

In this decoding processing, processing in steps S521 to S526 is also executed similarly to the processing in steps S231 to S236 in FIG. 13.

In step S527, the inverse binarization unit 235 inversely binarizes the bin sequence configured by one bin (one bit) indicating whether or not the transform type is other than the transform type DCT2×DCT2 and two bins (two bits) indicating another transform type to derive the adaptive orthogonal transform identifier mts_idx.

In step S528, the decoding unit 212 determines whether or not to terminate the decoding of the adaptive orthogonal transform identifier mts_idx. In a case where it is determined not to terminate the decoding, the processing returns to step S523 and the processing in step S523 and subsequent steps is repeated. Furthermore, in step S528, in a case where it is determined to terminate the decoding, the decoding processing is terminated.

By executing each processing in this manner, the decoding unit 212 can decode the coded data of the adaptive orthogonal transform identifier by applying the method 1 (for example, any one of the method 1-1 to method 1-3) to derive the bin sequence. Furthermore, the decoding unit 212 can inversely binarize the bin sequence by applying the method 6 to derive the adaptive orthogonal transform identifier. Therefore, an increase in the memory use amount can be suppressed. Furthermore, an increase in the processing amount (throughput) can be suppressed. That is, an increase in the load of the decoding processing can be suppressed.

8. Seventh Embodiment

<8-1. Encoding of Transform Skip Flag and Adaptive Orthogonal Transform Identifier>

In the case of the method described in Non-Patent Document 1, the transform skip flag transform_skip_flag indicating whether or not to apply the transform skip and the adaptive orthogonal transform identifier tu_mits_idx are luminance limited (4:2:0 format limited).

Therefore, in a case where a chroma array type is larger than 1 (that is, in a case where a chrominance format is 4:2:2 or 4:4:4), a transform skip flag and an adaptive orthogonal transform identifier are signaled (encoded/decoded) for each component ID (cIdx) so that transform skip and adaptive orthogonal transform can be applied to a chrominance component (method 7).

An example of syntax of a transform unit (transform unit) in that case is illustrated in FIG. 40. As illustrated in FIG. 40, a transform mode (transform mode) is signaled for each of luminance (Y), chrominance (Cb), and chrominance (Cr) as illustrated in the 17th, 20th, and 23rd rows (gray rows) from the top of this syntax. FIG. 41 illustrates an example of the syntax of the transform mode (transform mode) in this case. As illustrated in FIG. 41, the transform skip flag transform_skip_flag[x0][y0][cIdx] is signaled in the fifth row (gray row) from the top of this syntax. Furthermore, the adaptive orthogonal transform identifier tu_mts_idx[x0][y0][cIdx] is signaled in the 8th row (gray row) from the top of this syntax. That is, the transform skip flag and the adaptive orthogonal transform identifier are signaled for each component ID (cIdx).

By doing so, application of the adaptive orthogonal transform can be controlled for the chrominance of the chrominance format 4:2:2 or 4:4:4 having a larger information amount than the chrominance format 4:2:0. Therefore, a decrease in the encoding efficiency can be suppressed.

Then, in this case, a context variable ctx may be assigned to a first bin (binIdx=0) of a bin sequence obtained by binarizing the adaptive orthogonal transform identifier according to whether or not the component ID (cIdx) of a transform block is 0, and context encoding may be performed.

For example, as in the table illustrated in A of FIG. 42, a context variable ctx (index ctxInc) may be assigned to the first bin of the bin sequence obtained by binarizing the adaptive orthogonal transform identifier according to whether or not the component ID (cIdx) of the transform block is 0 ((cIdx==0)?) and context encoding may be performed for the first bin, and bypass encoding may be performed for second to fourth bins of the bin sequence (method 7-1).

In the case of the example in A in FIG. 42, in the case where the component ID (cIdx) of the transform block is 0 (cIdx==0), the index ctxInc=A0 is assigned to the first bin (binIdx=0) of the bin sequence of the adaptive orthogonal transform identifier and context encoding is performed for the first bin, and in the case where the component ID (cIdx) of the transform block is not 0 (cIdx>0), the index ctxInc=A1 is assigned to the first bin and context encoding is performed for the first bin. Furthermore, bypass encoding (bypass) is performed for the second to fourth bins (binIdx=1 to 3).

Furthermore, for example, as in the table illustrated in B of FIG. 42, the context variable ctx (index ctxInc) may be assigned to the first bin of the bin sequence obtained by binarizing the adaptive orthogonal transform identifier according to whether or not the component ID (cIdx) of the transform block is 0 ((cIdx==0)?) and context encoding may be performed for the first bin, a predetermined context variable (index ctxInc) may be assigned to the second bin of the bin sequence and context encoding may be performed for the second bin, and bypass encoding may be performed for the third and fourth bins of the bin sequence (method 7-2).

In the case of the example in B in FIG. 42, in the case where the component ID (cIdx) of the transform block is 0 (cIdx==0), the index ctxInc=A0 is assigned to the first bin (binIdx=0) of the bin sequence of the adaptive orthogonal transform identifier and context encoding is performed for the first bin, and in the case where the component ID (cIdx) of the transform block is not 0 (cIdx>0), the index ctxInc=A1 is assigned to the first bin and context encoding is performed for the first bin. Furthermore, in the second bin (binIdx=1), the index ctxInc=B1 is assigned and context encoding is performed. Moreover, bypass encoding (bypass) is performed for the third and fourth bins (binIdx=2 and 3).

Moreover, for example, as in the table illustrated in A of FIG. 43, the context variable ctx (index ctxInc) may be assigned to the first bin of the bin sequence obtained by binarizing the adaptive orthogonal transform identifier according to whether or not the component ID (cIdx) of the transform block is 0 ((cIdx==0)?) and context encoding may be performed for the first bin, predetermined context variables (indexes ctx Inc) different from each other may be assigned to the second and third bins of the bin sequence and context encoding may be performed for the second and third bins, and bypass encoding may be performed for the fourth bin of the bin sequence (method 7-3).

In the case of the example in A in FIG. 43, in the case where the component ID (cIdx) of the transform block is 0 (cIdx==0), the index ctxInc=A0 is assigned to the first bin (binIdx=0) of the bin sequence of the adaptive orthogonal transform identifier and context encoding is performed for the first bin, and in the case where the component ID (cIdx) of the transform block is not 0 (cIdx>0), the index ctxInc=A1 is assigned to the first bin and context encoding is performed for the first bin. Furthermore, in the second bin (binIdx=1), the index ctxInc=B1 is assigned and context encoding is performed. Moreover, in the third bin (binIdx=2), the index ctxInc=B2 is assigned and context encoding is performed. Furthermore, bypass encoding (bypass) is performed for the fourth bin (binIdx=3).

Furthermore, for example, as in the table illustrated in B of FIG. 43, the context variable ctx (index ctxInc) may be assigned to the first bin of the bin sequence obtained by binarizing the adaptive orthogonal transform identifier according to whether or not the component ID (cIdx) of the transform block is 0 ((cIdx==0)?) and context encoding may be performed for the first bin, predetermined context variables (indexes ctxInc) different from one another may be assigned to the second to fourth bins of the bin sequence and context encoding may be performed for the second to fourth bins (method 7-4).

In the case of the example in B in FIG. 43, in the case where the component ID (cIdx) of the transform block is 0 (cIdx==0), the index ctxInc=A0 is assigned to the first bin (binIdx=0) of the bin sequence of the adaptive orthogonal transform identifier and context encoding is performed for the first bin, and in the case where the component ID (cIdx) of the transform block is not 0 (cIdx>0), the index ctxInc=A1 is assigned to the first bin and context encoding is performed for the first bin. Furthermore, in the second bin (binIdx=1), the index ctxInc=B1 is assigned and context encoding is performed. Moreover, in the third bin (binIdx=2), the index ctxInc=B2 is assigned and context encoding is performed. Furthermore, in the fourth bin (binIdx=3), the index ctxInc=B3 is assigned and context encoding is performed.

Note that, in the tables of FIGS. 42 and 43, non-overlapping unique values are set in the indexes A0, A1, B1, B2, and B3.

Examples of the number of contexts, the number of context encoding bins, and the number of bypass encoding bins for each of these methods are illustrated in the table of FIG. 44. For example, in the case of the method 0, the number of contexts is 9, the number of context encoding bins is 4, and the number of bypass encoding bins is 0. In contrast, in the case of the method 7-1, the number of contexts is 2, the number of context encoding bins is 1, and the number of bypass encoding bins is 3. Furthermore, in the case of the method 7-2, the number of contexts is 3, the number of context encoding bins is 2, and the number of bypass encoding bins is 2. Moreover, in the case of the method 7-3, the number of contexts is 4, the number of context encoding bins is 3, and the number of bypass encoding bins is 1. Furthermore, in the case of the method 7-4, the number of contexts is 5, the number of context encoding bins is 4, and the number of bypass encoding bins is 0.

As described above, in any case of the method 7-1 to the method 7-4, the number of contexts required for encoding can be reduced as compared with the case of the method 0. That is, by applying the method 7, the number of contexts assigned to the first bin (binIdx=0) can be reduced. Therefore, an increase in the memory use amount can be suppressed.

Furthermore, in any case of the method 7-1 to the method 7-3, the number of context encoding bins required for encoding can be reduced as compared with the case of the method 0. Note that, in the case of the method 7-4, the number of context encoding bins required for encoding is equivalent to that in the case of the method 0. That is, by applying the method 7, the bypass encoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

Then, as described above, application of the adaptive orthogonal transform can be controlled for the chrominance of the chrominance format 4:2:2 or 4:4:4 having a larger information amount than the chrominance format 4:2:0. Therefore, a decrease in the encoding efficiency can be suppressed.

As described above, by applying the method 7, an increase in the load of the encoding processing can be suppressed.

Note that, a control parameter of the transform skip or the adaptive orthogonal transform may be signaled (encoded) for each treeType, instead of the color component ID (cIdx). That is, [cIdx] of each control parameter may be replaced with [treeType].

Furthermore, the above-described method of assigning the context variable to each bin of the bin sequence of the adaptive orthogonal transform identifier mts_idx can also be applied to other syntax elements related to orthogonal transform or the like. For example, the method can also be applied to a secondary transform identifier st_idx and a transform skip flag ts_flag.

<8-2. Decoding of Transform Skip Flag and Adaptive Orthogonal Transform Identifier>

Similarly in the case of decoding, in the case where the chroma array type is larger than 1 (that is, in the case where the chrominance format is 4:2:2 or 4:4:4), the transform skip flag and the adaptive orthogonal transform identifier are signaled (decoded) for each component ID (cIdx) so that transform skip and adaptive orthogonal transform can be applied to a chrominance component (method 7).

An example of syntax of a transform unit (transform_unit) in that case is illustrated in FIG. 40. As illustrated in FIG. 40, a transform mode (transform_mode) is signaled for each of luminance (Y), chrominance (Cb), and chrominance (Cr) as illustrated in the 17th, 20th, and 23rd rows (gray rows) from the top of this syntax. FIG. 41 illustrates an example of the syntax of the transform mode (transform mode) in this case. As illustrated in FIG. 41, the transform skip flag transform skip_flag[x0][y0][cIdx] is signaled in the fifth row (gray row) from the top of this syntax. Furthermore, the adaptive orthogonal transform identifier tu_mts_idx[x0][y0][cIdx] is signaled in the 8th row (gray row) from the top of this syntax. That is, the transform skip flag and the adaptive orthogonal transform identifier are signaled for each component ID (cIdx).

By doing so, application of the inverse adaptive orthogonal transform can be controlled for the chrominance of the chrominance format 4:2:2 or 4:4:4 having a larger information amount than the chrominance format 4:2:0. Therefore, a decrease in the encoding efficiency can be suppressed.

Then, in this case, the context variable ctx may be assigned to the first bin (binIdx=0) of the bin sequence of the binarized adaptive orthogonal transform identifier according to whether or not the component ID (cIdx) of a transform block is 0, and context decoding may be performed.

For example, as in the table illustrated in A of FIG. 42, the context variable ctx (index ctxInc) may be assigned to the first bin of the bin sequence of the binarized adaptive orthogonal transform identifier according to whether or not the component ID (cIdx) of the transform block is 0 ((cIdx==0)?) and context decoding may be performed for the first bin, and bypass decoding may be performed for second to fourth bins of the bin sequence (method 7-1).

In the case of the example in A in FIG. 42, in the case where the component ID (cIdx) of the transform block is 0 (cIdx==0), the index ctxInc=A0 is assigned to the first bin (binIdx=0) of the bin sequence of the adaptive orthogonal transform identifier and context decoding is performed for the first bin, and in the case where the component ID (cIdx) of the transform block is not 0 (cIdx>0), the index ctxInc=A1 is assigned to the first bin and context decoding is performed for the first bin. Furthermore, bypass decoding (bypass) is performed for the second to fourth bins (binIdx=1 to 3).

Furthermore, for example, as in the table illustrated in B of FIG. 42, the context variable ctx (index ctxInc) may be assigned to the first bin of the bin sequence obtained by binarizing the adaptive orthogonal transform identifier according to whether or not the component ID (cIdx) of the transform block is 0 ((cIdx==0)?) and context decoding may be performed for the first bin, a predetermined context variable (index ctxInc) may be assigned to the second bin of the bin sequence and context decoding may be performed for the second bin, and bypass decoding may be performed for the third and fourth bins of the bin sequence (method 7-2).

In the case of the example in B in FIG. 42, in the case where the component ID (cIdx) of the transform block is 0 (cIdx==0), the index ctxInc=A0 is assigned to the first bin (binIdx=0) of the bin sequence of the adaptive orthogonal transform identifier and context decoding is performed for the first bin, and in the case where the component ID (cIdx) of the transform block is not 0 (cIdx>0), the index ctxInc=A1 is assigned to the first bin and context decoding is performed for the first bin. Furthermore, in the second bin (binIdx=1), the index ctxInc=B1 is assigned and context decoding is performed. Moreover, bypass decoding (bypass) is performed for the third and fourth bins (binIdx=2 and 3).

Moreover, for example, as in the table illustrated in A of FIG. 43, the context variable ctx (index ctxInc) may be assigned to the first bin of the bin sequence obtained by binarizing the adaptive orthogonal transform identifier according to whether or not the component ID (cIdx) of the transform block is 0 ((cIdx==0)?) and context decoding may be performed for the first bin, predetermined context variables (indexes ctxInc) different from each other may be assigned to the second and third bins of the bin sequence and context decoding may be performed for the second and third bins, and bypass decoding may be performed for the fourth bin of the bin sequence (method 7-3).

In the case of the example in A in FIG. 43, in the case where the component ID (cIdx) of the transform block is 0 (cIdx==0), the index ctxInc=A0 is assigned to the first bin (binIdx=0) of the bin sequence of the adaptive orthogonal transform identifier and context decoding is performed for the first bin, and in the case where the component ID (cIdx) of the transform block is not 0 (cIdx>0), the index ctxInc=A1 is assigned to the first bin and context decoding is performed for the first bin. Furthermore, in the second bin (binIdx=1), the index ctxInc=B1 is assigned and context decoding is performed. Moreover, in the third bin (binIdx=2), the index ctxInc=B2 is assigned and context decoding is performed. Furthermore, bypass decoding (bypass) is performed for the fourth bin (binIdx=3).

Furthermore, for example, as in the table illustrated in B of FIG. 43, the context variable ctx (index ctxInc) may be assigned to the first bin of the bin sequence obtained by binarizing the adaptive orthogonal transform identifier according to whether or not the component ID (cIdx) of the transform block is 0 ((cIdx==0)?) and context decoding may be performed for the first bin, predetermined context variables (indexes ctxInc) different from one another may be assigned to the second to fourth bins of the bin sequence and context decoding may be performed for the second to fourth bins (method 7-4).

In the case of the example in B in FIG. 43, in the case where the component ID (cIdx) of the transform block is 0 (cIdx==0), the index ctxInc=A0 is assigned to the first bin (binIdx=0) of the bin sequence of the adaptive orthogonal transform identifier and context decoding is performed for the first bin, and in the case where the component ID (cIdx) of the transform block is not 0 (cIdx>0), the index ctxInc=A1 is assigned to the first bin and context decoding is performed for the first bin. Furthermore, in the second bin (binIdx=1), the index ctxInc=B1 is assigned and context decoding is performed. Moreover, in the third bin (binIdx=2), the index ctxInc=B2 is assigned and context decoding is performed. Furthermore, in the fourth bin (binIdx=3), the index ctxInc=B3 is assigned and context decoding is performed.

Note that, in the tables of FIGS. 42 and 43, non-overlapping unique values are set in the indexes A0, A1, B1, B2, and B3.

The number of contexts, the number of context encoding bins, and the number of bypass encoding bins for each of these methods are similar to those for encoding (FIG. 44).

As described above, in any case of the method 7-1 to the method 7-4, the number of contexts required for decoding can be reduced as compared with the case of the method 0. That is, by applying the method 7, the number of contexts assigned to the first bin (binIdx=0) can be reduced. Therefore, an increase in the memory use amount can be suppressed.

Furthermore, in any case of the method 7-1 to the method 7-3, the number of context encoding bins required for decoding can be reduced as compared with the case of the method 0. Note that, in the case of the method 7-4, the number of context encoding bins required for decoding is equivalent to that in the case of the method 0. That is, by applying the method 7, the bypass decoding can be applied to a bin corresponding to a transform type with relatively low selectivity. Therefore, it is possible to suppress an increase in the number of context encoding bins and to suppress an increase in the processing amount (throughput) while suppressing a decrease in the encoding efficiency.

Then, as described above, application of the inverse adaptive orthogonal transform can be controlled for the chrominance of the chrominance format 4:2:2 or 4:4:4 having a larger information amount than the chrominance format 4:2:0. Therefore, a decrease in the encoding efficiency can be suppressed.

As described above, by applying the method 7, an increase in the load of the decoding processing can be suppressed.

Note that, a control parameter of the transform skip or the adaptive orthogonal transform may be signaled (decoded) for each treeType, instead of the color component ID (cIdx). That is, [cIdx] of each control parameter may be replaced with [treeType].

Furthermore, the above-described method of assigning the context variable to each bin of the bin sequence of the adaptive orthogonal transform identifier mts_idx can also be applied to other syntax elements related to orthogonal transform or the like. For example, the method can also be applied to a secondary transform identifier st_idx and a transform skip flag ts_flag.

<8-3. Encoding Side>
<Configuration>

Next, the encoding side will be described. The configuration of the encoding side in this case is similar to that of the first embodiment. That is, the image encoding device 100 in this case has a configuration similar to the configuration described with reference to FIG. 6. Furthermore, the encoding unit 115 in this case has a configuration similar to the configuration described with reference to FIG. 7.

<Flow of Encoding Processing>

Furthermore, the image encoding device 100 in this case performs processing basically similar to the case of the first embodiment. That is, image encoding processing executed by the image encoding device 100 in this case is performed by a flow similar to the case described with reference to the flowchart in FIG. 8.

Figure 45:
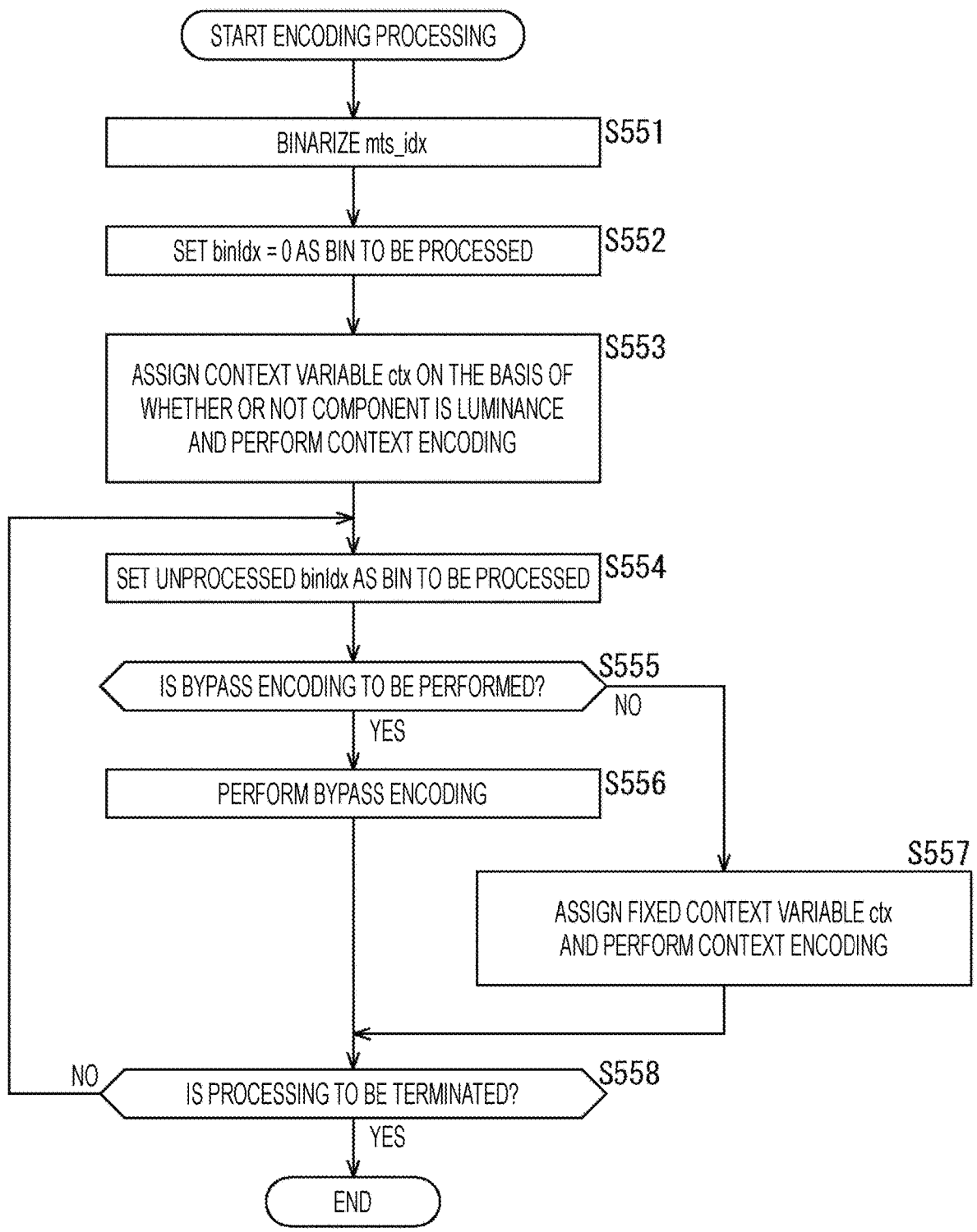
FIG. 45 is a flowchart for describing an example of a flow of encoding processing.

An example of the flow of the encoding processing for encoding the adaptive orthogonal transform identifier, which is executed by the encoding unit 115 in this case, will be described with reference to the flowchart in FIG. 45.

In this encoding processing, processing in steps S551 and S552 is executed similarly to the processing in steps S131 and S132 in FIG. 9. That is, in this case, the selection unit 132 selects the context setting unit 133 as the supply destination of the bin (that is, context encoding is selected.). For example, the selection unit 132 selects context encoding as the encoding method for this bin according to any one of the tables illustrated in FIGS. 42 and 43 (that is, by applying any one of the method 7-1 to method 7-4).

In step S553, the context setting unit 133 assigns the context variable ctx (index ctxInc) to the bin according to whether or not the component is the luminance (Y) ((cIdx==0)?).

For example, in the case where the component is the luminance (Y) (cIdx==0), the context setting unit 133 assigns the index ctxInc=A0 to the bin. Furthermore, in the case where the component is not the luminance (Y) (cIdx>0), the context setting unit 133 assigns the index ctxInc=A1 to the bin.

Then, the context encoding unit 134 performs arithmetic encoding using the context variable. That is, context encoding is performed.

Processing in steps S554 to S558 is also executed similarly to the processing in steps S134 to S138 in FIG. 9. In step S558, in a case where it is determined to terminate the encoding, the encoding processing is terminated.

By executing each processing as described above, the encoding unit 115 can encode the adaptive orthogonal transform identifier by applying the method 7 (for example, any one of the method 7-1 to method 7-4). Therefore, an increase in the memory use amount can be suppressed. Furthermore, an increase in the processing amount (throughput) can be suppressed. That is, an increase in the load of the encoding processing can be suppressed.

<8-4. Decoding Side>
<Configuration>

Next, the decoding side will be described. The configuration on the decoding side in this case is similar to that of the first embodiment. That is, the image decoding device 200 in this case has a configuration similar to the configuration described with reference to FIG. 10. Furthermore, the decoding unit 212 in this case has a configuration similar to the configuration described with reference to FIG. 11.

<Flow of Decoding Processing>

Furthermore, the image decoding device 200 in this case performs processing basically similar to the case of executed by the image decoding device 200 in this case is performed by a flow similar to the case described with reference to the flowchart in FIG. 12.

Figure 46:
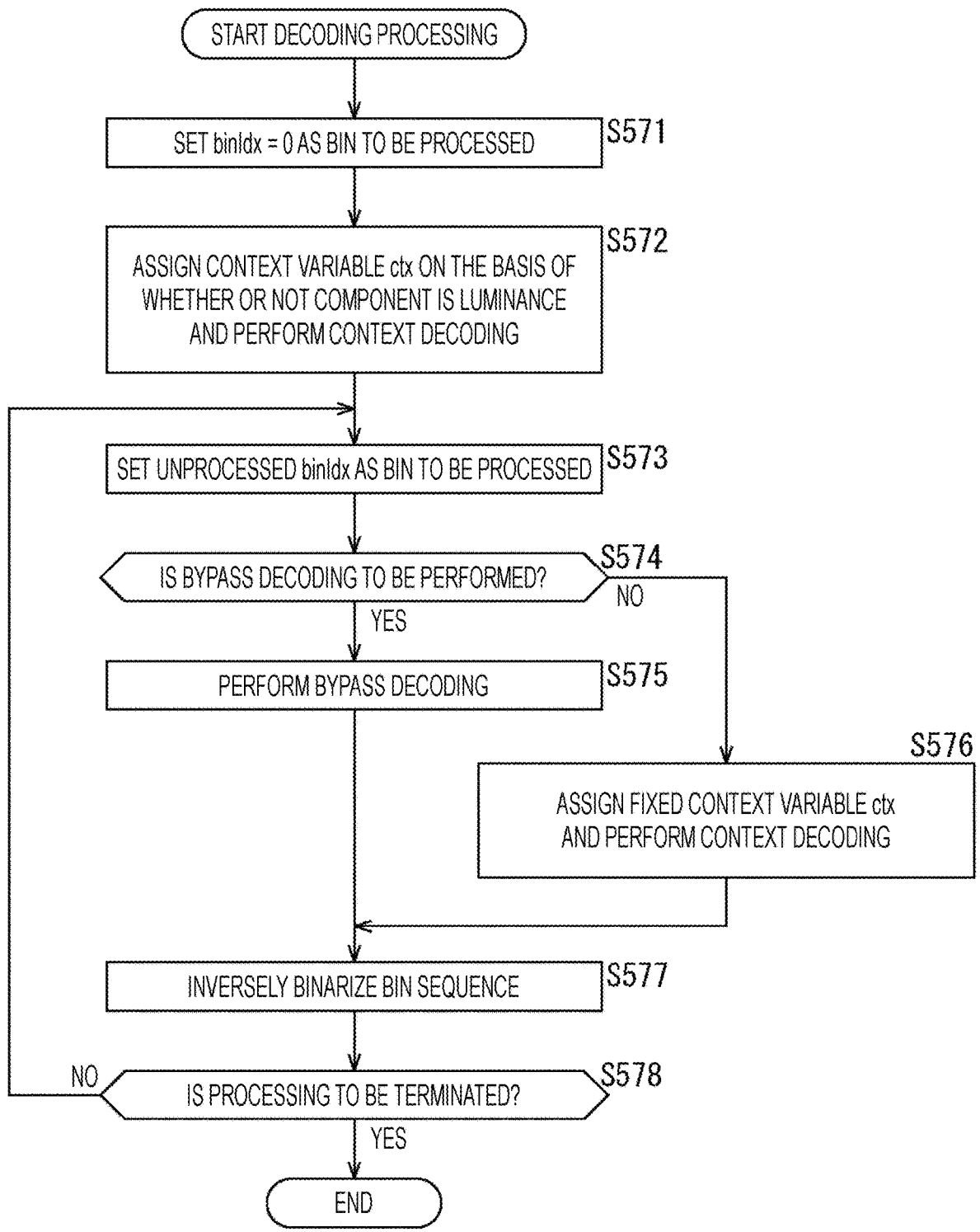
FIG. 46 is a flowchart for describing an example of a flow of decoding processing.

An example of a flow of the decoding processing for decoding coded data of the adaptive orthogonal transform identifier, which is executed by the decoding unit 212 in this case, will be described with reference to the flowchart in FIG. 46.

In this decoding processing, the processing of step S571 is performed similarly to the processing of step S231 of FIG. 13. That is, in this case, the selection unit 231 selects the context setting unit 232 as the supply destination of the bin (that is, context decoding is selected.). For example, the selection unit 231 selects context decoding as the decoding method for this bin according to any one of the tables illustrated in FIGS. 42 and 43 (that is, by applying any one of the method 7-1 to method 7-4).

In step S572, the context setting unit 232 assigns the context variable ctx (index ctxInc) to the bin according to whether or not the component is the luminance (Y) ((cIdx==0)?).

For example, in the case where the component is the luminance (Y) (cIdx==0), the context setting unit 232 assigns the index ctxInc=A0 to the bin. Furthermore, in the case where the component is not the luminance (Y) (cIdx>0), the context setting unit 232 assigns the index ctxInc=A1 to the bin.

Then, the context decoding unit 233 performs arithmetic decoding using the context variable. That is, context decoding is performed.

Processing in steps S573 to S578 is also executed similarly to the processing in steps S233 to S238 in FIG. 13. In step S578, in a case where it is determined to terminate the decoding, the decoding processing is terminated.

By executing each processing in this manner, the decoding unit 212 can decode the coded data of the adaptive orthogonal transform identifier by applying the method 7 (for example, any one of the method 7-1 to method 7-4). Therefore, an increase in the memory use amount can be suppressed. Furthermore, an increase in the processing amount (throughput) can be suppressed. That is, an increase in the load of the decoding processing can be suppressed.

<9. Appendix>
<Combination>

The present technology described in each of the above embodiments can be applied in combination with the present technology described in any other embodiment as long as there is no contradiction.

<Computer>

The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like.

FIG. 47 is a block diagram illustrating a configuration example of hardware of a computer that executes the above-described series of processing by a program.

In a computer 800 illustrated in FIG. 47, a central processing unit (CPU) 801, a read only memory (ROM) 802, and a random access memory (RAM) 803 are mutually connected by a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disk, a magneto-optical disk, or a semiconductor memory.

In the computer configured as described above, the CPU 801 loads, for example, a program stored in the storage unit 813 into the RAM 803 and executes the program via the input/output interface 810 and the bus 804, so that the above-described series of processing is performed. Furthermore, the RAM 803 appropriately stores data and the like necessary for the CPU 801 to execute the various types of processing.

The program to be executed by the computer can be recorded and applied on the removable medium 821 as a package medium or the like, for example, and can be provided. In that case, the program can be installed to the storage unit 813 via the input/output interface 810 by attaching the removable medium 821 to the drive 815.

Furthermore, this program can be provided via a wired or wireless transmission medium such as a local area network, the Internet, or digital satellite broadcast. In that case, the program can be received by the communication unit 814 and installed in the storage unit 813.

Other than the above method, the program can be installed in the ROM 802 or the storage unit 813 in advance.

<Units of Information and Processing>

The data unit in which various types of information described above are set and the data unit to be processed by various types of processing are arbitrary, and are not limited to the above-described examples. For example, these pieces of information and processing may be set for each transform unit (TU), transform block (TB), prediction unit (PU), prediction block (PB), coding unit (CU), largest coding unit (LCU), subblock, block, tile, slice, picture, sequence, or component, or data in these data units may be used. Of course, this data unit can be set for each information and processing, and the data units of all pieces of information and processing need not to be unified. Note that the storage location of these pieces of information is arbitrary, and may be stored in a header, a parameter, or the like of the above-described data unit. Furthermore, the information may be stored in a plurality of locations.

<Control Information>

Control information regarding the present technology described in the above embodiments may be transmitted from the encoding side to the decoding side. For example, control information (for example, enabled_flag) for controlling whether or not application of the above-described present technology is to be permitted (or prohibited) may be transmitted. Furthermore, for example, control information (for example, present_flag) indicating an object to which the above-described present technology is applied (or an object to which the present technology is not applied) may be transmitted. For example, control information for specifying a block size (upper limit, lower limit, or both) to which the present technology is applied (or application is permitted or prohibited), a frame, a component, a layer, or the like may be transmitted.

<Applicable Object of Present Technology>

The present technology can be applied to any image encoding/decoding method. That is, specifications of various types of processing regarding image encoding/decoding such as transform (inverse transform), quantization (inverse quantization), encoding (decoding), and prediction are arbitrary and are not limited to the above-described examples as long as no contradiction occurs with the above-described present technology. Furthermore, part of the processing may be omitted as long as no contradiction occurs with the above-described present technology.

Furthermore, the present technology can be applied to a multi-view image encoding/decoding system that performs encoding/decoding of a multi-view image including images of a plurality of viewpoints (views). In this case, the present technology is simply applied to encoding/decoding of each viewpoint (view).

Furthermore, the present technology can be applied to a hierarchical image encoding (scalable encoding)/decoding system that encodes/decodes a hierarchical image that is multi-layered (hierarchized) so as to have a scalability function for a predetermined parameter. In this case, the present technology is simply applied to encoding/decoding of each layer (layer).

Furthermore, in the above description, the image encoding device 100 and the image decoding device 200 have been described as application examples of the present technology, but the present technology can be applied to an arbitrary configuration.

The present technology can be applied to, for example, various electron devices, such as transmitters and receivers (such as television receivers and mobile phones) in satellite broadcasting, cable broadcasting such as cable TV, distribution on the Internet, and distribution to terminals by cellular communication, or devices (for example, hard disk recorders and cameras) that record images on media such as optical disks, magnetic disks, and flash memories, and reproduce images from these storage media.

Furthermore, the present technology can be implemented as a configuration of a part of a device such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit (that is, a configuration of a part of the device).

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service regarding an image (moving image) to an arbitrary terminal such as a computer, an audio visual (AV) device, a portable information processing terminal, or an internet of things (IOT) device.

Note that, in this specification, the term "system" means a set of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

<Field and Application to which Present Technology is Applicable>

The systems, devices, processing units, and the like to which the present technology is applied can be used in arbitrary fields such as traffic, medical care, crime prevention, agriculture, livestock industry, mining, beauty, factory, household appliance, weather, and natural surveillance, for example. Furthermore, uses in the arbitrary fields are also arbitrary.

For example, the present technology can be applied to systems and devices provided for providing content for appreciation and the like. Furthermore, for example, the present technology can also be applied to systems and devices used for traffic, such as traffic condition monitoring and automatic driving control. Moreover, for example, the present technology can also be applied to systems and devices provided for security. Furthermore, for example, the present technology can be applied to systems and devices provided for automatic control of machines and the like. Moreover, for example, the present technology can also be applied to systems and devices provided for agriculture or livestock industry. Furthermore, the present technology can also be applied to systems and devices that monitor nature states such as volcanos, forests, and ocean, wildlife, and the like. Moreover, for example, the present technology can also be applied to systems and devices provided for sports.

<Others>

Note that the "flag" in the present specification is information for identifying a plurality of states, and includes not only information used for identifying two states of true (1) and false (0) but also information capable of identifying three or more states. Therefore, the value that the "flag" can take may be, for example, a binary value of I/O or may be a ternary value or more. That is, the number of bits constituting the "flag" is arbitrary, and may be 1 bit or a plurality of bits. Furthermore, the identification information (including flag) is assumed to be in not only a form of including the identification information in a bitstream but also a form of including difference information of the identification information from certain reference information in a bitstream. Therefore, in the present specification, the "flag" and "identification information" include not only the information itself but also the difference information for the reference information.

Furthermore, various types of information (metadata and the like) regarding coded data (bitstream) may be transmitted or recorded in any form as long as the various types of information are associated with the coded data. Here, the term "associate" means that, for example, one data can be used (linked) when the other data is processed. That is, data associated with each other may be collected as one data or may be individual data. For example, information associated with coded data (image) may be transmitted on a transmission path different from that of the coded data (image). Furthermore, for example, information associated with coded data (image) may be recorded on a different recording medium (or another recording area of the same recording medium) from the coded data (image). Note that this "association" may be a part of data instead of entire data. For example, an image and information corresponding to the image may be associated with each other in an arbitrary unit such as a plurality of frames, one frame, or a part in a frame.

Note that, in the present specification, terms such as "combining", "multiplexing", "adding", "integrating", "including", "storing", and "inserting" mean putting a plurality of things into one, such as putting coded data and metadata into one data, and means one method of the above-described "association".

Furthermore, embodiments of the present technology are not limited to the above-described embodiments, and various modifications can be made without departing from the gist of the present technology.

For example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Furthermore, for example, the above-described program may be executed in an arbitrary device. In that case, the device is only required to have necessary functions (functional blocks and the like) and obtain necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, the plurality of processes included in one step can be executed as processes of a plurality of steps. Conversely, the processing described as a plurality of steps can be collectively executed as one step.

Furthermore, for example, in the program executed by the computer, the processing of the steps describing the program may be executed in chronological order according to the order described in the present specification, or may be individually executed in parallel or at necessary timing when a call is made. That is, the processing of each step may be executed in an order different from the above-described order as long as no contradiction occurs. Moreover, the processing of the steps describing the program may be executed in parallel with the processing of another program, or may be executed in combination with the processing of another program.

Furthermore, for example, a plurality of techniques related to the present technology can be implemented independently as a single body as long as there is no contradiction. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

Note that the present technology can also have the following configurations.

(1) An image processing device including:
an encoding unit configured to assign a predetermined context variable to a first bin of a bin sequence obtained by binarizing an adaptive orthogonal transform identifier indicating a mode of adaptive orthogonal transform in image encoding and perform context encoding for the first bin of the bin sequence.

(2) The image processing device according to (1), in which
the encoding unit assigns predetermined context variables different from one another to the first bin to a fourth bin of the bin sequence and performs the context encoding for the first bin to the fourth bin of the bin sequence.

(3) The image processing device according to (1), in which
the encoding unit assigns predetermined context variables different from one another to the first bin to a third bin of the bin sequence and performs the context encoding for the first bin to the third bin of the bin sequence, and performs bypass encoding for a fourth bin of the bin sequence.

(4) The image processing device according to (1), in which
the encoding unit assigns predetermined context variables different from one another to the first bin and a second bin of the bin sequence and performs the context encoding for the first bin and the second bin of the bin sequence, and performs bypass encoding for a third bin and a fourth bin of the bin sequence.

(5) The image processing device according to (1), in which
the encoding unit assigns a predetermined context variable to the first bin of the bin sequence and performs the context encoding for the first bin of the bin sequence, and performs bypass encoding for a second bin to a fourth bin of the bin sequence.

(6) The image processing device according to any one of (1) to (5), in which
the encoding unit binarizes the adaptive orthogonal transform identifier to a bin sequence configured by one bit indicating whether or not a transform type is other than a transform type DCT2×DCT2 and two bits indicating another transform type, and encodes the bin sequence.

(7) An image processing method including:
assigning a predetermined context variable to a first bin of a bin sequence obtained by binarizing an adaptive orthogonal transform identifier indicating a mode of adaptive orthogonal transform in image encoding and performing context encoding for the first bin of the bin sequence.

(8) An image processing device including:
an encoding unit configured to assign a context variable based on a parameter regarding a block size to a first bin of a bin sequence obtained by binarizing an adaptive orthogonal transform identifier indicating a mode of adaptive orthogonal transform in image encoding, and perform context encoding for the first bin of the bin sequence.

(9) The image processing device according to (8), in which
the parameter regarding a block size is a difference between a logarithmic value of a long side of a transformation block and a logarithmic value of a minimum transformation block size to which the adaptive orthogonal transform is applicable.

(10) The image processing device according to (8), in which
the parameter regarding a block size is a minimum value between a difference between a logarithmic value of a long side of a transformation block and a logarithmic value of a minimum transformation block size to which the adaptive orthogonal transform is applicable, and a predetermined threshold value.

(11) The image processing device according to (8), in which
the parameter regarding a block size is a result of right-bit shifting a minimum value between a difference between a logarithmic value of a long side of a transformation block and a logarithmic value of a minimum transformation block size to which the adaptive orthogonal transform is applicable, and a predetermined threshold value.

(12) The image processing device according to (8), in which
the encoding unit assigns a context variable according to whether or not the parameter regarding a block size is equal to or larger than a predetermined threshold value and performs the context encoding.

(13) The image processing device according to any one of (8) to (12), in which
the encoding unit binarizes the adaptive orthogonal transform identifier to a bin sequence configured by one bit indicating whether or not a transform type is other than a transform type DCT2×DCT2 and two bits indicating another transform type, and encodes the bin sequence.

(14) The image processing device according to (8), in which
the encoding unit binarizes the adaptive orthogonal transform identifier for each component and performs the encoding.

(15) An image processing method including:
assigning a context variable based on a parameter regarding a block size to a first bin of a bin sequence obtained by binarizing an adaptive orthogonal transform identifier indicating a mode of adaptive orthogonal transform in image encoding, and performing context encoding for the first bin of the bin sequence.

REFERENCE SIGNS LIST

100 Image encoding device
115 Encoding unit
131 Binarization unit
132 Selection unit
133 Context setting unit
134 Context encoding unit
135 Bypass encoding unit
200 Image decoding device
212 Decoding unit
231 Selection unit
232 Context setting unit
233 Context decoding unit
234 Bypass decoding unit
235 Inverse binarization unit

The invention claimed is:

1. An image processing device comprising:
circuitry configured to decode image data that has been encoded by assignment of a predetermined context variable to a first bin of a bin sequence obtained by binarizing an adaptive orthogonal transform identifier indicating a mode of adaptive orthogonal transform in image encoding, the first bin of the bin sequence being context encoded,
wherein the image data has further been encoded by assignment of predetermined context variables different from one another to the first bin to a fourth bin of the bin sequence, the first bin to the fourth bin of the bin sequence having been context encoded.

2. An image processing method comprising:
decoding image data that has been encoded by assigning a predetermined context variable to a first bin of a bin sequence obtained by binarizing an adaptive orthogonal transform identifier indicating a mode of adaptive orthogonal transform in image encoding, and the first bin of the bin sequence having been context encoded,
wherein the image data has further been encoded by assignment of predetermined context variables different from one another to the first bin to a fourth bin of the bin sequence, the first bin to the fourth bin of the bin sequence having been context encoded.

3. An image processing device comprising:
circuitry configured to decode image data that has been encoded by assignment of a context variable based on a parameter regarding a block size to a first bin of a bin sequence obtained by binarizing an adaptive orthogonal transform identifier indicating a mode of adaptive orthogonal transform in image encoding, and the first bin of the bin sequence having been context encoded.

4. The image processing device according to claim 3, wherein
the parameter regarding a block size is a difference between a logarithmic value of a long side of a transformation block and a logarithmic value of a minimum transformation block size to which the adaptive orthogonal transform is applicable.

5. The image processing device according to claim 3, wherein
the parameter regarding a block size is a minimum value between a difference between a logarithmic value of a long side of a transformation block and a logarithmic value of a minimum transformation block size to which the adaptive orthogonal transform is applicable, and a predetermined threshold value.

6. The image processing device according to claim 3, wherein
the parameter regarding a block size is a result of right-bit shifting a minimum value between a difference between a logarithmic value of a long side of a transformation block and a logarithmic value of a minimum transformation block size to which the adaptive orthogonal transform is applicable, and a predetermined threshold value.

7. The image processing device according to claim 3, wherein
the image data has further been encoded by assignment of a context variable according to whether or not the parameter regarding a block size is equal to or larger than a predetermined threshold value that was applied during context encoding.

8. The image processing device according to claim 3, wherein
the adaptive orthogonal transform identifier has been binarized to a bin sequence configured by one bit indicating whether or not a transform type is other than a transform type DCT2×DCT2 and two bits indicating another transform type, and the bin sequence having been encoded.

9. The image processing device according to claim 3, wherein
the adaptive orthogonal transform identifier has been binarized for each component during the encoding.

10. An image processing method comprising:
decoding image data that has been encoded by assigning a context variable based on a parameter regarding a block size to a first bin of a bin sequence obtained by binarizing an adaptive orthogonal transform identifier indicating a mode of adaptive orthogonal transform in image encoding, the first bin of the bin sequence having been context encoded during encoding.

11. The image processing device according to claim 1, wherein the adaptive orthogonal transform identifier is context encoded for each component identifier of the transform block.

12. The image processing device according to claim 11, wherein a context variable corresponding to the component identifier is assigned to the first bin of the bin sequence and perform context encoding.

13. The image processing device according to claim 1, wherein a secondary transform identifier indicating the mode of secondary transform in image encoding is context encoded.

14. The image processing device according to claim 13, wherein the secondary transform identifier is context encoded for each treeType.

15. The image processing device according to claim 14, wherein each bin of the bin sequence obtained by binarizing the secondary transform identifier is assigned a different context variable prior to context encoding.

* * * * *